(12) United States Patent
Dejneka et al.

(10) Patent No.: US 12,552,704 B2
(45) Date of Patent: *Feb. 17, 2026

(54) GLASS-CERAMICS AND GLASSES

(71) Applicant: CORNING INCORPORATED, Corning, NY (US)

(72) Inventors: Matthew John Dejneka, Corning, NY (US); Jesse Kohl, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 351 days.

This patent is subject to a terminal disclaimer.

(21) Appl. No.: 18/130,967

(22) Filed: Apr. 5, 2023

(65) Prior Publication Data

US 2023/0312405 A1 Oct. 5, 2023

Related U.S. Application Data

(63) Continuation of application No. 17/333,758, filed on May 28, 2021, now Pat. No. 11,643,359, which is a
(Continued)

(51) Int. Cl.
*B32B 15/04* (2006.01)
*B32B 17/06* (2006.01)
*C03C 3/091* (2006.01)
*C03C 3/093* (2006.01)
*C03C 3/097* (2006.01)
(Continued)

(52) U.S. Cl.
CPC .......... *C03C 10/0054* (2013.01); *C03C 3/091* (2013.01); *C03C 3/093* (2013.01); *C03C 3/097* (2013.01); *C03C 3/118* (2013.01); *C03C 4/02* (2013.01); *C03C 4/082* (2013.01); *C03C 4/085* (2013.01); *C03C 10/0009* (2013.01); *C03C 10/0018* (2013.01); *C03C 10/0027* (2013.01); *C03C 21/001* (2013.01); *G02B 1/02* (2013.01); *C03C 2204/00* (2013.01)

(58) Field of Classification Search
CPC ...................................................... C03C 10/00
USPC ....................................................... 428/426
See application file for complete search history.

(56) References Cited

U.S. PATENT DOCUMENTS 2,034,994 A 3/1936 Ellsworth et al.
2,952,575 A 9/1960 Baltzer
(Continued)

FOREIGN PATENT DOCUMENTS

AU 2003214255 A1 12/2003
CA 1232619 A 2/1988
(Continued)

OTHER PUBLICATIONS

Sayed et al., "Some properties of sodium tungsten bronzes as a function of sodium concentration", Indian Journal of Chem. Tech., vol. 12, May 2005, pp. 304-308.
(Continued)

*Primary Examiner* — Lauren R Colgan
(74) *Attorney, Agent, or Firm* — Russell S. Magaziner

(57) ABSTRACT

A glass-ceramic includes glass and crystalline phases, where the crystalline phase includes non-stoichiometric suboxides of titanium, forming 'bronze'-type solid state defect structures in which vacancies are occupied with dopant cations.

20 Claims, 26 Drawing Sheets

Related U.S. Application Data continuation of application No. 16/531,769, filed on Aug. 5, 2019, now Pat. No. 11,046,609, which is a continuation of application No. 16/171,939, filed on Oct. 26, 2018, now Pat. No. 10,450,220, which is a continuation of application No. PCT/US2018/057009, filed on Oct. 23, 2018, which is a continuation-in-part of application No. 15/840,040, filed on Dec. 13, 2017, now Pat. No. 10,246,371, said application No. 16/171,939 is a continuation-in-part of application No. 16/157,663, filed on Oct. 11, 2018, now Pat. No. 10,370,291, which is a continuation of application No. 15/840,040, filed on Dec. 13, 2017, now Pat. No. 10,246,371.

(60) Provisional application No. 62/575,763, filed on Oct. 23, 2017.

(51) Int. Cl.
  *C03C 3/118* (2006.01)
  *C03C 4/02* (2006.01)
  *C03C 4/08* (2006.01)
  *C03C 10/00* (2006.01)
  *C03C 21/00* (2006.01)
  *G02B 1/02* (2006.01)

(56) References Cited

U.S. PATENT DOCUMENTS

| | | |
|---|---|---|
| 3,293,052 A | 12/1966 | Sawchuk et al. |
| 3,457,106 A | 7/1969 | Gillery |
| 3,499,775 A | 3/1970 | Albinak et al. |
| 3,582,370 A | 6/1971 | Beall |
| 3,779,733 A | 12/1973 | Janakirama |
| 3,785,834 A | 1/1974 | Rapp |
| 3,985,534 A | 10/1976 | Flannery et al. |
| 4,009,042 A | 2/1977 | Rittler |
| 4,303,298 A | 12/1981 | Yamashita |
| 4,396,720 A | 8/1983 | Beall et al. |
| 4,537,862 A | 8/1985 | Francel et al. |
| 4,769,347 A | 9/1988 | Cook et al. |
| 4,792,536 A | 12/1988 | Pecoraro et al. |
| 4,870,539 A | 9/1989 | Chance et al. |
| 4,919,991 A | 4/1990 | Gadkaree |
| 5,304,516 A | 4/1994 | Clifford |
| 5,393,593 A | 2/1995 | Gulotta et al. |
| 5,422,319 A | 6/1995 | Stempin et al. |
| 5,468,694 A | 11/1995 | Taguchi et al. |
| 5,565,388 A | 10/1996 | Krumwiede et al. |
| 5,566,428 A | 10/1996 | Takahashi |
| 5,668,066 A | 9/1997 | Oguma et al. |
| 6,048,621 A | 4/2000 | Gallego et al. |
| 6,114,264 A | 9/2000 | Krumwiede et al. |
| 6,184,162 B1 | 2/2001 | Speit et al. |
| 6,196,027 B1 | 3/2001 | Varanasi et al. |
| 6,214,429 B1 | 4/2001 | Zou et al. |
| 6,274,523 B1 | 8/2001 | Krumwiede et al. |
| 6,274,853 B1 | 8/2001 | Watanabe et al. |
| 6,376,399 B1 | 4/2002 | Aitken et al. |
| 6,537,937 B1 | 3/2003 | Nishizawa et al. |
| 6,677,046 B2 | 1/2004 | Hachitani et al. |
| 6,899,954 B2 | 5/2005 | Kolberg et al. |
| 6,911,254 B2 | 6/2005 | Fisher et al. |
| 7,192,897 B2 | 3/2007 | Yamane et al. |
| 7,365,036 B2 | 4/2008 | Miyazaki et al. |
| 7,476,342 B2 | 1/2009 | Endo et al. |
| 7,517,822 B2 | 4/2009 | Fechner et al. |
| 7,727,916 B2 | 6/2010 | Peuchert et al. |
| 7,795,164 B2 | 9/2010 | Ritzberger et al. |
| 7,820,575 B2 | 10/2010 | Nagashima et al. |
| 7,838,451 B2 | 11/2010 | Nishizawa et al. |
| 7,851,394 B2 | 12/2010 | Ellison |
| 8,017,538 B2 | 9/2011 | Teyssedre et al. |
| 8,141,387 B2 | 3/2012 | Letz et al. |
| 8,263,509 B2 | 9/2012 | Hoppe et al. |
| 8,268,202 B2 | 9/2012 | Mamak et al. |
| 8,399,547 B2 | 3/2013 | Meyer et al. |
| 10,246,371 B1* | 4/2019 | Dejneka .................. C03C 3/118 |
| 10,370,291 B2* | 8/2019 | Dejneka .............. C03C 10/0009 |
| 10,450,220 B2* | 10/2019 | Dejneka ................. G02B 1/02 |
| 10,807,906 B2 | 10/2020 | Dejneka et al. |
| 10,829,408 B2* | 11/2020 | Dejneka .............. C03C 10/0027 |
| 11,046,609 B2* | 6/2021 | Dejneka ................. C03C 3/097 |
| 11,053,159 B2 | 7/2021 | Dejneka et al. |
| 11,312,653 B2* | 4/2022 | Dejneka .............. C03C 10/0027 |
| 11,629,091 B2* | 4/2023 | Dejneka .............. C03C 4/082 |
| | | 501/64 |
| 11,643,359 B2* | 5/2023 | Dejneka .............. C03C 10/0054 |
| | | 428/701 |
| 11,912,609 B2* | 2/2024 | Dejneka ................. C03C 3/118 |
| 12,338,169 B2* | 6/2025 | Dejneka .................. C03C 3/11 |
| 2002/0032113 A1 | 3/2002 | Nakajima et al. |
| 2002/0072461 A1 | 6/2002 | Akimoto et al. |
| 2002/0080474 A1 | 6/2002 | Ohishi et al. |
| 2003/0045422 A1 | 3/2003 | Tanaka et al. |
| 2003/0158029 A1 | 8/2003 | Clasen et al. |
| 2005/0151116 A1 | 7/2005 | Fechner et al. |
| 2005/0181927 A1 | 8/2005 | Hasegawa et al. |
| 2006/0025298 A1 | 2/2006 | Emlemdi |
| 2006/0063009 A1 | 3/2006 | Naitou et al. |
| 2007/0158317 A1 | 7/2007 | Brix et al. |
| 2007/0213195 A1 | 9/2007 | Hikata et al. |
| 2007/0225144 A1* | 9/2007 | Miyazaki .............. H01J 29/028 |
| | | 501/72 |
| 2008/0128923 A1 | 6/2008 | Saito et al. |
| 2008/0193686 A1 | 8/2008 | Loergen et al. |
| 2008/0315123 A1 | 12/2008 | Komatsu et al. |
| 2009/0035341 A1 | 2/2009 | Wagener et al. |
| 2009/0109654 A1 | 4/2009 | Fechner et al. |
| 2009/0113936 A1 | 5/2009 | Ritzberger et al. |
| 2009/0215605 A1 | 8/2009 | Letz et al. |
| 2009/0325349 A1 | 12/2009 | Hashimoto |
| 2011/0028298 A1 | 2/2011 | Hoppe et al. |
| 2011/0226231 A1 | 9/2011 | Siebers et al. |
| 2011/0248225 A1 | 10/2011 | Mamak et al. |
| 2012/0017825 A1 | 1/2012 | D'Evelyn et al. |
| 2012/0196126 A1 | 8/2012 | Axtell et al. |
| 2012/0247525 A1 | 10/2012 | Aitken et al. |
| 2014/0220359 A1 | 8/2014 | Wang et al. |
| 2014/0232030 A1 | 8/2014 | Ritzberger et al. |
| 2014/0256865 A1 | 9/2014 | Boulton et al. |
| 2014/0305929 A1* | 10/2014 | Weiss ....................... C03C 4/10 |
| | | 219/460.1 |
| 2015/0093554 A1 | 4/2015 | Estinto et al. |
| 2016/0168023 A1 | 6/2016 | Baum et al. |
| 2016/0302898 A1 | 10/2016 | Ritzberger et al. |
| 2017/0362119 A1 | 12/2017 | Dejneka et al. |
| 2018/0044224 A1 | 2/2018 | Peng et al. |
| 2018/0362391 A1 | 12/2018 | Maeda et al. |
| 2019/0168023 A1 | 6/2019 | Eltorai |
| 2019/0177206 A1 | 6/2019 | Dejneka et al. |
| 2019/0177212 A1 | 6/2019 | Dejneka et al. |
| 2019/0225503 A1 | 7/2019 | Okada et al. |

FOREIGN PATENT DOCUMENTS

| | | |
|---|---|---|
| CN | 1275542 A | 12/2000 |
| CN | 1424988 A | 6/2003 |
| CN | 1653007 A | 8/2005 |
| CN | 1286753 C | 11/2006 |
| CN | 101583576 A | 11/2009 |
| CN | 102046551 A | 5/2011 |
| CN | 102421718 A | 4/2012 |
| CN | 103864313 A | 6/2014 |
| CN | 103930087 A | 7/2014 |
| CN | 104108881 A | 10/2014 |
| CN | 104445932 A | 3/2015 |
| CN | 104743882 A | 7/2015 |
| CN | 104944471 A | 9/2015 |
| CN | 105102389 A | 11/2015 |
| CN | 105163949 A | 12/2015 |

(56) References Cited

FOREIGN PATENT DOCUMENTS

| | | |
|---|---|---|
| CN | 105254181 A | 1/2016 |
| CN | 105948513 A | 9/2016 |
| CN | 106396413 A | 2/2017 |
| CN | 107001120 A | 8/2017 |
| CN | 107124879 A | 9/2017 |
| CN | 107223116 A | 9/2017 |
| CN | 107601853 A | 1/2018 |
| CN | 109311730 A | 2/2019 |
| DE | 3514749 A1 | 10/1985 |
| DE | 10353756 A1 | 6/2005 |
| DE | 102005051387 B3 | 1/2007 |
| EP | 1780182 A1 | 5/2007 |
| EP | 1940341 A2 | 7/2008 |
| EP | 2360220 A1 | 8/2011 |
| EP | 2581353 A1 | 4/2013 |
| EP | 2805829 A1 | 11/2014 |
| EP | 3442914 A1 | 2/2019 |
| FR | 2563515 A1 | 10/1985 |
| GB | 1104178 A | 2/1968 |
| GB | 2158062 A | 11/1985 |
| IT | 1181882 B | 9/1987 |
| JP | 53-085813 A | 7/1978 |
| JP | 60-235742 A | 11/1985 |
| JP | 63-242946 A | 10/1988 |
| JP | 05-270859 A | 10/1993 |
| JP | 09-241035 A | 9/1997 |
| JP | 2002-293571 A | 10/2002 |
| JP | 2003-099913 A | 4/2003 |
| JP | 2004-091308 A | 3/2004 |
| JP | 2004-206741 A | 7/2004 |
| JP | 2005-037932 A | 2/2005 |
| JP | 2005-320225 A | 11/2005 |
| JP | 2007-238353 A | 9/2007 |
| JP | 2010-248011 A | 11/2010 |
| JP | 2011-046599 A | 3/2011 |
| JP | 2011-241092 A | 12/2011 |
| JP | 2011-256081 A | 12/2011 |
| JP | 5034272 B2 | 9/2012 |
| JP | 2014-094879 A | 5/2014 |
| JP | 2015-044921 A | 3/2015 |
| JP | 6206736 B2 | 10/2017 |
| JP | 2019-517987 A | 6/2019 |
| KR | 10-2005-0025182 A | 3/2005 |
| MX | 170104 B | 8/1993 |
| RU | 2032633 C1 | 4/1995 |
| RU | 2194807 C2 | 12/2002 |
| RU | 2531958 C2 | 10/2014 |
| SU | 392016 A1 | 7/1973 |
| TW | 264422 B | 12/1995 |
| TW | 200744975 A | 12/2007 |
| TW | 201630838 A | 9/2016 |
| WO | 99/02461 A1 | 1/1999 |
| WO | 2003/097544 A1 | 11/2003 |
| WO | 2007/048670 A2 | 5/2007 |
| WO | 2010/098227 A1 | 9/2010 |
| WO | 2011/013797 A1 | 2/2011 |
| WO | 2017/129516 A1 | 8/2017 |
| WO | 2017/218859 A1 | 12/2017 |
| WO | 2019/051408 A2 | 3/2019 |
| WO | 2019/083937 A2 | 5/2019 |
| WO | 2019/113029 A1 | 6/2019 |
| WO | 2019/118488 A1 | 6/2019 |
| WO | 2019/118493 A1 | 6/2019 |

OTHER PUBLICATIONS

Song et al; "Hydrophilic Molybdenum Oxide Nanomaterials With Controlled Morphology and Strong Plasmonic Absorption OFR Photothermal Ablation of Cancer Cells"; ACS Appl. Mater. Interfaces, 6; (2014); pp. 3915-3922.

Spectaris; "Exemption Renewal Request Form"; 29 Pages; Date Unknown; 1. http://rohs.exemptions.oeko.info/fileadmin/user_upload/RoHS_Pack_7/Exempt-ion_13b/Spectaris_Exemption_Renewal_Request_13b_Final.pdf.

Status of US. federal trademark registration for the "GL-20" word mark, filed on Aug. 28, 1996, abandoned as of Aug. 30, 1998.

Tanaka et al; "Phase Separation of Borosilcate Glass With Molybdenum Oxide Addition and Pore Structure of Porous Glass"; J. Ceram. Assoc. Japn, vol. 93 [1083], 700-707 (1985).

Tetchi Fabrice Achille et al. "contribution to light transmittance modelling in starch media" African Journal of Biotechnology; Mar. 5, 2007; pp. 569-575; 6(5.

Vitro "Radio and Microwave Frequency Attenuation in Glass", Vitro Glass Technical Document TD-151,Vitro Architectural Glass, Oct. 4, 2016, 5 pages. Found at https://www.vitroglazings.com/media/111k3zcc/vitro-td-151.pdf.(Year: 2016).

Wakeham et al; "Investigation of Tin-Based Alternatives for Cadmium in Optoelectronic Thin-Film Materials", Appl. Optics, 47, [13], May 2008, 8 pages.

Wen et al; "Water Resistance of a New Nonlead Phosphate Sealing Glass"; Phys. Chem. Glasses, 43, (3) (2002) pp. 158-160.

X. Zeng, Y. Zhou, S. Ji, H. Luo, H. Yao, X. Huang, and P. Jin, "The preparation of a high performance near-infrared shielding CsxWO3/SiO2 composite resin coating and research on its optical stability under ultraviolet illumination", J. Mater. Chem. C, 3, 8050 (2015).

Zhou et al. "CsxWO3 nanoparticle-based organic polymer transparent foils: low haze, high near-infrared sheilding bility and excellent photocromic stability" Journal of Materials Chemistry 5, C, 2017, pp. 6251-6258.

"How Low-E Glass Works: What is Low-E Glass." PPG Glass Education Center, Available at: http://www.educationcenter.ppg.com/glasstopics/how_lowe_works.aspx> > retrieved on Dec. 22, 2015, 7 pages.

"Low-e Glass Blending Natural Views with Solar Efficiency." Ideascapes Class, Coatings, Paint. N.p., n.d. Web. <www.ppgideascapes.com/Glass/Products/Low-E-Glass.aspx>. Retrieved on Dec. 22, 2015.

"Sunroof" Wikipedia;; Available online at: https://en.wikipedia.org/wiki/Sunroof., Last Updated Nov. 9, 2017 6 Pages.

"Supersizing the Sunroof, Even in Economy Cars", 2012, http://www.wsj.com/articles/SB10001424127887324024004578173271481039256.

"Window Technologies: Low-E Coatings." Efficient Windows Collaborative, <www.efficientwindows.org/lowe.php> retrieved on Dec. 22, 2015.

Adachi et al; "Chromatic Instabilities in Cesium-Doped Tungsten Bronze Nanoparticles"; Journal of Applied Physics, 114; (2013) pp. 194304-1-194304-11.

Aitken and Youngman, "Structure-property relationships of WAI and WTi phosphate glasses and their corresponding glass-ceramics" XI BrazGlass, Curitiba, Brazil. Jul. 15, 2017. 30 slides.

Alizadeh et al; "Effect of Nucleating Agents on the Crystallization Behaviour and Microstructure of SiO2—CaO—MgO {Na2O) Glass-Ceramics" ; Journal of the European Ceramic Society; 20 (2000), 775-782.

Alizadeh et al; "Study of Bulk Crystallization in MgO—CaO—SiO2—Na2O Glasses in the Prescence of CaF2 and MoO3 Nucleant"; Journal of Materials Science 38 (2003); pp. 1529-1534.

Aren et al; "Chalcopyrite CuIn{Se1-x, Sx)2 Semiconducting Thin Films", Journal of Materials Science Letters; pp. 1176-1177, 1993.

Austin Lott, Motortrend; From Coupes to Wagons, Some Cars Less Than $50,000 Have an Extra-Large Sunroof; Apr. 21, 2015; 20 pages, https://web.archive.org/web/20200806224129/https://www.motortrend.com/news/vehicles-offering-panoramic-sunroofs-for-less-than-50000/.

Automotive Sunroof Market Size Forcast to Reach USO 9.76 Billion by 2022; Published Mar. 24, 2016; Global Market Insights, Inc. 3 Pages; https://www.gminsights.com/pressrelease/automotive-sunroof-market-report.

Banlaw; Molybdenum Prices and Molybdenum Price Charts; IPCC; http://www.infomine.com/investmenl/metal-prices/molybdenum-oxide/, Retreived on Jun. 28, 2021.

Bodnar et al; "Formation and Optical Properties of CuInSe2 Nanocrystals in a Silicate Matrix", Inorganic Materials, vol. 40, No. 8, 2004, pp. 797-801. Translated From Neorganicheskie Materialy, vol. 40, No. 8, 2004, pp. 915-920.

(56) References Cited

OTHER PUBLICATIONS

Chen et al; "Preparation and Near-Infrared Photothermal Conversion Property of Cesium Ungsten Oxide Nanoparticles"; Nanoschale Research Letters, 8; 57; (2013); 8 Pages.

Dickens et al; "The Tungsten Bronzes and Related Compounds", J. Amer. Chem. Soc., 81, 5556 (1981).

Dutta et al. "In-situ characterization of conductive W-Ti Phosphate Glass-Ceramics" GOMD Conference, 2016, Madison, WI. 17 slides.

Ecoflo; "What are the RCRA 9 Metals?"; Downloaded Jan. 10, 2019; 3 Pages; https://www.ecoflo.com/2014/12/19/what-are-the-rcra-8-metals/.

Efficient Window Collaborative; Window Technologies: (Technologies. PHP) Low-E Coatings; Copyright 2000-2018; 8 Pages, no date.

European Commission; "12 Lead Cadmium in Optical Glass" ; (2011); 7 Pages; 2. http://rohs.exemptionsbeko.info/lileadmin/user_upload/Rohs_V/Request_12/12_Lead_Cadmium_in_Optical_Glass_2011-08-09.pdf.

F. Shi, J. Liu, X. Dong, Q. Xu, J. Luo, H. Ma, "Hydrothermal Synthesis of CsxWO3 and the Effects of N2 annealing on its Microstructure and Heat Shielding Properties", J. Mater. Sci. Technol., 30 [4], 342 (2014).

G.H. Beall, D.A. Duke; Transparent Glass-Ceramics; Journal of Materials Science; (1969); pp. 340-352; vol. 4.

Gabuni et al; "A Study of the Process of Doping High-Aluminium-Ferruginous Glasses With Small Additions of Some Oxides"; Thesis. Leningrad, 1963; 4 Pages.

Gabuniya et al; "Study of the Process of Alloying High-Content Aluminum-Iron Glass With Small Admixtures of Various Oxides"; Ministry for the Construction Materials Industry of the Georgian SSR Scientific and Technical Association "Gruzniistrom" Tbilisi Scientific Research Institute for Construction Material; Issue IX; (1975), 7 Pages.

Green et al; "Optical Properties of Dilute Hydrogen Tungsten Bronze Thin Films" ; Journal of Applied Physics, 69, (1991); pp. 7788-7796.

Green et al; "Optical Properties of Lithium Tungsten Bronze Thin Films"; Journal of Applied Physics; 74; (1993); p. 3451-3458.

Guo et al; "Highly Efficient Ablation of Metastatic Breast Cancer Using Ammonium-Tungsten-Bronze Nanocube as a Novel 1064 NM-Laser-Driven Photothermal Agent"; Biomaterials; 52 (2015) pp. 407-416.

H. Miyazaki; Fabrication of uv-opaque and visible-transparent composite film; Solar Energy Materials & Solar Cells; (2006); pp. 2640-2646; vol. 90; Elsevier.

H. Tawarayama, F. Utsuno, H. Inoue, H. Hosono, and H. Kawazoe, "Coloration and Decoloration of Tungsten Phosphate Glasses by Heat Treatments at the Temperature Far below Tg", Chem. Mater. 18, 2810 (2006), 7 pages.

Hussain; "Optical and Electrochromic Properties of Annealed Lithium-Molybdenum-Bronze Thin Films"; Journal of Electronic Materials; vol. 31, No. 6, (2002) pp. 615-630.

Kaliyev, "What Are Tungsten Bronzes", EIR vol. 20, No. 17, Apr. 30, 1993, 2 Pages.

Kamel et al; "Effect of the Ce Content on a Nuclear Waste Glassy Matrix in the System SiO2—Al2O3—CaO—MgO—ZrO2—TiO2, Synthesized at a Low Melting Temperature"; Journal of Materials Science and Engineering, A; 3 (4) (2013) pp. 209-223.

Kawamoto et al; "Effects of Crystallization on Thermal Properties and Chemical Durability of the Glasses Containing Simulated High Level Radioactive Wastes"; Bull. Governm.Ind.Res.Inst.Osaka, 1978, vol. 29, No. 2, p. 168.

Kim et al; "Near Infrared Cut-Off Characteristics of Various Perovskite-Based Composite Films"; IPCBEE, vol. 43 (2012); pp. 40-43.

Knoche et al; "Melt Densities for Leucogranites and Granitic Pegmatites: Partial Molar Volumes for SiO2, Al2O3, Na2O, K2O, Li2O, Rb2O, Cs2O, MgO, CaO, SrO, BaO, B2O3, P2O5, F2O-1, TiO2, Nb2O5, Ta2O5, and WO3"; Geochimica Et Cosmochimica Acta, vol. 59, No. 22 (1995) p. 4645-4652.

L. Brickwedel, J. E. Shelby, "Formation and properties of sodium tungsten borate glasses", Phys. Chem. Glasses: Eur. J. Glass Sci. Technol. B, 5. 598 (2006).

Lee et al; "A Study on Toughened Glass Used for Vehicles and Its Testing Methods"; 8 Pages; Date Unknown; http://www-esv.nhtsa.dot.gov/Proceedings/24/files/24ESV-000152.pdf.

M. von Dirke, S. Muller, K. Barner, and H. Rager "Cluster formation of WO3 in Li2B4O7 glasses". J. Non Crys. Sol, 124,265 (1990).

Matthew J. Dejneka; Transparent Oxyfluoride Glass Ceramics; MRS Bulletin; Nov. 1998; pp. 57-62; https:/www.cambridge.org/core.

Moon et al; "Near Infrared Shielding Properties of Quaternary Tungsten Bronze Nanopartice NAO.11CSO.22WO3"; Bull. Korean Chem. Soc. vol. 34, No. 3(2013); pp. 731-734.

Moore et al. "Microstructural evolution of conductive WTi phosphate glass-ceramics" GOMD, Madison, WI. May 26, 2016. 18 slides.

Official Newsletter of the Committee on Inventions and Discoveries Under the Council of Ministers of the USSR 50th Publication Year; Discoveries, Inventions; Industrial Prototypes; Trade Marks; Jul. 27, 1973; 3 Pages.

Pinet et al; "Redox Effect of Waste Containment Glass Properties: Case of a Borosilicate Glass Containing 16 WT% MoO3"; Proc. XIX Int. Congr. Glass, Eidinburgh, Jul. 1-6, 2001, Glass Technology, 2002, 43C pp. 158-161.

Poirier et al; "Redox Behavior of Molybdenum and Tungsten in Phosphate Glasses"; J. Phys. Chem. B.; 112; (2008); pp. 4481-4487.

Pricing; Metal Bulletin Historical Tungsten Pricing (Annual Mean Averages), https://knoema.com/UNCTADFMCP2015Feb/free-market-commodity-prices-july-20- 16?tsld=1001760, Nov. 2016, 2 pages.

Profita et al; "What You Need to Know About Heavy Metals Pollution in Portland"; OPB; 13 Pages (2016) http://www.opb.org/news/article/what-you-need-to-know-about-heavy-metals--pollution-in-portland/.

Rouhani, "Photochromism of Molybdenum Oxude", National University of Singapore, PhD Thesis, NUS Graduate School for Integrative Sciences and Enginnering, 2013; 139 Pages.

Saflex.RTM. SG Solar Absorbing PVB, Advanced Interlayer Technology for Laminated Glass; 2015; 2 Pages; https://www.saflex.com/pdf/en/AI-Arch-009a_Saflex_SG_Solar_A4.pdf.

Saint-Gobain Thermocontrol Venus; Copyright 2013; 1 Page; http://saint-gobain-autover.com/thermocontrol-venus-for-auto-glass.

Sakka; "Formation of Tungsten Bronze and Other Electrically Conducting Crystals by Crystallization of Glasses Containing Alkali and Tungsten Oxide", Bull. Inst. Chem. ReES, Kyoto Univ., 48 [4-5], 185 (1970).

Chinese Patent Application No. 202410885318.6, Office Action dated Jan. 25, 2025, 5 pages (English Translation only), Chinese Patent Office.

Chinese Patent Application No. 202410885321.8, Office Action dated Feb. 9, 2025, 5 pages (English Translation only), Chinese Patent Office.

\* cited by examiner

GLASS-CERAMICS AND GLASSES

CROSS-REFERENCE

This application is a continuation of U.S. application Ser. No. 17/333,758 filed on May 28, 2021, which is a continuation of U.S. application Ser. No. 16/531,769 filed on Aug. 5, 2019, which issued Jun. 29, 2021 as U.S. Pat. No. 11,046,609 and is a continuation of U.S. application Ser. No. 16/171,939 filed Oct. 26, 2018, which issued Oct. 22, 2019 as U.S. Pat. No. 10,450,220 and is a continuation of International Application No. PCT/US18/57009 filed Oct. 23, 2018, which is a continuation-in-part of U.S. application Ser. No. 15/840,040 filed Dec. 13, 2017, which issued Apr. 2, 2019 as U.S. Pat. No. 10,246,371, and International Application No. PCT/US18/57009 filed Oct. 23, 2018 also claims the priority benefit of U.S. Application No. 62/575,763 filed Oct. 23, 2017, and U.S. application Ser. No. 16/171,939 filed Oct. 26, 2018 is also a continuation-in-part of U.S. application Ser. No. 16/157,663 filed Oct. 11, 2018, which issued Aug. 6, 2019 as U.S. Pat. No. 10,370,291 and is a continuation of U.S. application Ser. No. 15/840,040 filed Dec. 13, 2017, which issued Apr. 2, 2019 as U.S. Pat. No. 10,246,371, and each of the above-listed patents and patent applications is hereby incorporated by reference herein in its entirety.

FIELD OF THE DISCLOSURE

The present disclosure generally relates to articles including glasses and/or glass-ceramics, and more specifically, to compositions and methods of forming such articles.

BACKGROUND

Metallic Ultraviolet ("UV") and near-infrared ("NIR") absorbing alkali containing silicate glass-ceramics are a class of glass-ceramics which exhibit optical properties dependent on the wavelength of light which is incident on the glass-ceramics. Conventional UV/IR-blocking glasses (with low or high visible transmittance) are formed by introducing certain cationic species (e.g., Fe2+ to absorb NIR wavelengths and Fe23+ to absorb UV wavelengths, and other dopants such as Co, Ni, and Se to modify the visible transmittance) which are bonded with the glass network. Traditionally, these glass-ceramics were produced by melting the constituents together to form a glass, followed by the in situ formation of submicron precipitates through a post-formation heat treatment to form the glass-ceramic. These submicroscopic precipitates (e.g., tungstate- and molybdate-containing crystals) are absorptive of wavelength bands of light giving the glass-ceramic its optical properties. Such conventional glass-ceramics could be produced in both transparent as well as opalized forms.

Conventional tungsten and molybdenum alkali containing silicate glasses were believed to be bound to a specific and narrow composition range in order to produce glasses and glass-ceramics that are transparent at visible wavelengths. The believed composition range was based on a perceived solubility limit of tungsten oxide within peralkaline glass. For example, when batched and melted in a conventional manner, tungsten oxide can react with alkali metal oxides in the batch to form a dense alkali tungstate liquid at a low temperature during the initial stages of the melt immediately after being put into a melting furnace (e.g., the reaction occurs at about 500° C.). Because of the high density of this phase, it rapidly segregates at the bottom of the crucible. At significantly higher temperatures (e.g., above about 1000° C.), silicate constituents start to melt, and because of the silicate constituents' lower density, it remains atop the alkali tungstate liquid. The difference in densities of the constituents results in a stratification of the different liquids which gives the appearance to those skilled in the art of an immiscibility with one another. This effect was observed particularly when $R_2O$ (e.g., $Li_2O$, $Na_2O$, $K_2O$, $Rb_2O$, $Cs_2O$) minus $Al_2O_3$ was about 0 mol % or greater. The resulting apparent liquid immiscibility at melting temperature resulted in a tungsten-rich phase segregating and crystallizing as it cooled which manifested itself as an opalized, non-transparent, crystal. This issue was also present with molybdenum containing melts.

Those having ordinary skill in the art observed the tungsten- and/or molybdenum-rich phase separate from the silicate rich phase, they perceived a solubility limit of tungsten and/or molybdenum (e.g., about 2.5 mol %) within the silicate rich phase. The perceived solubility limit prevented the glass from ever becoming super-saturated with tungsten or molybdenum oxides, thereby preventing either constituent from being controllably precipitated through post-forming heat-treatment to produce a glass-ceramic with a crystalline phase including these elements. Thus, the perceived solubility prevented the development of glass-ceramic compositions which achieved a sufficient quantity of solubilized tungsten and/or molybdenum to allow the formation of tungsten and/or molybdenum containing wavelength dependent submicroscopic crystals through subsequent heat treatment.

In view of these limitations, there is a need for new compositions and methods of making them that facilitate improved near infrared and ultraviolet blocking (e.g., through higher tungsten and molybdenum solubility).

SUMMARY

It has been discovered that a homogenous single-phase W or Mo-containing peralkaline melt may be obtained through the use of "bound" alkalis as described herein. Exemplary bound alkalis may include feldspar, nepheline, borax, spodumene, other sodium or potassium feldspars, alkali-aluminum-silicates and/or other naturally occurring and artificially created minerals containing an alkali and one or more aluminum and/or silicon atoms. By introducing the alkali in the bound form, the alkalis may not react with the W or Mo present in the melt to form the dense alkali tungstate and/or alkali molybdate liquid. Moreover, this change in batch material may allow the melting of strongly peralkaline compositions (e.g., $R_2O$—$Al_2O_3$=about 2.0 mol % or more) without the formation of any alkali tungstate and/or alkali molybdate second phase. This has also allowed melt temperature and mixing method to be varied and still produce a single-phase homogenous glass.

According to aspects of the present disclosure, a glass-ceramic includes silicate-containing glass and crystalline phases, where the crystalline phase includes non-stoichiometric suboxides of tungsten and/or molybdenum, or alternatively titanium, forming 'bronze'-type solid state defect structures in which vacancies are occupied with dopant cations.

In some embodiments, a glass-ceramic includes an amorphous phase and a crystalline phase comprising a plurality of precipitates of formula $M_xWO_3$ and/or $M_xMoO_3$, where $0<x<1$ and M is a dopant cation. In some such embodiments, the precipitates have a length of from about 1 nm to about 200 nm as measured by Electron Microscopy. Precipitates of the crystalline phase may be substantially homogenously distributed within the glass-ceramic.

Further, a glass-ceramic may include an amorphous phase and a crystalline phase comprising a plurality of precipitates of formula $M_xTiO_2$, where $0<x<1$ and M is a dopant cation. In some such embodiments, the precipitates have a length of from about 1 nm to about 200 nm, or 1 nm to about 300 nm or 1 nm to about 500 nm as measured by Electron Microscopy. Precipitates of the crystalline phase may be substantially homogenously distributed within the glass-ceramic.

In some embodiments, a glass-ceramic includes silicate-containing glass and crystals of non-stoichiometric tungsten and/or molybdenum suboxides intercalated with dopant cations homogenously distributed within the silicate-containing glass. The glass-ceramic may have transmittance of about 5% per mm or greater over at least one 50 nm-wide wavelength band of light in a range from about 400 nm to about 700 nm. The dopant cations may be H, Li, Na, K, Rb, Cs, Ca, Sr, Ba, Zn, Ag, Au, Cu, Sn, Cd, In, Tl, Pb, Bi, Th, La, Pr, Nd, Sm, Eu, Gd, Dy, Ho, Er, Tm, Yb, Lu, U, Ti, V, Cr, Mn, Fe, Ni, Cu, Pd, Se, Ta, Bi, and/or Ce. In some such embodiments, at least some of the crystals are at a depth of greater than about 10 μm from an exterior surface of the glass-ceramic. The crystals may have rod-like morphology.

In some embodiments, a glass-ceramic includes a silicate-containing glass phase and a crystalline phase comprising suboxides of tungsten and/or molybdenum forming solid state defect structures in which holes are occupied with dopant cations. The volume fraction of the crystalline phase in the glass-ceramic may be from about 0.001% to about 20%.

In other embodiments, a glass-ceramic a silicate-containing glass and crystals of non-stoichiometric titanium suboxides intercalated with dopant cations homogenously distributed within the silicate-containing glass; and/or a silicate-containing glass phase and a crystalline phase comprising suboxides of titanium forming solid state defect structures in which holes are occupied with dopant cations.

In some embodiments, an article includes at least one amorphous phase and one crystalline phase, the article comprising $SiO_2$ as a batch constituent from about 1 mol % to about 95 mol %. The crystalline phase comprises an oxide, from about 0.1 mol % to about 100 mol % of the crystalline phase, of at least one of: (i) W, (ii) Mo, (iii) V and an alkali metal cation, and (iv) Ti and an alkali metal cation. The article may be substantially Cd and Se free.

In still other embodiments, a glass, such as a glass precursor to glass-ceramic, includes in batch constituents $SiO_2$ from about 25 mol % to about 99 mol %, $Al_2O_3$ from about 0 mol % to about 50 mol %, $WO_3$ plus $MoO_3$ from about 0.35 mol % to about 30 mol %, $R_2O$ from about 0.1 mol % to about 50 mol %, where $R_2O$ is one or more of $Li_2O$, $Na_2O$, $K_2O$, $Rb_2O$ and $Cs_2O$, and where $R_2O$ minus $Al_2O_3$ is from about −35 mol % to about 7 mol %. In some such embodiments, at least one of: (i) RO is within a range of from about 0.02 mol % to about 50 mol % and (ii) $SnO_2$ is from about 0.01 mol % to about 5 mol %, wherein RO is one or more of MgO, CaO, SrO, BaO and ZnO. In some such embodiments, if $WO_3$ is from about 1 mol % to about 30 mol %, then the glass further comprises $Fe_2O_3$ of about 0.9 mol % or less, or then $SiO_2$ is from about 60 mol % to about 99 mol %. If $WO_3$ is from about 0.35 mol % to about 1 mol %, then the glass may comprise $SnO_2$ from about 0.01 mol % to about 5.0 mol %. If $MoO_3$ is from about 1 mol % to about 30 mol %, then $SiO_2$ may range from about 61 mol % to about 99 mol %, or then $Fe_2O_3$ may be about 0.4 mol % or less and $R_2O$ is greater than RO. If $MoO_3$ is from about 0.9 mol % to about 30% and $SiO_2$ is from about 30 mol % to about 99 mol %, then the glass may further comprise $SnO_2$ from about 0.01 mol % to about 5 mol %.

In some embodiments, a method of forming a glass-ceramic includes steps of melting together, to form a glass melt, (1) a bound alkali, (2) silica, and (3) tungsten and/or molybdenum; solidifying the glass melt into a glass; and precipitating a crystalline phase within the glass to form the glass-ceramic article. The glass may be a single homogenous, solid phase. The crystalline phase may include the tungsten and/or molybdenum. Further, in some such embodiments, the bound alkali comprises: (A) feldspar, (B) nepheline, (C) sodium borate, (D) spodumene, (E) sodium feldspar, (F) potassium feldspar, (G) alkali-alumino-silicate, (H) alkali silicate, and/or (I) an alkali bonded to (I-i) alumina, (I-ii) boria and/or (I-iii) silica.

In other embodiments, a method of forming a glass-ceramic includes steps of melting together silica and tungsten and/or molybdenum to form a glass melt, solidifying the glass melt to form a glass, and precipitating, within the glass, bronze-type crystals comprising the tungsten and/or molybdenum. Precipitating the crystalline phase may include thermally processing the glass. In at least some such embodiments, the method further includes a step of growing precipitates of the crystalline phase to a length of at least about 1 nm and no more than about 500 nm.

In other embodiments, a glass-ceramic includes a silicate-containing glass phase; and a crystalline phase comprising suboxides of titanium, the suboxides of titanium comprising solid state defect structures in which holes are occupied with dopant cations.

In other embodiments, a glass-ceramic includes an amorphous phase; and a crystalline phase comprising a plurality of precipitates of formula $M_xTiO_2$, where $0<x<1$ and M is a dopant cation.

In other embodiments, a glass-ceramic includes a silicate-containing glass; and a plurality of crystals homogenously distributed within the silicate-containing glass, wherein the crystals comprise non-stoichiometric titanium suboxides, and further wherein the crystals are intercalated with dopant cations.

In other embodiments, a glass-ceramic article, includes at least one amorphous phase and a crystalline phase; and $SiO_2$ from about 1 mol % to about 95 mol %; wherein the crystalline phase comprises a non-stoichiometric titanium suboxide from about 0.1 mol % to about 100 mol % of the crystalline phase, the oxide comprising at least one of: (i) Ti, (ii) V and an alkali metal cation.

In other embodiments, a method of forming a glass-ceramic includes: melting together constituents comprising silica and titanium to form a glass melt; solidifying the glass melt to form a glass, wherein the glass comprises a first average near-infrared absorbance; and precipitating a crystalline phase within the glass to form the glass-ceramic, the glass-ceramic comprising: (a) a second average near-infrared absorbance, wherein a ratio of the second average near-infrared absorbance to the first average near-infrared absorbance is about 1.5 or greater, and (b) an average optical density per mm of about 1.69 or less.

In other embodiments, a glass, comprising in batch constituents: $SiO_2$ from about 1 mol % to about 90 mol %; $Al_2O_3$ from about 0 mol % to about 30 mol %; $TiO_2$ from about 0.25 mol % to about 30 mol %; a metal sulfide from about 0.25 mol % to about 30 mol %; $R_2O$ from about 0 mol % to about 50 mol %, wherein $R_2O$ is one or more of $Li_2O$, $Na_2O$, $K_2O$, $Rb_2O$ and $Cs_2O$; and RO from about 0 mol % to about 50 mol %, wherein RO is one or more of BeO, MgO, CaO, SrO, BaO and ZnO, wherein the glass is substantially Cd free.

These and other features, advantages, and objects of the present disclosure will be further understood and appreciated by those skilled in the art by reference to the following specification, claims, and appended drawings.

BRIEF DESCRIPTION OF THE FIGURES

The accompanying Figures are included to provide a further understanding, and are incorporated in and constitute a part of this specification. The drawings of the Figures illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

Figure 1:
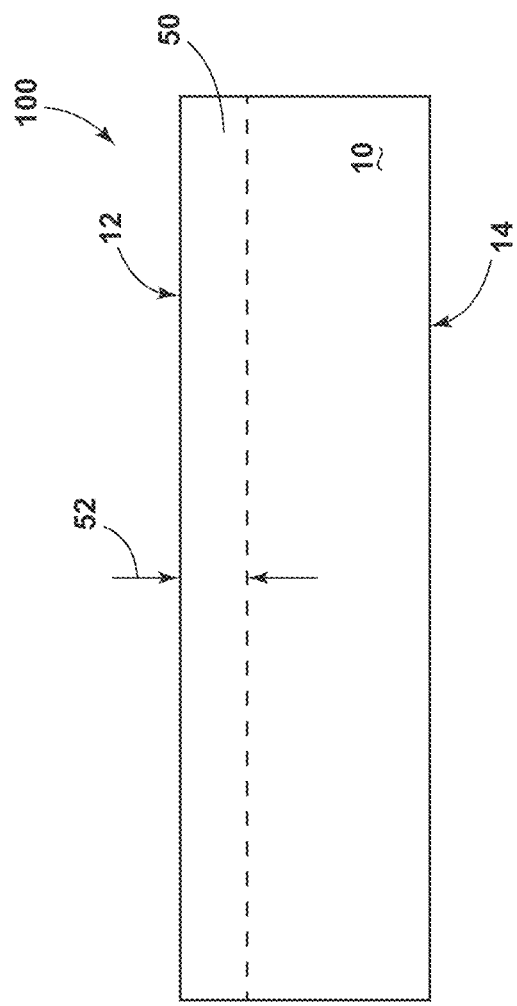
FIG. 1 is a cross-sectional view of an article including a substrate comprising a glass-ceramic composition, according to at least one example of the disclosure.

Before turning to the following Detailed Description and Figures, which illustrate exemplary embodiments in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures or described in the text relating to one of the embodiments may well be applied to other embodiments shown in another of the Figures or described elsewhere in the text.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Directional terms as used herein—for example up, down, right, left, front, back, top, bottom—are made only with reference to the figures as drawn and are not intended to imply absolute orientation.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Unless otherwise specified, all compositions are expressed in terms of as-batched mole percent (mol %). As will be understood by those having ordinary skill in the art, various melt constituents (e.g., fluorine, alkali metals, boron, etc.) may be subject to different levels of volatilization (e.g., as a function of vapor pressure, melt time and/or melt temperature) during melting of the constituents. As such, the term "about," in relation to such constituents, is intended to encompass values within about 0.2 mol % when measuring final articles as compared to the as-batched compositions provided herein. With the forgoing in mind, substantial compositional equivalence between final articles and as-batched compositions is expected.

For purposes of this disclosure, the terms "bulk," "bulk composition" and/or "overall compositions" are intended to include the overall composition of the entire article, which may be differentiated from a "local composition" or "localized composition" which may differ from the bulk composition owing to the formation of crystalline and/or ceramic phases.

As also used herein, the terms "article," "glass-article," "ceramic-article," "glass-ceramics," "glass elements," "glass-ceramic article" and "glass-ceramic articles" may be used interchangeably, and in their broadest sense, to include any object made wholly or partly of glass and/or glass-ceramic material.

As used herein, a "glass state" refers to an inorganic amorphous phase material within the articles of the disclosure that is a product of fusion that has cooled to a rigid condition without crystallizing. As used herein, a "glass-ceramic state" refers to an inorganic material within the articles of the disclosure which includes both the glass state and a "crystalline phase" and/or "crystalline precipitates" as described herein.

Coefficients of thermal expansion (CTE) are expressed in terms of $10^{-7}/°$ C. and represent a value measured over a temperature range from about 0° C. to about 300° C. unless otherwise specified.

As used herein, "transmission" and "transmittance" refer to external transmission or transmittance, which takes absorption, scattering and reflection into consideration. Fresnel reflection is not factored out of the transmission and transmittance values reported herein.

As used herein, "optical density units", "OD" and "OD units" are used interchangeably in the disclosure to refer to optical density units, as commonly understood as a measure of absorbance of the material tested, as measured with a spectrometer given by OD=$-\log (I/I_0)$ where $I_0$ is the intensity of light incident on the sample and I is the intensity of light that is transmitted through the sample. Further, the terms "OD/mm" or "OD/cm" used in this disclosure are normalized measures of absorbance, as determined by dividing the optical density units (i.e., as measured by an optical spectrometer) by the thickness of the sample (e.g., in units of millimeters or centimeters). In addition, any optical density units referenced over a particular wavelength range (e.g., 3.3 OD/mm to 24.0 OD/mm in UV wavelengths from 280 nm to 380 nm) are given as an average value of the optical density units over the specified wavelength range.

As used herein, the term "haze" refers to the percentage of transmitted light scattered outside an angular cone of ±2.5° in a sample having a transmission path of about 1 mm and measured in accordance with ASTM procedure D1003.

As also used herein, the term "[constituent]-free [glass or glass-ceramic]" (e.g., "cadmium and selenium-free glass-ceramic"), is indicative of a glass or a glass-ceramic that is completely free, or substantially free (i.e., <500 ppm), of the listed constituent(s) and is prepared such that the listed constituent(s) are not actively, intentionally or purposefully added or batched into the glass or glass-ceramic.

As it relates to the glass-ceramic and glass-ceramic materials and articles of the disclosure, compressive stress and depth of compression ("DOC") are measured by evaluating surface stress using commercially available instruments, such as the scattered light polariscope SCALP220 and accompanying software version 5 manufactured by GlasStress, Ltd. (Tallinn, Estonia), or the FSM-6000, manufactured by Orihara Co., Lt. (Tokyo, Japan), unless otherwise noted herein. Both instruments measure optical retardation which must be converted to stress via the stress optic coefficient ("SOC") of the material being tested. Thus, stress measurements rely upon the accurate measurement of the SOC, which is related to the birefringence of the glass. SOC in turn is measured according to a modified version of Procedure C, which is described in ASTM standard C770-98 (2013) ("modified Procedure C"), entitled "Standard Test Method for Measurement of Glass Stress-Optical Coefficient," the contents of which is incorporated herein by reference in its entirety. The modified Procedure C includes using a glass or glass-ceramic disc as the specimen having a thickness of 5 to 10 mm and a diameter of 12.7 mm. The disc is isotropic and homogeneous, and is core-drilled with both faces polished and parallel. The modified Procedure C also includes calculating the maximum force, Fmax, to be applied to the disc. The force should be sufficient to produce at least 20 MPa compression stress. Fmax is calculated using the equation:

$$F\max = 7.854 * D * h$$

where Fmax is the maximum force (N), D is the diameter of the disc (mm), and h is the thickness of the light path (mm). For each force applied, the stress is computed using the equation:

$$\sigma \text{ (MPa)} = 8F/(\pi * D * h)$$

where F is the force (N), D is the diameter of the disc (mm), and h is the thickness of the light path (mm).

As also used herein, the terms "sharp cutoff wavelength" and "cutoff wavelength" are used interchangeably and refer to a cutoff wavelength within a range of about 350 nm to 800 nm in which the glass-ceramic has a substantially higher transmittance above the cutoff wavelength ($\lambda c$) in comparison to its transmittance below the cutoff wavelength ($\lambda c$). The cutoff wavelength ($\lambda c$) is the wavelength at the midpoint between an "absorption limit wavelength" and a "high transmittance limit wavelength" in the given spectra for the glass-ceramic. The "absorption limit wavelength" is specified as the wavelength in which the transmittance is 5%; and in the "high transmittance wavelength" is defined as the wavelength in which the transmittance is 72%. It will be understood that a "sharp UV cutoff" as used herein may be a sharp cutoff wavelength of cutoff wavelength as described above which occurs within the ultraviolet band of the electromagnetic spectrum.

Articles of the present disclosure are composed of glass and/or glass-ceramics having one or more of the compositions outlined herein. The article can be employed in any number of applications. For example, the article can be employed in the form of substrates, elements, lenses, covers and/or other elements in any number of optics related and/or aesthetic applications.

The article is formed from an as-batched composition and is cast in a glass state. The article may later be annealed and/or thermally processed (e.g., heat treated) to form a glass-ceramic state having a plurality of ceramic or crystalline particles. It will be understood that depending on the casting technique employed, the article may readily crystallize and become a glass-ceramic without additional heat treatment (e.g., essentially be cast into the glass-ceramic state). In examples where a post-forming thermal processing is employed, a portion, a majority, substantially all or all of the article may be converted from the glass state to the glass-ceramic state. As such, although compositions of the article may be described in connection with the glass state and/or the glass-ceramic state, the bulk composition of the article may remain substantially unaltered when converted between the glass and glass-ceramic states, despite localized portions of the article have different compositions (i.e., owing to the formation of the ceramic or crystalline precipitates).

According to various examples, the article may include $Al_2O_3$, $SiO_2$, $B_2O_3$, $WO_3$, $MO_3$, $R_2O$ where $R_2O$ is one or more of $Li_2O$, $Na_2O$, $K_2O$, $Rb_2O$ and $Cs_2O$, RO where RO is one or more of MgO, CaO, SrO, BaO and ZnO and a number of dopants. It will be understood that a number of other constituents (e.g., F, As, Sb, Ti, P, Ce, Eu, La, Cl, Br, etc.) without departing from the teachings provided herein.

According to a first example, the article may include $SiO_2$ from about 58.8 mol % to about 77.58 mol %, $Al_2O_3$ from about 0.66 mol % to about 13.69 mol %, $B_2O_3$ from about 4.42 mol % to about 27 mol %, $R_2O$ from about 0 mol % to about 13.84 mol %, RO from about 0 mol % to about 0.98 mol %, $WO_3$ from about 1.0 mol % to about 13.24 mol % and $SnO_2$ from about 0 mol % to about 0.4 mol %. Such examples of the article may be generally related to Examples 1-109 of Table 1.

According to a second example, the article may include $SiO_2$ from about 65.43 mol % to about 66.7 mol %, $Al_2O_3$ from about 9.6 mol % to about 9.98 mol %, $B_2O_3$ from about 9.41 mol % to about 10.56 mol %, $R_2O$ from about 6.47 mol % to about 9.51 mol %, RO from about 0.96 mol % to about 3.85 mol %, $WO_3$ from about 1.92 mol % to about 3.85 mol %, $MoO_3$ from about 0 mol % to about 1.92 mol % and $SnO_2$ from about 0 mol % to about 0.1 mol %. Such examples of the article may be generally related to Examples 110-122 of Table 2.

According to a third example, the article may include $SiO_2$ from about 60.15 mol % to about 67.29 mol %, $Al_2O_3$ from about 9.0 mol % to about 13.96 mol %, $B_2O_3$ from about 4.69 mol % to about 20 mol %, $R_2O$ from about 2.99 mol % to about 12.15 mol %, RO from about 0.00 mol % to about 0.14 mol %, $WO_3$ from about 0 mol % to about 7.03 mol %, $MoO_3$ from about 0 mol % to about 8.18 mol %, $SnO_2$ from about 0.05 mol % to about 0.15 mol % and $V_2O_5$ from about 0 mol % to about 0.34 mol %. Such examples of the article may be generally related to Examples 123-157 of Table 3.

According to a fourth example, the article may include $SiO_2$ from about 54.01 mol % to about 67.66 mol %, $Al_2O_3$ from about 9.55 mol % to about 11.42 mol %, $B_2O_3$ from about 9.36 mol % to about 15.34 mol %, $R_2O$ from about 9.79 mol % to about 13.72 mol %, RO from about 0.00 mol % to about 0.22 mol %, $WO_3$ from about 1.74 mol % to about 4.48 mol %, $MoO_3$ from about 0 mol % to about 1.91 mol %, $SnO_2$ from about 0.0 mol % to about 0.21 mol %, $V_2O_5$ from about 0 mol % to about 0.03 mol %, Ag from about 0 mol % to about 0.48 mol % and Au from about 0 mol % to about 0.01 mol %. Such examples of the article may be generally related to Examples 158-311 of Table 4.

According to a fifth example, the article may include $SiO_2$ from about 60.01 mol % to about 77.94 mol %, $Al_2O_3$ from about 0.3 mol % to about 10.00 mol %, $B_2O_3$ from about 10 mol % to about 20 mol %, $R_2O$ from about 0.66 mol % to about 10 mol %, $WO_3$ from about 1.0 mol % to about 6.6 mol % and $SnO_2$ from about 0.0 mol % to about 0.1 mol %. Such examples of the article may be generally related to Examples 312-328 of Table 5.

The article may have from about 1 mol % to about 99 mol % $SiO_2$, or from about 1 mol % to about 95 mol % $SiO_2$, or from about 45 mol % to about 80 mol % $SiO_2$, or from about 60 mol % to about 99 mol % $SiO_2$, or from about 61 mol % to about 99 mol % $SiO_2$, or from about 30 mol % to about 99 mol % $SiO_2$, or from about 58 mol % to about 78 mol % $SiO_2$, or from about 55 mol % to about 75 mol % $SiO_2$, or from about 50 mol % to about 75 mol % $SiO_2$, or from about 54 mol % to about 68 mol % $SiO_2$, or from about 60 mol % to about 78 mol % $SiO_2$, or from about 65 mol % to about 67 mol % $SiO_2$, or from about 60 mol % to about 68 mol % $SiO_2$, or from about 56 mol % to about 72 mol % $SiO_2$, or from about 60 mol % to about 70 mol % $SiO_2$. It will be understood that any and all values and ranges between the above noted ranges of $SiO_2$ are contemplated. $SiO_2$ may serve as the primary glass-forming oxide and affect the stability, resistance to devitrification and/or viscosity of the article.

The article may include from about 0 mol % to about 50 mol % $Al_2O_3$, or from about 0.5 ml % to about 20 mol % $Al_2O_3$, or from about 0.5 mol % to about 15 mol % $Al_2O_3$, or from about 7 mol % to about 15 mol % $Al_2O_3$, or from about 0.6 mol % to about 17 mol % $Al_2O_3$, or from about 0.6 mol % to about 14 mol % $Al_2O_3$, or from about 7 mol % to about 14 mol % $Al_2O_3$, or from about 9.5 mol % to about 10 mol % $Al_2O_3$, or from about 9 mol % to about 14 mol % $Al_2O_3$, about 9.5 mol % to about 11.5 mol % $Al_2O_3$, or from about 0.3 mol % to about 10 mol % $Al_2O_3$, or from about 0.3 mol % to about 15 mol % $Al_2O_3$, or from about 2 mol % to about 16 mol % $Al_2O_3$, or from about 5 mol % to about 12 mol % $Al_2O_3$, or from about 8 mol % to about 12 mol % $Al_2O_3$, or from about 5 mol % to about 10 mol % $Al_2O_3$. It will be understood that any and all values and ranges between the above noted ranges of $Al_2O_3$ are contemplated. $Al_2O_3$ may function as a conditional network former and contributes to a stable article with low CTE, article rigidity, and to facilitate melting and/or forming.

The article may include $WO_3$ and/or $MoO_3$. For example, $WO_3$ plus $MoO_3$ may be from about 0.35 mol % to about 30 mol %. $MoO_3$ may be about 0 mol % and $WO_3$ is from about 1.0 mol % to about 20 mol %, or $MoO_3$ may be about 0 mol % and $WO_3$ is from about 1.0 mol % to about 14 mol %, or $MoO_3$ is from about 0 mol % to about 8.2 mol % and $WO_3$ is from about 0 mol % to about 16 mol %, or $MoO_3$ is from about 0 mol % to about 8.2 mol % and $WO_3$ is from about 0 mol % to about 9 mol %, or $MoO_3$ is from about 1.9 mol % to about 12.1 mol % and $WO_3$ is from about 1.7 mol % to about 12 mol %, or $MoO_3$ is from about 0 mol % to about 8.2 mol % and $WO_3$ is from about 0 mol % to about 7.1 mol %, or $MoO_3$ is from about 1.9 mol % to about 12.1 mol % and $WO_3$ is from about 1.7 mol % to about 4.5 mol %, or $MoO_3$ is about 0 mol % and $WO_3$ is from about 1.0 mol % to about 7.0 mol %. With respect to $MoO_3$, the glass composition may have from about 0.35 mol % to about 30 mol % $MoO_3$, or from about 1 mol % to about 30 mol % $MoO_3$, or from about 0.9 mol % to about 30% $MoO_3$, or from about 0.9 mol % to about 20% $MoO_3$, or from about 0 mol % to about 1.0 mol % $MoO_3$, or from about 0 mol % to about 0.2 mol % $MoO_3$. With respect to $WO_3$, the glass composition may have from about 0.35 mol % to about 30 mol % $WO_3$, or from about 1 mol % to about 30 mol % $WO_3$, or from about 1 mol % to about 17 mol % $WO_3$, or from about 1.9 mol % to about 10 mol % $WO_3$, or from about 0.35 mol % to about 1 mol % $WO_3$, or from about 1.9 mol % to about 3.9 mol % $WO_3$, or from about 2 mol % to about 15 mol % $WO_3$, or from about 4 mol % to about 10 mol % of $WO_3$, or from about 5 mol % to about 7 mol % $WO_3$. It will be understood that any and all values and ranges between the above noted ranges of $WO_3$ and/or $MoO_3$ are contemplated.

The article may include from about 2 mol % to about 40 mol % of $B_2O_3$, or from about 4 mol % to about 40 mol % of $B_2O_3$, or from about 4.0 mol % to about 35 mol % $B_2O_3$, or from about 4.0 mol % to about 27 mol % $B_2O_3$, or from about 5.0 mol % to about 25 mol % $B_2O_3$, or from about 9.4 mol % to about 10.6 mol % $B_2O_3$, or from about 5 mol % to about 20 mol % $B_2O_3$, or from about 4.6 mol % to about 20 mol % $B_2O_3$, or from about 9.3 mol % to about 15.5 mol % $B_2O_3$, or from about 10 mol % to about 20 mol % $B_2O_3$, or from about 10 mol % to about 25 mol % $B_2O_3$. It will be understood that any and all values and ranges between the above noted ranges of $B_2O_3$ are contemplated. $B_2O_3$ may be a glass-forming oxide that is used to reduce CTE, density, and viscosity making the article easier to melt and form at low temperatures.

The article may include at least one alkali metal oxide. The alkali metal oxide may be represented by the chemical formula $R_2O$ where $R_2O$ is one or more of $Li_2O$, $Na_2O$, $K_2O$, $Rb_2O$, $Cs_2O$ and/or combinations thereof. The article may have an alkali metal oxide composition of from about 0.1 mol % to about 50 mol % $R_2O$, or from about 0 mol % to about 14 mol % $R_2O$, or from about 3 mol % to about 14 mol % $R_2O$, or from about 5 mol % to about 14 mol % $R_2O$, or from about 6.4 mol % to about 9.6 mol % $R_2O$, or from about 2.9 mol % to about 12.2 mol % $R_2O$, or from about 9.7 mol % to about 12.8 mol % $R_2O$, or from about 0.6 mol % to about 10 mol % $R_2O$, or from about 0 mol % to about 15 mol % $R_2O$, or from about 3 mol % to about 12 mol % $R_2O$, or from about 7 mol % to about 10 mol % $R_2O$. It will be understood that any and all values and ranges between the above noted ranges of $R_2O$ are contemplated. Alkali oxides (e.g., $Li_2O$, $Na_2O$, $K_2O$, $Rb_2O$, and $Cs_2O$) may be incorporated into the article for multiple reasons including: (i) reducing the melting temperature, (ii) increasing formability, (iii) enabling chemical strengthening by ion exchange and/or (iv) as a specie to partition into certain crystallites.

According to various examples, $R_2O$ minus $Al_2O_3$ ranges from about from about −35 mol % to about 7 mol %, or from about −12 mol % to about 2.5 mol %, or from about −6% to about 0.25%, or from about −3.0 mol % to about 0 mol %. It will be understood that any and all values and ranges between the above noted ranges of $R_2O$ minus $Al_2O_3$ are contemplated.

The article may include at least one alkaline earth metal oxide. The alkaline earth metal oxide may be represented by the chemical formula RO where RO is one or more of MgO, CaO, SrO, BaO and ZnO. The article may include RO from about 0.02 mol % to about 50 mol % RO, or from about 0.01 mol % to about 5 mol % RO, or from about 0.02 mol % to about 5 mol % RO, or from about 0.05 mol % to about 10 mol % RO, or from about 0.10 mol % to about 5 mol % RO, or from about 0.15 mol % to about 5 mol % RO, or from about 0.05 mol % to about 1 mol % RO, or from about 0.5 mol % to about 4.5 mol % RO, or from about 0 mol % to about 1 mol % RO, or from about 0.96 mol % to about 3.9 mol % RO, or from about 0.2 mol % to about 2 mol % RO, or from about 0.01 mol % to about 0.5 mol % RO, or from about 0.02 mol % to about 0.22 mol % RO. It will be understood that any and all values and ranges between the above noted ranges of RO are contemplated. According to various examples, $R_2O$ may be greater than RO. Further, the article may be free of RO. Alkaline earth oxides (e.g., MgO, CaO, SrO, and BaO) and other divalent oxides such as ZnO may improve the melting behavior of the article and can also act to increase CTE, Young's modulus, and shear modulus of the article.

The article may include from about 0.01 mol % to about 5 mol % of $SnO_2$, or from about 0.01 mol % to about 0.5 mol % of $SnO_2$, or from about 0.05 mol % to about 0.5 mol % $SnO_2$, or from about 0.05 mol % to about 2 mol % $SnO_2$, or from about 0.04 mol % to about 0.4 mol % $SnO_2$, or from about 0.01 mol % to about 0.4 mol % $SnO_2$, or from about 0.04 mol % to about 0.16 mol % $SnO_2$, or from about 0.01 mol % to about 0.21 mol % $SnO_2$, or from about 0 mol % to about 0.2 mol % $SnO_2$, or from about 0 mol % to about 0.1 mol % $SnO_2$. It will be understood that any and all values and ranges between the above noted ranges of $SnO_2$ are contemplated. The article may also include $SnO_2$ as a fining agent (e.g., other fining agents may include $CeO_2$, $As_2O_3$, $Sb_2O_3$, Cl—, F— or the like) in small concentrations to aid in the elimination of gaseous inclusions during melting. Certain fining agents may also act as redox couples, color centers, and or species that nucleate and or intercalate into crystallites formed in the article.

The composition of certain constituents of the article may depend on the presence and/or composition of other constituents. For example, if $WO_3$ is from about 1 mol % to about 30 mol %, the article further includes $Fe_2O_3$ of about 0.9 mol % or less or $SiO_2$ is from about 60 mol % to about 99 mol %. In another example, if $WO_3$ is from about 0.35 mol % to about 1 mol %, the article includes $SnO_2$ from about 0.01 mol % to about 5.0 mol %. In another example, if $MoO_3$ is from about 1 mol % to about 30 mol %, $SiO_2$ is from about 61 mol % to about 99 mol % or $Fe_2O_3$ is about 0.4 mol % or less and $R_2O$ is greater than RO. In another example, if $MoO_3$ is from about 0.9 mol % to about 30% and $SiO_2$ is from about 30 mol % to about 99 mol %, the article includes $SnO_2$ from about 0.01 mol % to about 5 mol %.

The article may be substantially cadmium and substantially selenium free. According to various examples, the article can further include at least one dopant selected from the group consisting of Ti, V, Cr, Mn, Fe, Ni, Cu, Pb, Pd, Au, Cd, Se, Ta, Bi, Ag, Ce, Pr, Nd, and Er to alter the ultraviolet, visual, color and/or near-infrared absorbance. The dopants may have concentration of from about 0.0001 mol % to about 1.0 mol % within the article. For example, the article may include at least one of Ag from about 0.01 mol % to about 0.48 mol %, Au from about 0.01 mol % to about 0.13 mol %, $V_2O_5$ from about 0.01 mol % to about 0.03 mol %, $Fe_2O_3$ from about 0 mol % to about 0.2 mol %, $Fe_2O_3$ from about 0 mol % to about 0.2 mol %, and CuO from about 0.01 mol % to about 0.48 mol %. According to another example, the article may include at least one of Ag from about 0.01 mol % to about 0.75 mol %, Au from about 0.01 mol % to about 0.5 mol %, $V_2O_5$ from about 0.01 mol % to about 0.03 mol %, and CuO from about 0.01 mol % to about 0.75 mol %. The article may include fluorine in the range of about 0 mol % to about 5 mol % to soften the glass. The article may include phosphorus from about 0 mol % to about 5 mol % to further modify physical properties of the article and modulate crystal growth. The article may include $Ga_2O_3$, $In_2O_3$ and/or $GeO_2$ to further modify physical and optical (e.g., refractive index) properties of the article. The following trace impurities may be present in the range of about 0.001 mol % to about 0.5 mol % to further modify the ultraviolet, visible (e.g., 390 nm to about 700 nm), and near-infrared (e.g., about 700 nm to about 2500 nm) absorbance and/or make the article fluoresce: Ti, V, Cr, Mn, Fe, Co, Ni, Cu, Se, Nb, Mo, Tc, Ru, Rh, Pd, Ag, Cd, Te, Ta, Re, Os, Ir, Pt, Au, Ti, Pb, Bi, Ce, Pr, Nd, Sm, Eu, Gd, Tb, Dy, Ho, Er, Tm, Yb, and Lu. Further, small additions of $P_2O_5$ may be made to certain compositions to further modify the physical properties and viscosity of the article.

It will be understood that each of the above noted compositions and composition ranges for $SiO_2$, $Al_2O_3$, $WO_3$, $MoO_3$, $WO_3$ plus $MoO_3$, $B_2O_3$, $R_2O$, RO, $V_2O_5$, Ag, Au, CuO, $SnO_2$, and dopants may be used with any other composition and/or composition range of the other constituents of the article as outlined herein.

As explained above, conventional formation of tungsten, molybdenum, or mixed tungsten-molybdenum containing alkali glasses has been hampered by the separation of the melt constituents during the melting process. The separation of the glass constituents during the melting process resulted in a perceived solubility limit of alkali tungstate within the molten glass, and therefore of articles cast from such melts. Conventionally, when a tungsten, molybdenum, or mixed tungsten-molybdenum melt was even slightly peralkaline (e.g., $R_2O$—$Al_2O_3$=about 0.25 mol % or greater), the melted borosilicate glass formed both a glass and a dense liquid second phase. While the concentration of the alkali tungstate second phase could be reduced by thorough mixing, melting at a high temperature, and employing a small batch size (~1000 g), it could not be fully eliminated leading to a deleterious second crystalline phase forming. It is believed that the formation of this alkali tungstate phase occurs in the initial stages of the melt, where tungsten and/or molybdenum oxide reacts with "free" or "unbound" alkali carbonates. Due to the high density of alkali tungstate and/or alkali molybdate relative to the borosilicate glass that is formed, it rapidly segregates and/or stratifies, pooling at the bottom of the crucible and does not rapidly solubilize in the glass due to the significant difference in density. As the $R_2O$ constituents may provide beneficial properties to the glass composition, simply decreasing the presence of the $R_2O$ constituents within the melt may not be desirable.

It has been discovered by the inventors of the present disclosure that a homogenous single-phase W or Mo-containing peralkaline melt may be obtained through the use of "bound" alkalis. For purposes of this disclosure, "bound" alkalis are alkali elements which are bonded to alumina, boria and/or silica while "free" or "unbound" alkalis are alkali carbonates, alkali nitrates and/or alkali sulfates in which the alkali are not bound to silica, boria or alumina. Exemplary bound alkalis may include feldspar, nepheline, borax, spodumene, other sodium or potassium feldspars, alkali-alumino-silicates, alkali silicates and/or other naturally occurring and artificially created minerals containing an alkali and one or more aluminum, boron and/or silicon atoms. By introducing the alkali in the bound form, the alkalis may not react with the W or Mo present in the melt to form the dense alkali tungstate and/or alkali molybdate liquid. Moreover, this change in batch material may allow the melting of strongly peralkaline compositions (e.g., $R_2O$—$Al_2O_3$=about 2.0 mol % or more) without the formation of any alkali tungstate and/or alkali molybdate second phase. This has also allowed melt temperature and mixing method to be varied and still produce a single-phase homogenous glass. It will be understood that as the alkali tungstate phase and the borosilicate glass are not completely immiscible, prolonged stirring may also allow mixing of the two phases to cast a single phase article.

Once the glass melt is cast and solidified into the glass state article, the article may be annealed, heat treated or otherwise thermally processed to form the crystalline phase within the article. Accordingly, the article may be transformed from the glass state to the glass-ceramic state. The crystalline phase of the glass-ceramic state may take a variety of morphologies. According to various examples, the crystalline phase is formed as a plurality of precipitates within the heat treated region of the article. As such, the precipitates may have a generally crystalline structure.

As used herein, "a crystalline phase" refers to an inorganic material within the articles of the disclosure that is a solid composed of atoms, ions or molecules arranged in a pattern that is periodic in three dimensions. Further, "a crystalline phase" as referenced in this disclosure, unless expressly noted otherwise, is determined to be present using the following method. First, powder x-ray diffraction ("XRD") is employed to detect the presence of crystalline precipitates. Second, Raman spectroscopy ("Raman") is employed to detect the presence of crystalline precipitates in the event that XRD is unsuccessful (e.g., due to size, quantity and/or chemistry of the precipitates). Optionally, transmission electron microscopy ("TEM") is employed to visually confirm or otherwise substantiate the determination of crystalline precipitates obtained through the XRD and/or Raman techniques. In certain circumstances, the quantity and/or size of the precipitates may be low enough that visual confirmation of the precipitates proves particularly difficult. As such, the larger sample size of XRD and Raman may be advantageous in sampling a greater quantity of material to determine the presence of the precipitates.

The crystalline precipitates may have a generally rod-like or needle-like morphology. The precipitates may have a longest length dimension of from about 1 nm to about 500 nm, or from about 1 nm to about 400 nm, or from about 1 nm to about 300 nm, or from about 1 nm to about 250 nm, or from about 1 nm to about 200 nm, or from about 1 nm to about 100 nm, or from about 1 nm to about 75 nm, or from about 1 nm to about 50 nm, or from about 1 nm to about 25 nm or from about 1 nm to about 20 nm or from about 1 nm to about 10 nm. The size of the precipitates may be measured using Electron Microscopy. For purposes of this disclosure, the term "Electron Microscopy" means visually measuring the longest length of the precipitates first by using a scanning electron microscope, and if unable to resolve the precipitates, next using a transmission electron microscope. As the crystalline precipitates may generally have a rod-like or needle-like morphology, the precipitates may have a width of from about 2 nm to about 30 nm, or from about 2 nm to about 10 nm or from about 2 nm to about 7 nm. It will be understood that the size and/or morphology of the precipitates may be uniform, substantially uniform or may vary. Generally, peraluminous compositions of the article may produce precipitates having a needle-like shape with a length of from about 100 nm to about 250 nm and a width of from about 5 nm to about 30 nm. Peralkaline compositions of the article may produce needle-like precipitates having a length of from about 10 nm to about 30 nm and a width of from about 2 nm to about 7 nm. Ag, Au and/or Cu containing examples of the article may produce rod-like precipitates having a length of from about 2 nm to about 20 nm and a width, or diameter, of from about 2 nm to about 10 nm. A volume fraction of the crystalline phase in the article may range from about 0.001% to about 20%, or from about 0.001% to about 15%, or from about 0.001% to about 10% or from about 0.001% to about 5%, or from about 0.001% to about 1%.

The relatively small size of the precipitates may be advantageous in reducing the amount of light scattered by the precipitates leading to high optical clarity of the article when in the glass-ceramic state. As will be explained in greater detail below, the size and/or quantity of the precipitates may be varied across the article such that different portions of the article may have different optical properties. For example, portions of the article where the precipitates are present may lead to changes in the absorbance, color, reflectance and/or transmission of light, as well as the refractive index as compared to portions of the article where different precipitates (e.g., size and/or quantity) and/or no precipitates are present.

The precipitates may be composed of tungsten oxide and/or molybdenum oxide. The crystalline phase includes an oxide, from about 0.1 mol % to about 100 mol % of the crystalline phase, of at least one of: (i) W, (ii) Mo, (iii) V and an alkali metal cation, and (iv) Ti and an alkali metal cation. Without being bound by theory, it is believed that during thermal processing (e.g., heat treating) of the article, tungsten and/or molybdenum cations agglomerate to form crystalline precipitates thereby transforming the glass state into the glass-ceramic state. The molybdenum and/or tungsten present in the precipitates may be reduced, or partially reduced. For example, the molybdenum and/or tungsten within the precipitates may have an oxidation state of between 0 and about +6. According to various examples, the molybdenum and/or tungsten may have a +6 oxidation state. For example, the precipitates may have the general chemical structure of $WO_3$ and/or $MoO_3$. However, there can also be a significant fraction of tungsten and or molybdenum in the +5 oxidation state and the precipitates may be known as non-stoichiometric tungsten suboxides, non-stoichiometric molybdenum suboxides, "molybdenum bronzes" and/or "tungsten bronzes." One or more of the above-noted alkali metals and/or dopants may be present within the precipitates to compensate the +5 charge on the W or Mo. Tungsten and/or molybdenum bronzes are a group of non-stoichiometric tungsten and/or molybdenum suboxides that takes the general chemical form of $M_xWO_3$ or $M_xMoO_3$, where M=one or more of H, Li, Na, K, Rb, Cs, Ca, Sr, Ba, Zn, Ag, Au, Cu, Sn, Cd, In, Tl, Pb, Bi, Th, La, Pr, Nd, Sm, Eu, Gd, Dy, Ho, Er, Tm, Yb, Lu, and/or U, and where $0<x<1$. The structures $M_xWO_3$ and $M_xMoO_3$ are considered to be a solid state defect structure in which holes (i.e. vacancies or channels in crystal lattice) in a reduced $WO_3$ or $MoO_3$ network are randomly occupied by M atoms, which are dissociated into M+ cations and free electrons. Depending on the concentration of "M," the material properties can range from metallic to semi-conducting, thereby allowing a variety of optical absorption and electronic properties to be tuned. The more 5+W or Mo, the more M+ cations may be needed to compensate and the greater the value of x.

Tungsten bronzes are non-stoichiometric compounds generally of formula $M_xWO_3$, where M is a cation dopant, such as some other metal, most commonly an alkali, and x is a variable less than 1. For clarity, though called a 'bronze', these compounds are not structurally or chemically related to metallic bronze, which is an alloy of copper and tin. Tungsten bronzes are a spectrum of solid phases where homogeneity varies as a function of x. Depending on dopant M and corresponding concentration x, material properties of a tungsten bronze may range from metallic to semi-conducting, and exhibit tunable optical absorption. The structure of these bronzes is a solid-state defect structure in which M' cations intercalate into holes or channels of binary oxide hosts and disassociate into M+ cations and free electrons.

For clarity, $M_xWO_3$ is a naming convention for a complex system of non-stoichiometric or 'sub-stoichiometric' compounds, with varying crystal structures that can be hexagonal, tetragonal, cubic, or pyrochlore, where M can one or a combination of certain elements on the periodic table, where x varies from $0<x<1$, where the oxidation state of the bronze forming specie (in this case W) is a mixture of the specie in its highest oxidation state ($W^{6+}$) and a lower oxidation state (e.g., $W^{5+}$), and where the number three ("3") in $WO_3$ represents the number of oxygen anions that may be between 2 and 3. Accordingly, $M_xWO_3$ may alternatively be expressed as the chemical form $M_xWO_z$, where $0<x<1$, and $2<z<3$, or as $M_xWO_{3-z}$ where $0<x<1$ and $0<z<1$. However, for brevity, $M_xWO_3$ is utilized for this family of non-stoichiometric crystals. Similarly, 'bronze' in general applies to a ternary metal oxide of formula $M'_xM''_yO_z$ where (i) M'' is a transition metal, (ii) $M''_yO_z$ is its highest binary oxide, (iii) M' is some other metal, (iv) x is a variable falling in the range $0<x<1$.

A portion, a majority, substantially all or all of the article may be thermally processed to form the precipitates. Thermal processing techniques may include, but are not limited to, a furnace (e.g., a heat treating furnace), a microwave, a laser and/or other techniques of locally and/or bulk heating of the article. While undergoing thermal processing, the crystalline precipitates internally nucleate within the article in a homogenous manner where the article is thermally processed to transform the glass state into the glass-ceramic state. As such, in some examples, the article may include both the glass state and the glass-ceramic state. In examples where the article is thermally processed in bulk (e.g., the whole article is placed in a furnace), the precipitates may homogenously form throughout the article. In other words, the precipitates may exist from an exterior surface of the article throughout the bulk of the article (i.e., greater than about 10 μm from the surface). In examples where the article is thermally processed locally (e.g., via a laser), the precipitates may only be present where the thermal processing reaches a sufficient temperature (e.g., at the surface and into the bulk of the article proximate the heat source). It will be understood that the article may undergo more than one thermal processing to produce the precipitates. Additionally or alternatively, thermal processing may be utilized to remove and/or alter precipitates which have already been formed (e.g., as a result of previous thermal processing). For example, thermal processing may result in the decomposition of precipitates.

According to various examples, the article may be optically transparent in the visible region of the electromagnetic spectrum (i.e., from about 400 nm to about 700 nm) both where the precipitates are present and where the precipitates are not present (i.e., in portions which are in the glass state or the glass-ceramic state). As used herein, the term "optically transparent" refers to a transmittance of greater than about 1% over a 1 mm path length (e.g., in units of %/mm) over at least one 50 nm-wide wavelength band of light in a range from about 400 nm to about 700 nm. In some examples, the article has a transmittance of about 5%/mm or greater, about 10%/mm or greater, about 15%/mm or greater, about 20%/mm or greater, about 25%/mm or greater, about 30%/mm or greater, about 40%/mm or greater, about 50%/mm or greater, about 60%/mm or greater, about 70%/mm or greater, about 80%/mm or greater and greater than all lower limits between these values, all over at least one 50 nm-wide wavelength band of light in the visible region of the spectrum.

According to various examples, the glass-ceramic state of the article absorbs light in the ultraviolet ("UV") region (i.e., wavelengths of less than about 400 nm) based on the presence of the precipitates without the use of additional coatings or films. In some implementations, the glass-ceramic state of the article is characterized by a transmittance of less than 10%/mm, less than 9%/mm, less than 8%/mm, less than 7%/mm, less than 6%/mm, less than 5%/mm, less than 4%/mm, less than 3%/mm, less than 2%/mm, and even less than 1%/mm, for light in at least one 50 nm-wide wavelength band of light in the UV region of the spectrum (e.g., about 200 nm to about 400 nm). In some examples, the glass-ceramic state absorbs or has an absorption of at least 90%/mm, at least 91%/mm, at least 92%/mm, at least 93%/mm, at least 94%/mm, at least 95%/mm, at least 96%/mm, at least 97%/mm, at least 98%/mm, or even at least 99%/mm for light in at least one 50 nm-wide wavelength band of light in the UV region of the spectrum. The glass-ceramic state may have a sharp UV cutoff wavelength from about 320 nm to about 420 nm. For example, the glass-ceramic state may have a sharp UV cutoff at about 320 nm, about 330 nm, about 340 nm, about 350 nm, about 360 nm, about 370 nm, about 380 nm, about 390 nm, about 400 nm, about 410 nm, about 420 nm, about 430 nm or any value therebetween.

In some examples, the glass-ceramic state of the article has a transmittance of greater than about 5%/mm, greater than about 10%/mm, greater than about 15%/mm, greater than about 20%/mm, greater than about 25%/mm, greater than about 30%/mm, greater than about 40%/mm, greater than about 50%/mm, greater than about 60%/mm, greater than about 70%/mm, greater than about 80%/mm, greater than about 90%/mm and greater than all lower limits between these values, all over at least one 50 nm-wide wavelength band of light in the near-infrared region (NIR) of the spectrum (e.g., from about 700 nm to about 2700 nm). In yet other examples, the glass-ceramic state of the article has a transmittance of less than about 90%/mm, less than about 80%/mm, less than about 70%/mm, less than about 60%/mm, less than about 50%/mm, less than about 40%/mm, less than about 30%/mm, less than about 25%/mm, less than about 20%/mm, less than about 15%/mm, less than about 10%/mm, less than about 5%/mm, less than 4%/mm, less than 3%/mm, less than 2%/mm, less than 1%/mm and even less than 0.1%/mm and less than all upper limits between these values, all over at least one 50 nm-wide wavelength band of light in the NIR region of the spectrum. In other examples, the glass-ceramic state of the article absorbs or has an absorption of at least 90%/mm, at least 91%/mm, at least 92%/mm, at least 93%/mm, at least 94%/mm, at least 95%/mm, at least 96%/mm, at least 97%/mm, at least 98%/mm, or at least 99%/mm, or even at least 99.9%/mm for light in at least one 50 nm-wide wavelength band of light in the NIR region of the spectrum.

Various examples of the present disclosure may offer a variety of properties and advantages. It will be understood that although certain properties and advantages may be disclosed in connection with certain compositions, various properties and advantages disclosed may equally be applicable to other compositions.

With respect to the compositions of Tables 1 and 5 below, articles made of the disclosed compositions may exhibit a low coefficient of thermal expansion ("CTE"). For example, the article may have a coefficient of thermal expansion of from about $10 \times 10^{-7}$ °C.$^{-1}$ and about $60 \times 10^{-7}$ °C.$^{-1}$ over a temperature range of from about 0° C. to about 300° C. Such a low CTE may allow the article to withstand large and rapid fluctuations in temperature, making such articles suitable for operating in harsh environments. With respect to optical properties, the article may exhibit a less than 1% transmittance at wavelengths of about 368 nm or less, optical transparency in the visible regime (e.g., from about 500 nm to about 700 nm), and strong attenuation (e.g., blocking) of NIR wavelengths (e.g., from about 700 nm to about 1700 nm). Such articles may be advantageous over conventional NIR management solutions in that the article does not employ a coating or film (e.g., which may be mechanically fragile, sensitive to UV light and moisture). As the article is impervious to oxygen, moisture, and ultraviolet wavelengths (i.e., owing to its glass or glass-ceramic nature), the NIR absorbing precipitates may be protected from harsh environmental conditions (e.g., moisture, caustic acids, bases and gases) and rapid changes in temperature. Further, a UV cutoff wavelength and a refractive index change of the glass-ceramic state of the article may be modulatable by thermal treatment post forming. The glass-ceramic state of the article may exhibit a UV cutoff or a change in its refractive index as a result of its crystalline precipitates. The glass state of the article may have a refractive index of about between about 1.505 and about 1.508 while the glass-ceramic state of the article may have a refractive index of from about 1.520 to about 1.522. The thermally modulatable UV cutoff and refractive index may enable one tank of glass to meet multiple UV cutoff glass specifications on the fly by varying the thermal processing conditions post forming of the article. The thermally modulated refractive index can produce a large refractive index delta ($10^{-2}$). Because the thermal treatment required to modulate the UV absorbance is done at high viscosity (e.g., between $10^8$ and $10^{12}$ poise) finished articles can be thermally processed without marring the surface or causing deformation.

With respect to the compositions of Tables 1 and 2, articles made of these compositions may offer a novel family of non-toxic, cadmium and selenium-free articles that exhibit an optical extinction with a sharp and tunable cutoff wavelength. Unlike the Cd-free alternatives to CdSe filter glasses, which contain Se, these articles contain no Resource and Recovery Act ("RCRA") metals or other harmful agents. Additionally, the article may be composed of lower cost elements, unlike the Cd-free alternatives that contain indium and or gallium. With respect to optical properties, articles made of these compositions may offer high transparency (e.g., greater than about 90%) over the NIR out to 2.7 microns. Further, the article may exhibit a sharp visible cutoff wavelength ranging from about 320 nm to 525 nm, which is tunable by thermal processing conditions (e.g., time and temperature), and by composition.

With respect to the compositions of Table 3, articles of these exemplary compositions may use molybdenum in lieu of tungsten which may be advantageous in that molybdenum is generally less expensive than tungsten. Additionally, articles made of these compositions may be thermally processed into the glass-ceramic state which may offer a variety of optical properties. For example, at a thickness of about 0.5 mm, the transmittance of the article of such compositions can range from about 4% to about 30% in the visible spectrum (e.g., about 400 nm to about 700 nm), about 5% to about 15% in the NIR (e.g., about 700 nm to about 1500 nm), a UV transmittance of about 1% or less at wavelengths below about 370 nm and about 5% or less at wavelengths of from about 370 nm to about 390 nm. According to some examples, mixed molybdenum-tungsten examples of the article are capable of absorbing 92.3% of the solar spectrum. Such optical properties may be visually perceived as a tint to the article. Similar to other compositions, the optical properties are generated via the growth of the precipitates and as such the tint may be varied across the article based on thermal processing. This thermally variable tint can be used to create gradients of tint within the article such as the creation of shaded edges or boarders within windshield or moonroof applications of the article. Such a feature may be advantageous in the elimination of frits which are baked onto the surface of conventional windshields and moonroofs. This thermally tunable tint can also be used to create a gradient absorption across the article. Additionally, articles created from these compositions are bleachable and patternable by lasers (e.g., operating at wavelengths of 355 nm, 810 nm, and 10.6 µm). Upon laser exposure to these wavelengths, the exposed region of the article will turn from a blue or grey color (e.g., the color being due to the precipitates) to a transparent water white or faint yellow-tint due to the thermal decomposition of the UV and NIR absorbing precipitates. By rastering the laser along the surface of the article to selectively bleach desired regions, patterns can be created within the article. When the article is bleached, the resulting glass state is no longer absorptive in the NIR such that the bleaching process is self-limiting (i.e., because the NIR absorbing precipitates have been decomposed). Furthermore, selective laser exposure may not only create patterns, but also variable UV & NIR absorbance across the article. According to yet other examples, the article may be pulverized to a sufficiently small size and functionalized to be used as a photothermal susceptor agent for cancer treatment (i.e., due to its NIR absorbing optical properties).

With respect to the compositions of Table 4, articles made of these compositions may be capable of being thermally treated after formation (e.g., to form the glass-ceramic state) to both modulate the optical absorbance and to produce a large range of colors from a single composition. Further, such examples may be capable of fusion formation and/or ion-exchanging. Conventional colored glass compositions which utilize Ag, Au and/or Cu generally rely on the formation of nanoscale metallic precipitates to generate colors. As discovered by the inventors of the present disclosure, Ag 1+ cations can intercalate into tungsten and molybdenum oxide forming silver tungsten bronzes and/or silver molybdenum bronzes which may provide the article with a polychromatic nature. Surprisingly, with the addition of a small concentration of $Ag_2O$ or $AgNO_3$ to $M_xWO_3$ or $M_xMoO_3$ to the composition of the article many produce a variety of colors (e.g., red, orange, yellow, green, blue, various browns and/or combinations thereof) by thermally processing the article at different times and temperatures. It will be understood that Au and/or Cu may be utilized in a similar manner. Analysis demonstrates that the color tunability is not due to the formation of ensembles of metallic nanoparticles that template atop a crystalline phase (e.g., $M_xWO_3$ or $M_xMoO_3$). Rather, it is believed that the origin of color tunability in these polychromatic articles is due to the change in the band gap energy of the doped tungsten and/or molybdenum oxide precipitates, arising from the concentration of intercalated of alkali cations and $Ag^{1+}$, Au and/or Cu cations into the precipitates to form a pure alkali, pure metal and/or mixed alkali-metal, tungsten and/or molybdenum bronzes of varying stoichiometry. Changes in the band gap energy of the precipitates are due to its stoichiometry and in-turn is largely independent of precipitate size and/or shape. Therefore doped $M_xWO_3$ or $M_xMoO_3$ precipitates can remain the same size and/or shape, yet could be many different colors depending on the dopant "M" identity and concentration "x." Thermally treating such articles may produce a nearly complete rainbow of colors within a single article. Further, gradients of color can be stretched or compressed over some physical distance by a thermal gradient being applied to the article. In yet other examples, the article can be laser patterned to locally alter the color of the article. Such articles may be advantageous for the production of colored sunglass lens blanks, phone and/or tablet covers and/or other products which may be composed of a glass-ceramic and may be aesthetically colored. As the precipitates are positioned within the glass-ceramic, scratch resistance and environmental durability are greater than the conventional metal and polymeric coloring layers applied to provide coloring. As the colors of the article may be altered based on thermal treatment, one tank of glass melt may be used to continuously produce blanks that can be heat treated to the specific color as customer demand dictates. Additionally, articles manufactured from these glass compositions may absorb UV and/or IR radiation similar to the other compositions disclosed herein.

According to various examples of the present disclosure, the article may be amenable to various fusion formation processes. For example, the various compositions of the present disclosure may be utilized in a single or double fusion laminate where a transparent tungsten, molybdenum, mixed tungsten molybdenum, and/or titanium glass is employed as a clad material around a substrate to form the laminate article. After application as a cladding, the glass state cladding may be transformed to the glass-ceramic state. The glass-ceramic state cladding of the fusion laminate article may have a thickness of from about 50 μm to about 200 μm and may have a strong UV and IR attenuation with high average visible transmittance (e.g., from about 75% to about 85% for automotive windshields and/or architectural glazing), a strong UV and IR attenuation with low visible transmittance (e.g., about 5% to about 30% for automotive side lights, automotive sunroofs, and privacy glazing) and/or a laminate where the visible and infrared absorbance can be modulated by treatment in a gradient furnace, local heating and/or localized bleaching. Additionally, use of the compositions as a cladding to form the article provides a novel process to fully leverage the tunable optical properties while simultaneously producing a strengthened monolithic glass ply.

According to various examples, articles produced from the compositions of the present disclosure may be powdered or granulated and added to a variety of materials. For example, the powdered article may be added to a paint, binder, polymeric material (e.g., polyvinyl butyral), sol-gels and/or combinations thereof. Such a feature may be advantageous in imparting one or more of the characteristics of the article to the above mentioned material.

According to various examples, the article may include $TiO_2$. The article may include $TiO_2$ in a concentration of about 0.25 mol %, or about 0.50 mol %, or about 0.75 mol %, or about 1.0 mol %, or about 2.0 mol %, or about 3.0 mol %, or about 4.0 mol %, or about 5.0 mol %, or about 6.0 mol %, or about 7.0 mol %, or about 8.0 mol %, or about 9.0 mol %, or about 10.0 mol %, or about 11.0 mol %, or about 12.0 mol %, or about 13.0 mol %, or about 14.0 mol %, or about 15.0 mol %, or about 16.0 mol %, or about 17.0 mol %, or about 18.0 mol %, or about 19.0 mol %, or about 20.0 mol %, or about 21.0 mol %, or about 22.0 mol %, or about 23.0 mol %, or about 24.0 mol %, or about 25.0 mol %, or about 26.0 mol %, or about 27.0 mol %, or about 28.0 mol %, or about 29.0 mol %, or about 30.0 mol % or any and all values and ranges therebetween. For example, the article may include $TiO_2$ in a concentration of from about 0.25 mol % to about 30 mol %, or from about 1 mol % to about 30 mol % $TiO_2$, or from about 1.0 mol % to about 15 mol % $TiO_2$, or from about 2.0 mol % to about 15 mol % $TiO_2$, or from about 2.0 mol % to about 15.0 mol % $TiO_2$. It will be understood that any and all values and ranges between the above noted ranges of $TiO_2$ are contemplated.

According to various examples, the article may include one or more metal sulfides. For example, the metal sulfides may include MgS, $Na_2S$, and/or ZnS. According to various examples, the article may include one or more metal sulfides. For example, the metal sulfides may include MgS, $Na_2S$, and/or ZnS. The article may include metal sulfides in a concentration of about 0.25 mol %, or about 0.50 mol %, or about 0.75 mol %, or about 1.0 mol %, or about 2.0 mol %, or about 3.0 mol %, or about 4.0 mol %, or about 5.0 mol %, or about 6.0 mol %, or about 7.0 mol %, or about 8.0 mol %, or about 9.0 mol %, or about 10.0 mol %, or about 11.0 mol %, or about 12.0 mol %, or about 13.0 mol %, or about 14.0 mol %, or about 15.0 mol %, or about 16.0 mol %, or about 17.0 mol %, or about 18.0 mol %, or about 19.0 mol %, or about 20.0 mol %, or about 21.0 mol %, or about 22.0 mol %, or about 23.0 mol %, or about 24.0 mol %, or about 25.0 mol %, or about 26.0 mol %, or about 27.0 mol %, or about 28.0 mol %, or about 29.0 mol %, or about 30.0 mol % or any and all values and ranges therebetween. For example, the article may include metal sulfides in a concentration of from about 0.25 mol % to about 30 mol %, or from about 1.0 mol % to about 15 mol %, or from about 1.5 mol % to about 5 mol %.

Similarly to the tungsten and molybdenum oxides highlighted above, the examples of the article including titanium may also produce a crystalline phase composed of precipitates of titanium oxide. The crystalline phase includes an oxide, from about 0.1 mol % to about 100 mol % of the crystalline phase, of Ti and an alkali metal cation. Without being bound by theory, it is believed that during thermal processing (e.g., heat treating) of the article, titanium cations agglomerate to form crystalline precipitates near and or on the metal sulfides thereby transforming the glass state into the glass-ceramic state. The metal sulfide may serve a dual role in both functioning as a nucleating agent (i.e., as the metal sulfide may have a higher melting temperature than the melt thereby serving as a seed crystal onto which the titanium may agglomerate) and as a reducing agent (i.e., metal sulfides are high reducing agents and as such the agglomerated titanium may be reduced to a 3+ state). As such, the titanium present in the precipitates may be reduced, or partially reduced due to the metal sulfides. For example, the titanium within the precipitates may have an oxidation state of between 0 and about +4. For example, the precipitates may have the general chemical structure of $TiO_2$. However, there can also be a significant fraction of titanium in the +3 oxidation state, and in some cases these Ti' cations may be charge stabilized by species intercalated into channels in the titania crystal lattice, forming compounds known as non-stoichiometric titanium suboxides, "titanium bronzes," or "bronze-type" titanium crystals. One or more of the above-noted alkali metals and/or dopants may be present within the precipitates to compensate the +3 charge on the Ti. Titanium bronzes are a group of non-stoichiometric titanium suboxides that takes the general chemical form of $M_xTiO_2$ where M=one or more dopant cation of H, Li, Na, K, Rb, Cs, Ca, Sr, Ba, Zn, Ag, Au, Cu, Sn, Cd, In, Tl, Pb, Bi, Th, La, Pr, Nd, Sm, Eu, Gd, Dy, Ho, Er, Tm, Yb, Lu, U, V, Cr, Mn, Fe, Ni, Cu, Pd, Se, Ta, Bi, and Ce, and where 0<x<1. The structure $M_xTiO_2$ is considered to be a solid state defect structure in which holes (i.e. vacancies or channels in crystal lattice) in a reduced $TiO_2$ network are randomly occupied by M atoms, which are dissociated into M+ cations and free electrons. Depending on the concentration of "M," the material properties can range from metallic to semi-conducting, thereby allowing a variety of optical absorption and electronic properties to be tuned. The more 3+Ti, the more M+ cations may be needed to compensate and the greater the value of x.

Consistent with the above disclosure, titanium bronzes are non-stoichiometric compounds generally of formula $M_xTiO_2$, where M is a cation dopant, such as some other metal, most commonly an alkali, and x is a variable less than 1. For clarity, though called a 'bronze', these compounds are not structurally or chemically related to metallic bronze, which is an alloy of copper and tin. Titanium bronzes are a spectrum of solid phases where homogeneity varies as a function of x. Depending on dopant M and corresponding concentration x, material properties of a titanium bronze may range from metallic to semi-conducting, and exhibit tunable optical absorption. The structure of these bronzes is a solid-state defect structure in which M' dopant cations intercalate (i.e., occupy) into holes or channels of binary oxide hosts and disassociate into M+ cations and free electrons.

For clarity, $M_xTiO_2$ is a naming convention for a complex system of non-stoichiometric or 'sub-stoichiometric' compounds, with varying crystal structures that can be monoclinic, hexagonal, tetragonal, cubic, or pyrochlore, where M can one or a combination of certain elements on the periodic table, where x varies from 0<x<1, where the oxidation state of the bronze forming specie (in this case Ti) is a mixture of the specie in its highest oxidation state ($Ti^{4+}$) and a lower oxidation state (e.g., $Ti^{3+}$), and where the number two ("2") in $TiO_2$ represents the number of oxygen anions that may be between 1 and 2. Accordingly, $M_xTiO_2$ may alternatively be expressed as the chemical form $M_xTiO_z$, where 0<x<1, and 1<z<2, or as $M_xTiO_{2-z}$ where 0<x<1 and 0<z<1. However, for brevity, $M_xTiO_2$ is utilized for this family of non-stoichiometric crystals. Similarly, 'bronze' in general applies to a ternary metal oxide of formula $M'_xM''_yO_z$ where (i) M" is a transition metal, (ii) $M''_yO_z$ is its highest binary oxide, (iii) M' is some other metal, (iv) x is a variable falling in the range 0<x<1.

According to various examples, the glass-ceramic article including titanium may be substantially free of W, Mo, and rare earth elements. As highlighted above, the ability for titanium to form its own suboxides may eliminate the need for tungsten and molybdenum and the titanium suboxides may not need rare earth elements.

According to various examples, the glass-ceramic article may have a low concentration or be free of iron. For example, the article may include about 1 mol % or less of Fe, or about 0.5 mol % or less of Fe, or about 0.1 mol % or less of Fe, or 0.0 mol % Fe or any and all values and ranges therebetween.

According to various examples, the glass-ceramic article may have a low concentration or be free of lithium. For example, the article may include about 1 mol % or less of Li, or about 0.5 mol % or less of Li, or about 0.1 mol % or less of Li, or 0.0 mol % Li or any and all values and ranges therebetween.

According to various examples, the glass-ceramic article may have a low concentration or be free of zirconium. For example, the article may include about 1 mol % or less of Zr, or about 0.5 mol % or less of Zr, or about 0.1 mol % or less of Zr, or 0.0 mol % Zr or any and all values and ranges therebetween.

Similar to the formation of the tungsten or molybdenum containing articles, articles including titanium may be formed by a method including steps of: melting together constituents including silica and titanium to form a glass melt; solidifying the glass melt to form a glass; and precipitating, within the glass, bronze-type crystals including the titanium to form the glass-ceramic. According to various examples, the precipitating of the bronze-type crystals may be performed via one or more thermal treatments. The thermal treatment, for titanium bronze-type crystals, may be performed at a temperature of from about 400° C. to about 900° C., or from about 450° C. to about 850° C., or from about 500° C. to about 800° C., or from about 500° C. to about 750° C., or from about 500° C. to about 700° C. or any and all values and ranges therebetween. In other words, precipitating the bronze-type crystals is performed at a temperature of from about 450° C. to about 850° C. or precipitating the bronze-type crystals is performed at a temperature of from about 500° C. to about 700° C. The thermal treatment may be carried out for a time period of from about 15 minutes to about 240 minutes, or from about 15 minutes to about 180 minutes, or from about 15 minutes to about 120 minutes, or from about 15 minutes or about 90 minutes, or from about 30 minutes to about 90 minutes, or from about 60 minutes to about 90 minutes or any and all values and ranges therebetween. In other words, precipitating the bronze-type crystals is performed for a time period of from about 15 minutes to about 240 minutes or precipitating the bronze-type crystals is performed for a time period of from about 60 minutes to about 90 minutes. The thermal treatment may be carried out in ambient air, in an inert atmosphere or in a vacuum.

Formation of the titanium suboxides in titanium containing examples of the article may result in a difference in absorption and transmittance of different wavelength bands of light. In a ultraviolet (UV) band of light (e.g., from about 200 nm to about 400 nm) the article in the glass-state, prior to precipitation of the titanium suboxides, may have an average UV transmittance of about 18% to about 30%. For example, the average UV transmittance of the article in the glass-state may be about 18%, or about 19%, or about 20%, or about 21%, or about 22%, or about 23%, or about 24%, or about 25%, or about 26%, or about 27%, or about 28%, or about 29%, or about 30% or any and all values and ranges therebetween. After the formation or precipitation of the titanium suboxides, the article in the glass-ceramic state may have an average UV transmittance of about 0.4% to about 18%. For example, the average UV transmittance of the article in the glass-ceramic state may be about 0.4%, or about 0.5%, or about 1%, or about 2%, or about 3%, or about 4%, or about 5%, or about 6%, or about 7%, or about 8%, or about 9%, or about 10%, or about 11% or about 12% or about 13% or about 14% or about 15% or about 16% or about 17% or about 18% or any and all values and ranges therebetween. It will be understood that the above-noted transmittance values may exist in articles having a thickness, or path length of the light, of from about 0.4 mm to about 1.25 mm.

In a visible band of light (e.g., from about 400 nm to about 750 nm) the article in the glass-state, prior to precipitation of the titanium suboxides, may have an average visible transmittance of about 60% to about 85%. For example, the average visible transmittance of the article in the glass-state may be about 60%, or about 61%, or about 62%, or about 63%, or about 64%, or about 65%, or about 66%, or about 67%, or about 68%, or about 69%, or about 70%, or about 71%, or about 72%, or about 73%, or about 74%, or about 75%, or about 76%, or about 77%, or about 78%, or about 79%, or about 80%, or about 81%, or about 82%, or about 83%, or about 84%, or about 85% or any and all values and ranges therebetween. After the formation or precipitation of the titanium suboxides, the article in the glass-ceramic state may have an average visible transmittance of about 4% to about 85%. For example, the average UV transmittance of the article in the glass-ceramic state may be about 4%, or about 5%, or about 10%, or about 20%, or about 30%, or about 40%, or about 50%, or about 60%, or about 70%, or about 80%, or about 85% or any and all values and ranges therebetween. It will be understood that the above-noted transmittance values may exist in articles having a thickness, or path length of the light, of from about 0.4 mm to about 1.25 mm.

In a near-infrared (NIR) band of light (e.g., from about 750 nm to about 1500 nm) the article in the glass-state, prior to precipitation of the titanium suboxides, may have an average NIR transmittance of about 80% to about 90%. For example, the average NIR transmittance of the article in the glass-state may be about 80%, or about 81%, or about 82%, or about 83%, or about 84%, or about 85%, or about 86%, or about 87%, or about 88%, or about 89%, or about 90% or any and all values and ranges therebetween. After the formation or precipitation of the titanium suboxides, the article in the glass-ceramic state may have an average NIR transmittance of about 0.1% to about 10%. For example, the average UV transmittance of the article in the glass-ceramic state may be about 1%, or about 2%, or about 3%, or about 4%, or about 5%, or about 6%, or about 7%, or about 8%, or about 9%, or about 10% or any and all values and ranges therebetween. It will be understood that the above-noted transmittance values may exist in articles having a thickness, or path length of the light, of from about 0.4 mm to about 1.25 mm.

In the NIR band of light, the article in the glass-state, without the titanium suboxides, may have an average optical density per mm (i.e., a first near-infrared absorbance) of about 0.4 or less, or about 0.35 or less, or about 0.3 or less, or about 0.25 or less, or about 0.2 or less, or about 0.15 or less, or about 0.1 or less, or about 0.05 or less or any and all values and ranges therebetween. After the precipitation of the titanium suboxides, the article in the glass-ceramic state, with the titanium suboxides, may have an optical density per mm (i.e., a second near-infrared absorbance) of about 6.0 or less, or about 5.5 or less, or about 5.0 or less, or about 4.5 or less, or about 4.0 or less, or about 3.5 or less, or about 3.0 or less, or about 2.5 or less, or about 2.0 or less, or about 2.0 or less, or about 1.5 or less, or about 1.0 or less, or about 0.5 or less or any and all values and ranges therebetween. As such, in some cases a ratio of the second average near-infrared absorbance to the first average near-infrared absorbance may be about 1.5 or greater, or about 2.0 or greater, or about 2.5 or greater, or about 3.0 or greater, or about 5.0 or greater, or about 10.0 or greater. In such examples, the average optical density per mm at visible wavelengths of the article in the glass-ceramic state with the titanium suboxides may be 1.69 or less.

According to various examples, the article may exhibit a low haze. For example, the article may exhibit a haze of about 20% or less, or about 15% or less, or about 12% or less, or about 11% or less, or about 10.5% or less, or about 10% or less, or about 9.5% or less, or about 9% or less, or about 8.5% or less, or about 8% or less, or about 7.5% or less, or about 7% or less, or about 6.5% or less, or about 6% or less, or about 5.5% or less, or about 5% or less, or about 4.5% or less, or about 4% or less, or about 3.5% or less, or about 3% or less, or about 2.5% or less, or about 2% or less, or about 1.5% or less, or about 1% or less, or about 0.5% or less, or about 0.4% or less, or about 0.3% or less, or about 0.2% or less, or about 0.1% or less or any and all values and ranges therebetween. The haze of the article is measured on a 1 mm thick sample and in accordance with the procedure outlined above in connection with haze measurement. According to various examples, the haze of the article may be lower than conventional glass-ceramics due to the absence of beta-quartz (i.e. Virgilite) which is often present in certain glass-ceramics, but which tends to increase haze. In other words, the glass-ceramic article may be free of a beta-quartz crystalline phase. Further, the haze of the article may be due to the low quantity or absence of large crystallites (e.g., about ≤100 nm, or about <60 nm, or about <40 nm) which tend to scatter light.

Use of articles which include titanium suboxides, crystals having the general formula $M_xTiO_2$ or nonstoichiometric titanium bronzes may provide a number of advantages.

First, thermal processing times to produce titanium suboxides may be shorter than production of other glass-ceramics. Further, thermal processing temperatures may be below the softening points of the article. Such features may be advantageous in decreasing manufacturing complexity and cost.

Second, color packages (e.g., $TiO_2+ZnS$) can be introduced to a wide range of melt compositions, including those with ion exchange capabilities. Additionally, because a relatively low concentration of the color package is needed, the addition of such color packages may have less effect on chemical durability and other relevant properties of the article.

Third, use of titanium suboxide containing glass-ceramics may provide a fusion formable and chemically strengthenable material for ultraviolet and/or infrared blocking materials that may not have melting difficulties due to radiation trapping. For example, articles including the titanium suboxides, when molted or in the as-cast state (i.e., green state before thermal treatment), are highly transparent at visible and NIR wavelengths, unlike $Fe^{2+}$-doped glasses, which strongly absorb in the near infrared even when molten.

EXAMPLES

The following examples represent certain non-limiting examples of the composition of the articles of the disclosure.

Referring now to Table 1, the article may have $SiO_2$ from about 58.8 mol % to about 77.58 mol %, $Al_2O_3$ from about 0.66 mol % to about 13.69 mol %, $B_2O_3$ from about 4.42 mol % to about 27 mol %, $R_2O$ from about 0 mol % to about 13.84 mol %, RO from about 0 mol % to about 0.98 mol %, $WO_3$ from about 1.0 mol % to about 13.24 mol % and $SnO_2$ from about 0 mol % to about 0.4 mol %. It will be understood that any of the exemplary compositions of Table 1 may include $MnO_2$ from about 0 mol % to about 0.2 mol %, $Fe_2O_3$ from about 0 mol % to about 0.1 mol %, $TiO_2$ from about 0 mol % to about 0.01 mol %, $As_2O_5$ from about 0 mol % to about 0.17 mol % and/or $Eu_2O_3$ from about 0 mol % to about 0.1 mol %. The compositions of Table 1 are provided in an as-batched state within a crucible.

TABLE 1

| Ex. | SiO$_2$ | Al$_2$O$_3$ | B$_2$O$_3$ | Li$_2$O | Na$_2$O | K$_2$O | Cs$_2$O | MgO | CaO | ZnO | SnO$_2$ | WO$_3$ | P$_2$O$_5$ |
|---|---|---|---|---|---|---|---|---|---|---|---|---|---|
| 1 | 76.90 | 2.00 | 17.00 | 0.00 | 0.00 | 0.00 | 1.00 | 0.00 | 0.00 | 0.00 | 0.10 | 3.00 | 0.000 |
| 2 | 75.90 | 2.00 | 17.00 | 0.00 | 0.00 | 0.00 | 2.00 | 0.00 | 0.00 | 0.00 | 0.10 | 3.00 | 0.000 |
| 3 | 72.90 | 2.00 | 20.00 | 0.00 | 0.00 | 0.00 | 2.00 | 0.00 | 0.00 | 0.00 | 0.10 | 3.00 | 0.000 |
| 4 | 69.90 | 2.00 | 23.00 | 0.00 | 0.00 | 0.00 | 2.00 | 0.00 | 0.00 | 0.00 | 0.10 | 3.00 | 0.000 |
| 5 | 65.90 | 2.00 | 27.00 | 0.00 | 0.00 | 0.00 | 2.00 | 0.00 | 0.00 | 0.00 | 0.10 | 3.00 | 0.000 |
| 6 | 77.58 | 0.66 | 20.00 | 0.00 | 0.00 | 0.00 | 0.66 | 0.00 | 0.00 | 0.00 | 0.10 | 1.00 | 0.000 |
| 7 | 76.92 | 1.32 | 20.00 | 0.00 | 0.00 | 0.00 | 0.66 | 0.00 | 0.00 | 0.00 | 0.10 | 1.00 | 0.000 |
| 8 | 76.26 | 1.32 | 20.00 | 0.00 | 0.00 | 0.00 | 1.32 | 0.00 | 0.00 | 0.00 | 0.10 | 1.00 | 0.000 |
| 9 | 61.70 | 6.60 | 20.00 | 0.00 | 0.00 | 0.00 | 6.60 | 0.00 | 0.00 | 0.00 | 0.10 | 5.00 | 0.000 |
| 10 | 65.90 | 5.00 | 20.00 | 0.00 | 0.00 | 0.00 | 5.00 | 0.00 | 0.00 | 0.00 | 0.10 | 4.00 | 0.000 |
| 11 | 64.90 | 5.00 | 20.00 | 0.00 | 0.00 | 0.00 | 5.00 | 0.00 | 0.00 | 0.00 | 0.10 | 5.00 | 0.000 |
| 12 | 63.90 | 7.00 | 20.00 | 0.00 | 0.00 | 0.00 | 5.00 | 0.00 | 0.00 | 0.00 | 0.10 | 4.00 | 0.000 |
| 13 | 63.90 | 9.00 | 20.00 | 0.00 | 0.00 | 0.00 | 3.00 | 0.00 | 0.00 | 0.00 | 0.10 | 4.00 | 0.000 |
| 14 | 63.90 | 9.00 | 20.00 | 3.00 | 0.00 | 0.00 | 0.00 | 0.00 | 0.00 | 0.00 | 0.10 | 4.00 | 0.000 |
| 15 | 63.91 | 9.00 | 20.00 | 0.00 | 2.99 | 0.00 | 0.00 | 0.00 | 0.00 | 0.00 | 0.10 | 4.00 | 0.000 |
| 16 | 63.90 | 9.00 | 20.00 | 0.00 | 0.00 | 3.00 | 0.00 | 0.00 | 0.00 | 0.00 | 0.10 | 4.00 | 0.000 |
| 17 | 62.90 | 10.00 | 20.00 | 0.00 | 0.00 | 0.00 | 3.00 | 0.00 | 0.00 | 0.00 | 0.10 | 4.00 | 0.000 |
| 18 | 61.90 | 11.00 | 20.00 | 0.00 | 0.00 | 0.00 | 3.00 | 0.00 | 0.00 | 0.00 | 0.10 | 4.00 | 0.000 |
| 19 | 64.90 | 9.00 | 20.00 | 0.00 | 0.00 | 0.00 | 2.00 | 0.00 | 0.00 | 0.00 | 0.10 | 4.00 | 0.000 |
| 20 | 62.90 | 9.00 | 20.00 | 0.00 | 0.00 | 0.00 | 4.00 | 0.00 | 0.00 | 0.00 | 0.10 | 4.00 | 0.000 |
| 21 | 63.90 | 10.00 | 20.00 | 0.00 | 0.00 | 0.00 | 2.00 | 0.00 | 0.00 | 0.00 | 0.10 | 4.00 | 0.000 |
| 22 | 61.90 | 12.00 | 20.00 | 0.00 | 0.00 | 0.00 | 2.00 | 0.00 | 0.00 | 0.00 | 0.10 | 4.00 | 0.000 |
| 23 | 63.90 | 9.00 | 20.00 | 0.00 | 0.00 | 0.00 | 2.90 | 0.00 | 0.00 | 0.00 | 0.10 | 4.00 | 0.000 |
| 24 | 63.90 | 9.00 | 20.00 | 1.50 | 0.00 | 1.50 | 0.00 | 0.00 | 0.00 | 0.00 | 0.10 | 4.00 | 0.000 |
| 25 | 63.90 | 9.00 | 20.00 | 1.50 | 0.00 | 0.00 | 1.50 | 0.00 | 0.00 | 0.00 | 0.10 | 4.00 | 0.000 |
| 26 | 64.00 | 9.00 | 20.00 | 3.00 | 0.00 | 0.00 | 0.00 | 0.00 | 0.00 | 0.00 | 0.00 | 4.00 | 0.000 |
| 27 | 64.40 | 9.00 | 20.00 | 3.00 | 0.00 | 0.00 | 0.00 | 0.00 | 0.00 | 0.00 | 0.10 | 3.50 | 0.000 |
| 28 | 64.90 | 9.00 | 20.00 | 3.00 | 0.00 | 0.00 | 0.00 | 0.00 | 0.00 | 0.00 | 0.10 | 3.00 | 0.000 |
| 29 | 65.40 | 9.00 | 20.00 | 3.00 | 0.00 | 0.00 | 0.00 | 0.00 | 0.00 | 0.00 | 0.10 | 2.50 | 0.000 |
| 30 | 64.90 | 9.00 | 20.00 | 2.00 | 0.00 | 0.00 | 0.00 | 0.00 | 0.00 | 0.00 | 0.10 | 4.00 | 0.000 |
| 31 | 65.90 | 9.00 | 20.00 | 1.00 | 0.00 | 0.00 | 0.00 | 0.00 | 0.00 | 0.00 | 0.10 | 4.00 | 0.000 |
| 32 | 66.90 | 9.00 | 20.00 | 0.00 | 0.00 | 0.00 | 0.00 | 0.00 | 0.00 | 0.00 | 0.10 | 4.00 | 0.000 |
| 33 | 65.90 | 9.00 | 20.00 | 3.00 | 0.00 | 0.00 | 0.00 | 0.00 | 0.00 | 0.00 | 0.10 | 2.00 | 0.000 |
| 34 | 66.40 | 9.00 | 20.00 | 3.00 | 0.00 | 0.00 | 0.00 | 0.00 | 0.00 | 0.00 | 0.10 | 1.50 | 0.000 |
| 35 | 60.90 | 9.00 | 20.00 | 6.00 | 0.00 | 0.00 | 0.00 | 0.00 | 0.00 | 0.00 | 0.10 | 4.00 | 0.000 |
| 36 | 65.90 | 9.00 | 15.00 | 6.00 | 0.00 | 0.00 | 0.00 | 0.00 | 0.00 | 0.00 | 0.10 | 4.00 | 0.000 |
| 37 | 69.90 | 10.00 | 10.00 | 6.00 | 0.00 | 0.00 | 0.00 | 0.00 | 0.00 | 0.00 | 0.10 | 4.00 | 0.000 |
| 38 | 66.00 | 9.00 | 20.00 | 3.00 | 0.00 | 0.00 | 0.00 | 0.00 | 0.00 | 0.00 | 0.00 | 2.00 | 0.000 |
| 39 | 65.90 | 9.00 | 20.00 | 3.00 | 0.00 | 0.00 | 0.00 | 0.00 | 0.00 | 0.00 | 0.10 | 2.00 | 0.000 |
| 40 | 65.80 | 9.00 | 20.00 | 3.00 | 0.00 | 0.00 | 0.00 | 0.00 | 0.00 | 0.00 | 0.20 | 2.00 | 0.000 |
| 41 | 65.60 | 9.00 | 20.00 | 3.00 | 0.00 | 0.00 | 0.00 | 0.00 | 0.00 | 0.00 | 0.40 | 2.00 | 0.000 |
| 42 | 65.80 | 9.00 | 20.00 | 3.00 | 0.00 | 0.00 | 0.00 | 0.00 | 0.00 | 0.00 | 0.00 | 2.00 | 0.000 |
| 43 | 65.90 | 9.00 | 20.00 | 3.00 | 0.00 | 0.00 | 0.00 | 0.00 | 0.00 | 0.00 | 0.00 | 2.00 | 0.000 |
| 44 | 67.41 | 9.61 | 9.95 | 0.00 | 7.86 | 1.20 | 0.00 | 0.00 | 0.01 | 0.00 | 0.10 | 3.85 | 0.000 |
| 45 | 67.42 | 9.62 | 9.42 | 0.00 | 8.13 | 1.47 | 0.00 | 0.00 | 0.00 | 0.00 | 0.10 | 3.85 | 0.000 |
| 46 | 67.18 | 9.62 | 9.42 | 0.00 | 8.25 | 1.59 | 0.00 | 0.00 | 0.00 | 0.00 | 0.10 | 3.85 | 0.000 |
| 47 | 67.66 | 9.62 | 9.42 | 0.00 | 8.01 | 1.35 | 0.00 | 0.00 | 0.00 | 0.00 | 0.10 | 3.85 | 0.000 |
| 48 | 67.42 | 9.62 | 8.99 | 0.00 | 7.90 | 2.12 | 0.00 | 0.00 | 0.00 | 0.00 | 0.10 | 3.85 | 0.000 |
| 49 | 67.23 | 9.62 | 9.95 | 0.00 | 7.86 | 1.20 | 0.00 | 0.00 | 0.00 | 0.00 | 0.29 | 3.85 | 0.000 |
| 50 | 65.50 | 9.62 | 10.92 | 0.00 | 8.34 | 1.68 | 0.00 | 0.00 | 0.00 | 0.00 | 0.10 | 3.85 | 0.000 |
| 51 | 67.18 | 9.62 | 9.42 | 0.00 | 8.25 | 1.59 | 0.00 | 0.00 | 0.00 | 0.00 | 0.10 | 3.85 | 0.000 |
| 52 | 67.17 | 9.62 | 9.42 | 3.85 | 4.41 | 1.59 | 0.00 | 0.00 | 0.00 | 0.00 | 0.10 | 3.85 | 0.000 |
| 53 | 67.17 | 9.62 | 9.42 | 7.69 | 0.58 | 1.59 | 0.00 | 0.00 | 0.00 | 0.00 | 0.10 | 3.85 | 0.000 |
| 54 | 67.51 | 9.42 | 9.47 | 0.00 | 8.41 | 1.72 | 0.00 | 0.00 | 0.00 | 0.00 | 0.10 | 3.38 | 0.000 |
| 55 | 67.56 | 9.62 | 9.42 | 0.00 | 8.01 | 1.35 | 0.00 | 0.10 | 0.01 | 0.00 | 0.10 | 3.85 | 0.000 |
| 56 | 67.17 | 9.62 | 9.42 | 0.00 | 8.01 | 1.35 | 0.00 | 0.48 | 0.01 | 0.00 | 0.10 | 3.85 | 0.000 |
| 57 | 66.69 | 9.01 | 9.42 | 0.00 | 8.60 | 1.35 | 0.00 | 0.96 | 0.02 | 0.00 | 0.10 | 3.85 | 0.000 |
| 58 | 66.52 | 9.66 | 9.47 | 0.00 | 8.28 | 1.59 | 0.00 | 0.03 | 0.00 | 0.00 | 0.10 | 3.86 | 0.483 |
| 59 | 66.44 | 9.61 | 9.42 | 0.00 | 8.24 | 1.59 | 0.00 | 0.03 | 0.00 | 0.72 | 0.10 | 3.85 | 0.000 |
| 60 | 67.08 | 9.62 | 9.42 | 0.00 | 8.25 | 1.59 | 0.00 | 0.03 | 0.00 | 0.00 | 0.00 | 3.85 | 0.000 |
| 61 | 66.12 | 9.62 | 10.39 | 2.88 | 6.95 | 0.00 | 0.00 | 0.10 | 0.00 | 0.00 | 0.10 | 3.85 | 0.000 |
| 62 | 67.18 | 9.62 | 9.42 | 0.00 | 8.25 | 1.59 | 0.00 | 0.00 | 0.00 | 0.00 | 0.10 | 3.85 | 0.000 |
| 63 | 67.18 | 9.62 | 9.42 | 0.00 | 8.25 | 1.59 | 0.00 | 0.00 | 0.00 | 0.00 | 0.10 | 3.85 | 0.000 |
| 64 | 67.18 | 9.62 | 9.42 | 0.00 | 8.25 | 1.59 | 0.00 | 0.00 | 0.00 | 0.00 | 0.10 | 3.85 | 0.000 |
| 65 | 67.18 | 9.62 | 9.42 | 0.00 | 8.25 | 1.59 | 0.00 | 0.00 | 0.00 | 0.00 | 0.10 | 3.85 | 0.000 |
| 66 | 67.18 | 9.62 | 9.43 | 0.00 | 9.83 | 0.00 | 0.00 | 0.00 | 0.00 | 0.00 | 0.10 | 3.85 | 0.000 |
| 67 | 66.45 | 9.62 | 9.42 | 8.41 | 0.58 | 1.59 | 0.00 | 0.00 | 0.00 | 0.00 | 0.10 | 3.85 | 0.000 |
| 68 | 67.17 | 9.62 | 9.42 | 6.97 | 0.58 | 1.59 | 0.00 | 0.00 | 0.00 | 0.72 | 0.10 | 3.85 | 0.000 |
| 69 | 62.44 | 11.65 | 8.64 | 4.76 | 6.29 | 1.26 | 0.00 | 0.00 | 0.00 | 0.00 | 0.10 | 3.88 | 0.971 |
| 70 | 67.10 | 9.61 | 9.41 | 0.00 | 8.24 | 1.59 | 0.00 | 0.12 | 0.00 | 0.00 | 0.10 | 3.84 | 0.000 |
| 71 | 67.02 | 9.59 | 9.40 | 0.00 | 8.23 | 1.58 | 0.00 | 0.23 | 0.00 | 0.00 | 0.10 | 3.84 | 0.000 |
| 72 | 66.86 | 9.57 | 9.38 | 0.00 | 8.21 | 1.58 | 0.00 | 0.47 | 0.00 | 0.00 | 0.10 | 3.83 | 0.000 |
| 73 | 67.16 | 9.61 | 9.42 | 0.00 | 8.24 | 1.59 | 0.00 | 0.02 | 0.00 | 0.00 | 0.10 | 3.85 | 0.000 |
| 74 | 67.16 | 9.61 | 9.42 | 0.00 | 8.24 | 1.59 | 0.00 | 0.02 | 0.00 | 0.00 | 0.10 | 3.85 | 0.000 |
| 75 | 67.15 | 9.61 | 9.42 | 0.00 | 8.24 | 1.59 | 0.00 | 0.02 | 0.00 | 0.00 | 0.10 | 3.84 | 0.000 |
| 76 | 67.10 | 9.61 | 9.41 | 0.00 | 8.24 | 1.59 | 0.00 | 0.12 | 0.00 | 0.00 | 0.10 | 3.84 | 0.000 |
| 77 | 67.12 | 9.61 | 9.42 | 0.00 | 8.24 | 1.59 | 0.00 | 0.12 | 0.00 | 0.00 | 0.07 | 3.84 | 0.000 |
| 78 | 67.07 | 9.60 | 9.41 | 0.00 | 8.23 | 1.58 | 0.00 | 0.19 | 0.00 | 0.00 | 0.05 | 3.84 | 0.000 |
| 79 | 67.15 | 9.61 | 9.42 | 3.84 | 4.41 | 1.59 | 0.00 | 0.00 | 0.08 | 0.00 | 0.05 | 3.85 | 0.000 |

TABLE 1-continued

| Ex. | SiO₂ | Al₂O₃ | B₂O₃ | Li₂O | Na₂O | K₂O | Cs₂O | MgO | CaO | ZnO | SnO₂ | WO₃ | P₂O₅ |
|---|---|---|---|---|---|---|---|---|---|---|---|---|---|
| 80 | 67.11 | 9.61 | 9.41 | 3.84 | 4.41 | 1.59 | 0.00 | 0.00 | 0.13 | 0.00 | 0.05 | 3.84 | 0.000 |
| 81 | 67.12 | 9.61 | 9.42 | 3.84 | 4.41 | 1.59 | 0.00 | 0.00 | 0.13 | 0.00 | 0.05 | 3.84 | 0.000 |
| 82 | 67.16 | 9.61 | 9.42 | 3.85 | 4.41 | 1.59 | 0.00 | 0.00 | 0.07 | 0.00 | 0.05 | 3.85 | 0.000 |
| 83 | 67.44 | 9.41 | 9.46 | 5.79 | 2.74 | 1.59 | 0.00 | 0.00 | 0.13 | 0.00 | 0.05 | 3.38 | 0.000 |
| 84 | 67.12 | 9.61 | 9.42 | 0.00 | 8.24 | 1.59 | 0.00 | 0.00 | 0.13 | 0.00 | 0.05 | 3.84 | 0.000 |
| 85 | 67.16 | 9.61 | 9.42 | 3.84 | 5.99 | 0.00 | 0.00 | 0.00 | 0.08 | 0.00 | 0.05 | 3.85 | 0.000 |
| 86 | 67.14 | 9.61 | 9.42 | 4.84 | 4.99 | 0.02 | 0.00 | 0.00 | 0.08 | 0.00 | 0.05 | 3.84 | 0.000 |
| 87 | 67.18 | 9.62 | 9.43 | 3.85 | 5.60 | 0.40 | 0.00 | 0.00 | 0.04 | 0.00 | 0.05 | 3.85 | 0.000 |
| 88 | 67.17 | 9.62 | 9.42 | 3.85 | 5.30 | 0.70 | 0.00 | 0.00 | 0.06 | 0.00 | 0.05 | 3.85 | 0.000 |
| 89 | 67.18 | 9.62 | 9.43 | 4.81 | 4.64 | 0.40 | 0.00 | 0.00 | 0.04 | 0.00 | 0.05 | 3.85 | 0.000 |
| 90 | 67.16 | 9.61 | 9.42 | 3.84 | 5.99 | 0.00 | 0.00 | 0.00 | 0.08 | 0.00 | 0.05 | 3.85 | 0.000 |
| 91 | 66.90 | 9.61 | 9.42 | 5.08 | 5.00 | 0.02 | 0.00 | 0.00 | 0.08 | 0.00 | 0.05 | 3.84 | 0.000 |
| 92 | 66.42 | 9.61 | 9.42 | 5.56 | 5.00 | 0.02 | 0.00 | 0.00 | 0.08 | 0.00 | 0.05 | 3.84 | 0.000 |
| 93 | 64.97 | 10.57 | 9.42 | 6.03 | 5.01 | 0.03 | 0.00 | 0.00 | 0.08 | 0.00 | 0.05 | 3.84 | 0.000 |
| 94 | 64.49 | 10.57 | 9.42 | 6.51 | 5.01 | 0.03 | 0.00 | 0.00 | 0.08 | 0.00 | 0.05 | 3.84 | 0.000 |
| 95 | 62.55 | 11.53 | 9.42 | 6.63 | 5.21 | 0.73 | 0.00 | 0.00 | 0.06 | 0.00 | 0.05 | 3.84 | 0.000 |
| 96 | 65.94 | 9.61 | 9.42 | 6.03 | 5.00 | 0.03 | 0.00 | 0.00 | 0.08 | 0.00 | 0.05 | 3.84 | 0.000 |
| 97 | 67.12 | 9.61 | 9.42 | 3.84 | 4.41 | 1.59 | 0.00 | 0.00 | 0.12 | 0.00 | 0.05 | 3.84 | 0.000 |
| 98 | 66.96 | 9.59 | 9.39 | 3.83 | 4.40 | 1.58 | 0.00 | 0.00 | 0.12 | 0.00 | 0.05 | 4.07 | 0.000 |
| 99 | 66.80 | 9.56 | 9.37 | 3.82 | 4.39 | 1.58 | 0.00 | 0.00 | 0.12 | 0.00 | 0.05 | 4.30 | 0.000 |
| 100 | 66.49 | 9.52 | 9.33 | 3.81 | 4.37 | 1.57 | 0.00 | 0.00 | 0.12 | 0.00 | 0.05 | 4.76 | 0.000 |
| 101 | 65.38 | 13.69 | 4.88 | 7.70 | 1.92 | 0.03 | 0.00 | 0.00 | 0.01 | 0.00 | 0.10 | 4.39 | 1.891 |
| 102 | 62.46 | 13.69 | 7.81 | 7.70 | 1.92 | 0.03 | 0.00 | 0.00 | 0.01 | 0.00 | 0.10 | 4.39 | 1.891 |
| 103 | 65.30 | 13.67 | 4.88 | 7.69 | 1.92 | 0.03 | 0.00 | 0.00 | 0.15 | 0.00 | 0.10 | 4.38 | 1.888 |
| 104 | 64.81 | 13.67 | 4.88 | 8.17 | 1.92 | 0.04 | 0.00 | 0.00 | 0.15 | 0.00 | 0.10 | 4.38 | 1.888 |
| 105 | 61.18 | 13.20 | 6.79 | 10.06 | 3.73 | 0.04 | 0.00 | 0.00 | 0.14 | 0.00 | 0.11 | 4.75 | 0.000 |
| 106 | 64.18 | 13.54 | 4.83 | 8.09 | 1.91 | 0.03 | 0.00 | 0.00 | 0.15 | 0.00 | 0.10 | 5.30 | 1.870 |
| 107 | 63.57 | 13.41 | 4.78 | 8.02 | 1.89 | 0.03 | 0.00 | 0.00 | 0.14 | 0.00 | 0.10 | 6.20 | 1.852 |
| 108 | 61.51 | 12.98 | 4.63 | 7.76 | 1.83 | 0.03 | 0.00 | 0.00 | 0.14 | 0.00 | 0.09 | 9.24 | 1.792 |
| 109 | 58.80 | 12.41 | 4.42 | 7.42 | 1.75 | 0.03 | 0.00 | 0.00 | 0.13 | 0.00 | 0.09 | 13.24 | 1.713 |

Referring now to Table 2, the article may have SiO₂ from about 65.43 mol % to about 66.7 mol %, Al₂O₃ from about 9.6 mol % to about 9.98 mol %, B₂O₃ from about 9.41 mol % to about 10.56 mol %, R₂O from about 6.47 mol % to about 9.51 mol %, RO from about 0.96 mol % to about 3.85 mol %, WO₃ from about 1.92 mol % to about 3.85 mol %, MoO₃ from about 0 mol % to about 1.92 mol % and SnO₂ from about 0 mol % to about 0.1 mol %. The compositions of Table 2 are provided in an as-batched state within a crucible.

TABLE 2

| Ex. | SiO₂ | Al₂O₃ | B₂O₃ | Li₂O | Na₂O | K₂O | Cs₂O | MgO | CaO | SrO | BaO | SnO₂ | WO₃ | MoO₃ |
|---|---|---|---|---|---|---|---|---|---|---|---|---|---|---|
| 110 | 66.7 | 9.62 | 9.42 | 0 | 8.01 | 1.35 | 0 | 0.96 | 0 | 0 | 0 | 0.1 | 3.85 | 0 |
| 111 | 66.58 | 9.6 | 9.41 | 0 | 7.99 | 1.34 | 0 | 0.03 | 0.15 | 0.96 | 0.01 | 0.1 | 3.84 | 0 |
| 112 | 66.67 | 9.61 | 9.42 | 0 | 8 | 1.35 | 0 | 0.03 | 0.01 | 0.01 | 0.96 | 0.1 | 3.85 | 0 |
| 113 | 66.21 | 9.62 | 9.42 | 0 | 8.01 | 1.35 | 0 | 1.44 | 0.02 | 0 | 0 | 0.1 | 3.85 | 0 |
| 114 | 66.69 | 9.98 | 9.42 | 0 | 7.65 | 1.35 | 0 | 0.96 | 0.02 | 0 | 0 | 0.1 | 3.85 | 0 |
| 115 | 66.58 | 9.6 | 9.41 | 0 | 0.15 | 9.36 | 0 | 0.96 | 0.01 | 0 | 0 | 0.1 | 3.84 | 0 |
| 116 | 66.65 | 9.61 | 9.42 | 9.37 | 0.06 | 0 | 0 | 0.96 | 0 | 0 | 0 | 0.1 | 3.84 | 0 |
| 117 | 66.59 | 9.6 | 9.41 | 0 | 0.33 | 0.01 | 9.17 | 0.96 | 0 | 0 | 0 | 0.1 | 3.84 | 0 |
| 118 | 65.43 | 9.6 | 10.6 | 0 | 0.15 | 9.36 | 0 | 0.96 | 0 | 0 | 0 | 0.1 | 3.84 | 0 |
| 119 | 66.7 | 9.62 | 9.42 | 0 | 7.53 | 0.87 | 0 | 1.92 | 0 | 0 | 0 | 0.1 | 3.85 | 0 |
| 120 | 66.7 | 9.62 | 9.42 | 0 | 6.47 | 0 | 0 | 3.85 | 0 | 0 | 0 | 0.1 | 3.85 | 0 |
| 121 | 66.7 | 9.62 | 9.42 | 0 | 8.01 | 1.35 | 0 | 0.96 | 0 | 0 | 0 | 0.1 | 2.89 | 0.96 |
| 122 | 66.7 | 9.62 | 9.42 | 0 | 8.01 | 1.35 | 0 | 0.96 | 0 | 0 | 0 | 0.1 | 1.92 | 1.92 |

Referring now to Table 3, the article may have SiO₂ from about 60.15 mol % to about 67.29 mol %, Al₂O₃ from about 9.0 mol % to about 13.96 mol %, B₂O₃ from about 4.69 mol % to about 20 mol %, R₂O from about 2.99 mol % to about 12.15 mol %, RO from about 0.00 mol % to about 0.14 mol %, WO₃ from about 0 mol % to about 7.03 mol %, MoO₃ from about 0 mol % to about 8.18 mol %, SnO₂ from about 0.05 mol % to about 0.15 mol % and V₂O₅ from about 0 mol % to about 0.34 mol %. It will be understood that any of the exemplary compositions of Table 3 may include Fe₂O₃ from about 0 mol % to about 0.0025 mol %. The compositions of Table 3 are provided in an as-batched state within a crucible.

TABLE 3

| Ex. | SiO$_2$ | Al$_2$O$_3$ | B$_2$O$_3$ | Li$_2$O | Na$_2$O | K$_2$O | Cs$_2$O | MgO | CaO | SnO$_2$ | WO$_3$ | MoO$_3$ | P$_2$O$_5$ | V$_2$O$_5$ |
|---|---|---|---|---|---|---|---|---|---|---|---|---|---|---|
| 123 | 63.9 | 9 | 20 | 3 | 0 | 0 | 0 | 0 | 0 | 0.1 | 0 | 4 | 0 | 0 |
| 124 | 63.91 | 9 | 20 | 0 | 2.99 | 0 | 0 | 0 | 0 | 0.1 | 0 | 4 | 0 | 0 |
| 125 | 63.9 | 9 | 20 | 0 | 0 | 3 | 0 | 0 | 0 | 0.1 | 0 | 4 | 0 | 0 |
| 126 | 63.9 | 9 | 20 | 0 | 0 | 0 | 3 | 0 | 0 | 0.1 | 0 | 4 | 0 | 0 |
| 127 | 64.9 | 9 | 20 | 3 | 0 | 0 | 0 | 0 | 0 | 0.1 | 0 | 3 | 0 | 0 |
| 128 | 62.9 | 11 | 20 | 3 | 0 | 0 | 0 | 0 | 0 | 0.1 | 0 | 3 | 0 | 0 |
| 129 | 65.31 | 14 | 13.47 | 3.07 | 0 | 0 | 0 | 0 | 0 | 0.1 | 0 | 4.09 | 0 | 0 |
| 130 | 60.15 | 14 | 13.47 | 4.09 | 0 | 0 | 0 | 0 | 0 | 0.15 | 0 | 8.18 | 0 | 0 |
| 131 | 67.17 | 9.62 | 9.42 | 4.84 | 5 | 0.021 | 0 | 0.02 | 0.019 | 0.05 | 3.61 | 0.24 | 0 | 0 |
| 132 | 67.17 | 9.62 | 9.42 | 4.84 | 5 | 0.021 | 0 | 0.02 | 0.019 | 0.05 | 3.37 | 0.48 | 0 | 0 |
| 133 | 67.17 | 9.62 | 9.42 | 4.84 | 5 | 0.021 | 0 | 0.02 | 0.019 | 0.05 | 2.88 | 0.96 | 0 | 0 |
| 134 | 67.18 | 9.62 | 9.42 | 4.85 | 5 | 0.021 | 0 | 0 | 0.019 | 0.05 | 1.92 | 1.92 | 0 | 0 |
| 135 | 67.18 | 9.62 | 9.42 | 4.85 | 5 | 0.021 | 0 | 0 | 0.019 | 0.05 | 0.96 | 2.89 | 0 | 0 |
| 136 | 65.24 | 11.6 | 7.04 | 4.37 | 7.77 | 0 | 0 | 0 | 0.079 | 0.1 | 2.85 | 0.95 | 0 | 0 |
| 137 | 65.24 | 11.6 | 7.04 | 4.37 | 7.77 | 0 | 0 | 0 | 0.079 | 0.1 | 1.9 | 1.9 | 0 | 0 |
| 138 | 67.12 | 9.61 | 9.42 | 3.84 | 4.41 | 1.586 | 0 | 0 | 0.121 | 0.05 | 2.88 | 0.96 | 0 | 0 |
| 139 | 67.12 | 9.61 | 9.42 | 3.84 | 4.41 | 1.586 | 0 | 0 | 0.121 | 0.05 | 1.92 | 1.92 | 0 | 0 |
| 140 | 66.96 | 9.59 | 9.39 | 3.83 | 4.4 | 1.582 | 0 | 0 | 0.121 | 0.05 | 2.88 | 1.2 | 0 | 0 |
| 141 | 66.8 | 9.56 | 9.37 | 3.82 | 4.39 | 1.578 | 0 | 0 | 0.121 | 0.05 | 2.87 | 1.43 | 0 | 0 |
| 142 | 66.49 | 9.52 | 9.33 | 3.81 | 4.37 | 1.57 | 0 | 0 | 0.12 | 0.05 | 2.86 | 1.9 | 0 | 0 |
| 143 | 66.96 | 9.59 | 9.39 | 3.83 | 4.4 | 1.582 | 0 | 0 | 0.121 | 0.05 | 1.92 | 2.16 | 0 | 0 |
| 144 | 66.8 | 9.56 | 9.37 | 3.82 | 4.39 | 1.578 | 0 | 0 | 0.12 | 0.05 | 1.91 | 2.39 | 0 | 0 |
| 145 | 66.64 | 9.54 | 9.35 | 3.82 | 4.38 | 1.574 | 0 | 0 | 0.12 | 0.05 | 1.91 | 2.62 | 0 | 0 |
| 146 | 67.16 | 9.61 | 9.42 | 4.84 | 5 | 0.021 | 0 | 0 | 0.003 | 0.1 | 2.88 | 0.96 | 0 | 0 |
| 147 | 67.15 | 9.61 | 9.42 | 6.77 | 3.08 | 0.029 | 0 | 0 | 0.002 | 0.1 | 2.88 | 0.96 | 0 | 0 |
| 148 | 62.97 | 13.3 | 4.74 | 7.94 | 1.87 | 0.034 | 0 | 0 | 0.142 | 0.09 | 6.15 | 0.95 | 1.83 | 0 |
| 149 | 62.38 | 13.2 | 4.69 | 7.87 | 1.85 | 0.034 | 0 | 0 | 0.14 | 0.09 | 7.03 | 0.94 | 1.82 | 0 |
| 150 | 67.1 | 9.61 | 9.41 | 3.84 | 4.41 | 1.585 | 0 | 0 | 0.121 | 0.05 | 2.88 | 0.96 | 0 | 0.034 |
| 151 | 67.1 | 9.61 | 9.41 | 3.84 | 4.41 | 1.585 | 0 | 0 | 0.121 | 0.05 | 1.92 | 1.92 | 0 | 0.034 |
| 152 | 67.1 | 9.61 | 9.41 | 3.84 | 4.41 | 1.585 | 0 | 0 | 0.121 | 0.05 | 3.84 | 0 | 0 | 0.034 |
| 153 | 67.11 | 9.61 | 9.41 | 3.84 | 4.41 | 1.585 | 0 | 0 | 0.121 | 0.05 | 3.84 | 0 | 0 | 0.029 |
| 154 | 67.29 | 9.63 | 9.44 | 4.85 | 4.81 | 0.021 | 0 | 0 | 0.019 | 0.05 | 3.85 | 0 | 0 | 0.034 |
| 155 | 67.15 | 9.61 | 9.42 | 4.84 | 4.99 | 0.021 | 0 | 0 | 0.019 | 0.05 | 3.85 | 0 | 0 | 0.038 |
| 156 | 67.12 | 9.61 | 9.42 | 4.84 | 4.99 | 0.021 | 0 | 0 | 0.019 | 0.05 | 3.84 | 0 | 0 | 0.096 |
| 157 | 66.96 | 9.58 | 9.39 | 4.83 | 4.98 | 0.021 | 0 | 0 | 0.019 | 0.05 | 3.83 | 0 | 0 | 0.335 |

Referring now to Table 4, the article may have SiO$_2$ from about 54.01 mol % to about 67.66 mol %, Al$_2$O$_3$ from about 9.55 mol % to about 11.42 mol %, B$_2$O$_3$ from about 9.36 mol % to about 15.34 mol %, R$_2$O from about 9.79 mol % to about 13.72 mol %, RO from about 0.00 mol % to about 0.22 mol %, WO$_3$ from about 1.74 mol % to about 4.48 mol %, MoO$_3$ from about 0 mol % to about 1.91 mol %, SnO$_2$ from about 0.0 mol % to about 0.21 mol %, V$_2$O$_5$ from about 0 mol % to about 0.03 mol %, Ag from about 0 mol % to about 0.48 mol % and Au from about 0 mol % to about 0.01 mol %. It will be understood that any of the exemplary compositions of Table 4 may include CeO$_2$ from about 0 mol % to about 0.19 mol %, CuO from about 0 mol % to about 0.48 mol %, Br— from about 0 mol % to about 0.52 mol %, Cl— from about 0 mol % to about 0.2 mol %, TiO$_2$ from about 0 mol % to about 0.96 mol % and/or Sb$_2$O$_3$ from about 0 mol % to about 0.29 mol %. The compositions of Table 4 are provided in an as-batched state within a crucible.

TABLE 4

| Ex. | SiO$_2$ | Al$_2$O$_3$ | B$_2$O$_3$ | Li$_2$O | Na$_2$O | K$_2$O | MgO | CaO | SnO$_2$ | WO$_3$ | MoO$_3$ | Ag | Au | V$_2$O$_5$ | F- |
|---|---|---|---|---|---|---|---|---|---|---|---|---|---|---|---|
| 158 | 63.05 | 10.54 | 11.38 | 5.31 | 5.99 | 0.023 | 0 | 0.021 | 0.1 | 3.48 | 0 | 0.105 | 0 | 0.005 | 0 |
| 159 | 63.05 | 10.54 | 11.38 | 5.31 | 5.99 | 0.023 | 0 | 0.021 | 0.1 | 3.48 | 0 | 0.105 | 0 | 0.01 | 0 |
| 160 | 63.04 | 10.54 | 11.37 | 5.31 | 5.99 | 0.023 | 0 | 0.021 | 0.1 | 3.48 | 0 | 0.105 | 0 | 0.02 | 0 |
| 161 | 67.51 | 9.66 | 9.47 | 4.87 | 5.02 | 0.021 | 0 | 0.002 | 0.05 | 3.19 | 0 | 0.097 | 0 | 0.01 | 0 |
| 162 | 63.07 | 10.55 | 11.38 | 5.31 | 5.99 | 0.023 | 0 | 0.021 | 0.05 | 3.48 | 0 | 0.105 | 0 | 0.02 | 0 |
| 163 | 63.03 | 10.54 | 11.37 | 5.31 | 5.99 | 0.023 | 0 | 0.021 | 0.1 | 3.48 | 0 | 0.105 | 0 | 0.03 | 0 |
| 164 | 67.15 | 9.61 | 9.42 | 4.84 | 4.99 | 0.021 | 0 | 0.019 | 0.05 | 3.85 | 0 | 0 | 0 | 0 | 0 |
| 165 | 67.12 | 9.61 | 9.42 | 4.84 | 4.99 | 0.021 | 0 | 0.019 | 0.05 | 3.84 | 0 | 0 | 0 | 0 | 0 |
| 166 | 66.86 | 9.57 | 9.38 | 4.82 | 4.97 | 0.021 | 0 | 0.019 | 0.05 | 3.83 | 0 | 0 | 0 | 0 | 0 |
| 167 | 67.13 | 9.61 | 9.42 | 4.84 | 4.99 | 0.021 | 0.02 | 0.019 | 0.05 | 3.84 | 0 | 0.048 | 0 | 0 | 0 |
| 168 | 67.1 | 9.61 | 9.41 | 4.84 | 4.99 | 0.021 | 0.02 | 0.019 | 0.05 | 3.84 | 0 | 0.096 | 0 | 0 | 0 |
| 169 | 66.85 | 9.57 | 9.38 | 4.82 | 4.97 | 0.02 | 0.02 | 0.019 | 0.05 | 3.83 | 0 | 0.478 | 0 | 0 | 0 |
| 170 | 66.99 | 9.59 | 9.4 | 4.83 | 4.98 | 0.021 | 0 | 0.019 | 0.05 | 3.64 | 0 | 0.479 | 0 | 0 | 0 |
| 171 | 67.05 | 9.6 | 9.41 | 4.84 | 4.99 | 0.021 | 0 | 0.019 | 0.05 | 3.65 | 0 | 0.384 | 0 | 0 | 0 |
| 172 | 67.12 | 9.61 | 9.42 | 4.84 | 4.99 | 0.021 | 0 | 0.019 | 0.05 | 3.65 | 0 | 0.288 | 0 | 0 | 0 |
| 173 | 67.12 | 9.61 | 9.42 | 4.84 | 4.99 | 0.021 | 0 | 0.019 | 0.05 | 3.46 | 0 | 0.480 | 0 | 0 | 0 |
| 174 | 67.18 | 9.62 | 9.42 | 4.85 | 5 | 0.021 | 0 | 0.019 | 0.05 | 3.46 | 0 | 0.385 | 0 | 0 | 0 |
| 175 | 67.25 | 9.63 | 9.43 | 4.85 | 5 | 0.021 | 0 | 0.019 | 0.05 | 3.47 | 0 | 0.289 | 0 | 0 | 0 |
| 176 | 67.06 | 9.6 | 9.41 | 4.84 | 4.99 | 0.021 | 0 | 0.002 | 0.05 | 3.65 | 0 | 0.384 | 0 | 0 | 0 |
| 177 | 67.19 | 9.62 | 9.43 | 4.85 | 5 | 0.021 | 0 | 0.002 | 0.05 | 3.46 | 0 | 0.385 | 0 | 0 | 0 |
| 178 | 67.32 | 9.64 | 9.44 | 4.86 | 5.01 | 0.021 | 0 | 0.002 | 0.05 | 3.28 | 0 | 0.385 | 0 | 0 | 0 |
| 179 | 66.86 | 9.57 | 9.38 | 4.82 | 4.97 | 0.021 | 0 | 0.019 | 0.05 | 3.83 | 0 | 0.383 | 0 | 0 | 0 |
| 180 | 66.8 | 9.56 | 9.37 | 4.82 | 4.97 | 0.02 | 0 | 0.019 | 0.05 | 3.82 | 0 | 0.382 | 0 | 0 | 0 |
| 181 | 66.87 | 9.57 | 9.38 | 4.82 | 4.97 | 0.021 | 0 | 0.003 | 0.05 | 3.83 | 0 | 0.383 | 0 | 0 | 0 |

TABLE 4-continued

| Ex. | SiO$_2$ | Al$_2$O$_3$ | B$_2$O$_3$ | Li$_2$O | Na$_2$O | K$_2$O | MgO | CaO | SnO$_2$ | WO$_3$ | MoO$_3$ | Ag | Au | V$_2$O$_5$ | F- |
|---|---|---|---|---|---|---|---|---|---|---|---|---|---|---|---|
| 182 | 66.74 | 9.55 | 9.36 | 4.81 | 4.96 | 0.02 | 0 | 0.003 | 0.05 | 3.82 | 0 | 0.478 | 0 | 0 | 0 |
| 183 | 66.97 | 9.59 | 9.39 | 4.83 | 4.98 | 0.021 | 0 | 0.003 | 0.05 | 3.64 | 0 | 0.383 | 0 | 0 | 0 |
| 184 | 67.13 | 9.61 | 9.42 | 4.84 | 4.99 | 0.021 | 0 | 0.002 | 0.05 | 3.56 | 0 | 0.288 | 0 | 0 | 0 |
| 185 | 67.19 | 9.62 | 9.43 | 4.85 | 5 | 0.021 | 0 | 0.002 | 0.05 | 3.56 | 0 | 0.192 | 0 | 0 | 0 |
| 186 | 67.26 | 9.63 | 9.44 | 4.85 | 5 | 0.021 | 0 | 0.002 | 0.05 | 3.56 | 0 | 0.096 | 0 | 0 | 0 |
| 187 | 67.21 | 9.62 | 9.43 | 4.85 | 5 | 0.021 | 0 | 0.002 | 0.05 | 3.56 | 0 | 0.192 | 0 | 0 | 0 |
| 188 | 67.18 | 9.62 | 9.42 | 4.85 | 5 | 0.021 | 0 | 0.002 | 0.05 | 3.56 | 0 | 0.192 | 0 | 0 | 0 |
| 189 | 67.26 | 9.63 | 9.44 | 4.85 | 5 | 0.021 | 0 | 0.002 | 0.05 | 3.37 | 0 | 0.289 | 0 | 0 | 0 |
| 190 | 67.32 | 9.64 | 9.44 | 4.86 | 5.01 | 0.021 | 0 | 0.002 | 0.05 | 3.37 | 0 | 0.193 | 0 | 0 | 0 |
| 191 | 67.39 | 9.65 | 9.45 | 4.86 | 5.01 | 0.021 | 0 | 0.002 | 0.05 | 3.38 | 0 | 0.096 | 0 | 0 | 0 |
| 192 | 67.13 | 9.61 | 9.42 | 4.84 | 4.99 | 0.021 | 0 | 0.002 | 0.05 | 3.65 | 0 | 0.192 | 0 | 0 | 0 |
| 193 | 67.32 | 9.64 | 9.44 | 4.86 | 5.01 | 0.021 | 0 | 0.002 | 0.05 | 3.47 | 0 | 0.096 | 0 | 0 | 0 |
| 194 | 67.11 | 9.61 | 9.42 | 4.84 | 4.99 | 0.021 | 0 | 0.002 | 0.05 | 3.36 | 0 | 0.192 | 0 | 0 | 0 |
| 195 | 66.87 | 9.57 | 9.38 | 4.82 | 4.97 | 0.021 | 0 | 0.003 | 0.05 | 3.35 | 0 | 0.191 | 0 | 0 | 0 |
| 196 | 66.84 | 9.57 | 9.38 | 4.82 | 4.97 | 0.021 | 0 | 0.003 | 0.05 | 3.35 | 0 | 0.191 | 0 | 0 | 0 |
| 197 | 66.77 | 9.56 | 9.37 | 4.82 | 4.97 | 0.021 | 0 | 0.003 | 0.05 | 3.35 | 0 | 0.191 | 0 | 0 | 0 |
| 198 | 66.8 | 9.56 | 9.37 | 4.82 | 4.97 | 0.021 | 0 | 0.003 | 0.14 | 3.35 | 0 | 0.191 | 0 | 0 | 0 |
| 199 | 66.84 | 9.57 | 9.38 | 4.82 | 4.97 | 0.021 | 0 | 0.003 | 0.05 | 3.35 | 0 | 0.191 | 0 | 0 | 0 |
| 200 | 67.18 | 9.62 | 9.42 | 4.85 | 5 | 0.021 | 0 | 0.002 | 0.05 | 3.37 | 0 | 0.192 | 0 | 0 | 0 |
| 201 | 67.01 | 9.59 | 9.4 | 4.83 | 4.98 | 0.021 | 0 | 0.002 | 0.05 | 3.36 | 0 | 0.192 | 0 | 0 | 0 |
| 202 | 66.69 | 9.55 | 9.36 | 4.81 | 4.96 | 0.021 | 0 | 0.002 | 0.05 | 3.34 | 0 | 0.191 | 0 | 0 | 0 |
| 203 | 67.47 | 9.66 | 9.47 | 4.87 | 5.02 | 0.021 | 0 | 0.002 | 0.05 | 3.28 | 0 | 0.097 | 0 | 0 | 0 |
| 204 | 67.45 | 9.66 | 9.46 | 4.87 | 5.02 | 0.021 | 0 | 0.002 | 0.05 | 3.28 | 0 | 0.097 | 0 | 0 | 0 |
| 205 | 67.53 | 9.67 | 9.47 | 4.87 | 5.02 | 0.021 | 0 | 0.002 | 0.05 | 3.19 | 0 | 0.097 | 0 | 0 | 0 |
| 206 | 67.52 | 9.67 | 9.47 | 4.87 | 5.02 | 0.021 | 0 | 0.002 | 0.05 | 3.19 | 0 | 0.097 | 0 | 0 | 0 |
| 207 | 67.66 | 9.69 | 9.49 | 4.88 | 5.03 | 0.021 | 0 | 0.002 | 0.05 | 3.00 | 0 | 0.097 | 0 | 0 | 0 |
| 208 | 67.65 | 9.68 | 9.49 | 4.88 | 5.03 | 0.021 | 0 | 0.002 | 0.05 | 3.00 | 0 | 0.097 | 0 | 0 | 0 |
| 209 | 67.55 | 9.67 | 9.48 | 4.87 | 5.02 | 0.021 | 0 | 0.002 | 0.05 | 3.19 | 0 | 0.048 | 0 | 0 | 0 |
| 210 | 67.48 | 9.66 | 9.47 | 4.87 | 5.02 | 0.021 | 0 | 0.002 | 0.05 | 3.19 | 0 | 0.145 | 0 | 0 | 0 |
| 211 | 67.35 | 9.64 | 9.45 | 4.86 | 5.01 | 0.021 | 0 | 0.002 | 0.05 | 3.37 | 0 | 0.193 | 0 | 0 | 0 |
| 212 | 67.36 | 9.64 | 9.45 | 4.86 | 5.01 | 0.021 | 0 | 0.002 | 0.05 | 3.38 | 0 | 0.193 | 0 | 0 | 0 |
| 213 | 67.35 | 9.64 | 9.45 | 4.86 | 5.01 | 0.021 | 0 | 0.024 | 0.05 | 3.37 | 0 | 0.193 | 0 | 0 | 0 |
| 214 | 67.13 | 9.61 | 9.42 | 4.84 | 4.99 | 0.021 | 0 | 0.002 | 0.05 | 3.56 | 0 | 0.384 | 0 | 0 | 0 |
| 215 | 67.1 | 9.61 | 9.41 | 4.84 | 4.99 | 0.021 | 0 | 0.002 | 0.05 | 3.55 | 0 | 0.384 | 0 | 0 | 0 |
| 216 | 63.69 | 10.64 | 10.43 | 5.36 | 5.53 | 0.023 | 0 | 0.021 | 0.05 | 3.83 | 0 | 0.426 | 0 | 0 | 0 |
| 217 | 66.45 | 9.62 | 9.42 | 6.73 | 3.84 | 0.036 | 0 | 0.019 | 0.05 | 3.46 | 0 | 0.385 | 0 | 0 | 0 |
| 218 | 63.62 | 10.63 | 10.42 | 5.36 | 5.52 | 0.023 | 0 | 0.021 | 0.05 | 3.93 | 0 | 0.425 | 0 | 0 | 0 |
| 219 | 63.55 | 10.62 | 10.41 | 5.35 | 5.52 | 0.023 | 0 | 0.021 | 0.05 | 4.03 | 0 | 0.425 | 0 | 0 | 0 |
| 220 | 63.25 | 10.57 | 10.36 | 5.59 | 5.49 | 0.024 | 0 | 0.021 | 0.05 | 4.23 | 0 | 0.423 | 0 | 0 | 0 |
| 221 | 61.37 | 11.19 | 10.96 | 5.64 | 5.81 | 0.024 | 0 | 0.022 | 0.06 | 4.48 | 0 | 0.448 | 0 | 0 | 0 |
| 222 | 61.58 | 11.23 | 11 | 5.66 | 5.83 | 0.024 | 0 | 0.022 | 0.06 | 4.15 | 0 | 0.449 | 0 | 0 | 0 |
| 223 | 61.51 | 11.21 | 10.99 | 5.65 | 5.83 | 0.024 | 0 | 0.022 | 0.06 | 4.26 | 0 | 0.449 | 0 | 0 | 0 |
| 224 | 63.48 | 10.61 | 10.39 | 5.61 | 5.51 | 0.024 | 0 | 0.021 | 0.05 | 3.98 | 0 | 0.318 | 0 | 0 | 0 |
| 225 | 63.42 | 10.6 | 10.38 | 5.6 | 5.51 | 0.024 | 0 | 0.021 | 0.05 | 3.97 | 0 | 0.424 | 0 | 0 | 0 |
| 226 | 63.36 | 10.59 | 10.37 | 4.29 | 6.43 | 0.395 | 0 | 0.218 | 0.05 | 3.97 | 0 | 0.318 | 0 | 0 | 0 |
| 227 | 63.29 | 10.57 | 10.36 | 4.29 | 6.43 | 0.395 | 0 | 0.218 | 0.05 | 3.97 | 0 | 0.423 | 0 | 0 | 0 |
| 228 | 62.74 | 10.48 | 11.32 | 4.25 | 6.53 | 0.246 | 0 | 0.133 | 0.05 | 3.93 | 0 | 0.314 | 0 | 0 | 0 |
| 229 | 62.63 | 10.46 | 11.3 | 4.25 | 6.52 | 0.308 | 0 | 0.133 | 0.05 | 3.92 | 0 | 0.419 | 0 | 0 | 0 |
| 230 | 62.88 | 10.51 | 11.35 | 5.29 | 5.98 | 0.023 | 0 | 0.021 | 0.05 | 3.57 | 0 | 0.315 | 0 | 0 | 0 |
| 231 | 62.69 | 10.47 | 11.31 | 5.28 | 5.97 | 0.022 | 0 | 0.021 | 0.05 | 3.88 | 0 | 0.314 | 0 | 0 | 0 |
| 232 | 64.74 | 9.98 | 10.78 | 5.03 | 5.69 | 0.021 | 0 | 0.02 | 0.05 | 3.39 | 0 | 0.299 | 0 | 0 | 0 |
| 233 | 64.54 | 9.95 | 10.75 | 5.01 | 5.67 | 0.021 | 0 | 0.02 | 0.05 | 3.68 | 0 | 0.299 | 0 | 0 | 0 |
| 234 | 62.82 | 10.5 | 11.34 | 5.29 | 5.98 | 0.023 | 0 | 0.021 | 0.05 | 3.78 | 0 | 0.21 | 0 | 0 | 0 |
| 235 | 62.75 | 10.48 | 11.32 | 5.28 | 5.97 | 0.023 | 0 | 0.021 | 0.05 | 3.88 | 0 | 0.21 | 0 | 0 | 0 |
| 236 | 63.05 | 10.53 | 11.38 | 5.31 | 6 | 0.023 | 0 | 0.021 | 0.05 | 3.48 | 0 | 0.158 | 0 | 0 | 0 |
| 237 | 63.08 | 10.54 | 11.38 | 5.31 | 6 | 0.023 | 0 | 0.021 | 0.05 | 3.48 | 0 | 0.105 | 0 | 0 | 0 |
| 238 | 63.25 | 10.57 | 11.41 | 5.32 | 6.02 | 0.023 | 0 | 0.021 | 0.05 | 3.17 | 0 | 0.159 | 0 | 0 | 0 |
| 239 | 63.28 | 10.57 | 11.42 | 5.33 | 6.02 | 0.023 | 0 | 0.021 | 0.05 | 3.17 | 0 | 0.106 | 0 | 0 | 0 |
| 240 | 62.98 | 10.52 | 11.36 | 5.3 | 5.99 | 0.023 | 0 | 0.021 | 0.05 | 3.58 | 0 | 0.158 | 0 | 0 | 0 |
| 241 | 62.95 | 10.52 | 11.36 | 5.3 | 5.99 | 0.023 | 0 | 0.021 | 0.05 | 3.58 | 0 | 0.21 | 0 | 0 | 0 |
| 242 | 63.52 | 10.61 | 10.4 | 5.61 | 5.51 | 0.024 | 0 | 0.021 | 0.05 | 3.98 | 0 | 0.265 | 0 | 0 | 0 |
| 243 | 63.59 | 10.62 | 10.41 | 5.62 | 5.52 | 0.024 | 0 | 0.021 | 0.05 | 3.88 | 0 | 0.266 | 0 | 0 | 0 |
| 244 | 63.65 | 10.63 | 10.42 | 5.62 | 5.53 | 0.024 | 0 | 0.021 | 0.05 | 3.78 | 0 | 0.266 | 0 | 0 | 0 |
| 245 | 62.85 | 10.5 | 11.34 | 5.55 | 5.46 | 0.024 | 0 | 0.021 | 0.05 | 3.94 | 0 | 0.262 | 0 | 0 | 0 |
| 246 | 62.92 | 10.51 | 11.35 | 5.56 | 5.46 | 0.024 | 0 | 0.021 | 0.05 | 3.84 | 0 | 0.263 | 0 | 0 | 0 |
| 247 | 62.98 | 10.52 | 11.36 | 5.56 | 5.47 | 0.024 | 0 | 0.021 | 0.05 | 3.74 | 0 | 0.263 | 0 | 0 | 0 |
| 248 | 63.02 | 10.53 | 11.37 | 5.3 | 6 | 0.023 | 0 | 0.021 | 0.05 | 3.58 | 0 | 0.105 | 0 | 0 | 0 |
| 249 | 63 | 10.53 | 11.37 | 5.3 | 6 | 0.023 | 0 | 0.021 | 0.05 | 3.58 | 0 | 0.132 | 0 | 0 | 0 |
| 250 | 63.09 | 10.54 | 11.38 | 5.31 | 6 | 0.023 | 0 | 0.021 | 0.05 | 3.48 | 0 | 0.098 | 0 | 0 | 0 |
| 251 | 63.1 | 10.54 | 11.38 | 5.31 | 6 | 0.023 | 0 | 0.021 | 0.05 | 3.48 | 0 | 0.087 | 0 | 0 | 0 |
| 252 | 63.12 | 10.55 | 11.39 | 5.31 | 6.01 | 0.023 | 0 | 0.021 | 0 | 3.48 | 0 | 0.105 | 0 | 0 | 0 |
| 253 | 63.05 | 10.53 | 11.38 | 5.31 | 6 | 0.023 | 0 | 0.021 | 0.11 | 3.48 | 0 | 0.105 | 0 | 0 | 0 |
| 254 | 63.08 | 10.54 | 11.38 | 5.31 | 6 | 0.023 | 0 | 0.021 | 0.05 | 3.48 | 0 | 0.105 | 0 | 0 | 0 |
| 255 | 63.05 | 10.53 | 11.38 | 5.31 | 6 | 0.023 | 0 | 0.021 | 0.05 | 3.53 | 0 | 0.105 | 0 | 0 | 0 |
| 256 | 58.65 | 11.42 | 13.33 | 5.71 | 6.98 | 0.024 | 0 | 0.02 | 0.1 | 3.61 | 0 | 0.15 | 0 | 0 | 0 |
| 257 | 57.15 | 11.42 | 14.34 | 5.71 | 7.48 | 0.024 | 0 | 0.02 | 0.1 | 3.61 | 0 | 0.15 | 0 | 0 | 0 |
| 258 | 55.64 | 11.42 | 15.34 | 5.71 | 7.98 | 0.024 | 0 | 0.02 | 0.1 | 3.61 | 0 | 0.15 | 0 | 0 | 0 |
| 259 | 58.92 | 11.39 | 12.8 | 5.7 | 6.71 | 0.024 | 0 | 0.2 | 0.1 | 4.00 | 0 | 0.15 | 0 | 0 | 0 |

TABLE 4-continued

| Ex. | SiO2 | Al2O3 | B2O3 | Li2O | Na2O | K2O | MgO | CaO | SnO2 | WO3 | MoO3 | Ag | Au | V2O5 | F- |
|---|---|---|---|---|---|---|---|---|---|---|---|---|---|---|---|
| 260 | 58.17 | 11.39 | 13.3 | 5.7 | 6.96 | 0.024 | 0 | 0.2 | 0.1 | 4.00 | 0 | 0.15 | 0 | 0 | 0 |
| 261 | 58.27 | 9.74 | 10.52 | 4.91 | 5.54 | 0.021 | 0 | 0.019 | 0.1 | 3.40 | 0 | 0.103 | 0 | 0 | 7.39 |
| 262 | 56.48 | 11.06 | 12.91 | 5.53 | 6.76 | 0.023 | 0 | 0.194 | 0.1 | 3.88 | 0 | 0.146 | 0 | 0 | 2.91 |
| 263 | 54.88 | 10.75 | 12.55 | 5.38 | 6.57 | 0.023 | 0 | 0.189 | 0.09 | 3.77 | 0 | 0.142 | 0 | 0 | 5.66 |
| 264 | 56.02 | 10.97 | 12.81 | 5.49 | 6.7 | 0.023 | 0 | 0.193 | 0.10 | 3.85 | 0 | 0.144 | 0 | 0 | 3.7 |
| 265 | 54.01 | 10.58 | 12.35 | 5.29 | 6.46 | 0.022 | 0 | 0.186 | 0.09 | 3.71 | 0 | 0.139 | 0 | 0 | 7.15 |
| 266 | 55.65 | 10.9 | 12.73 | 5.45 | 6.66 | 0.023 | 0 | 0.191 | 0.10 | 3.64 | 0 | 0.127 | 0 | 0 | 4.54 |
| 267 | 55.15 | 10.8 | 12.61 | 5.4 | 6.6 | 0.023 | 0 | 0.19 | 0.09 | 3.60 | 0 | 0.126 | 0 | 0 | 5.4 |
| 268 | 56.39 | 11.04 | 12.89 | 5.52 | 6.75 | 0.023 | 0 | 0.194 | 0.10 | 3.25 | 0 | 0.122 | 0 | 0 | 3.72 |
| 269 | 56.36 | 11.04 | 12.89 | 5.52 | 6.74 | 0.023 | 0 | 0.194 | 0.10 | 3.29 | 0 | 0.124 | 0 | 0 | 3.72 |
| 270 | 56.33 | 11.03 | 12.88 | 5.52 | 6.74 | 0.023 | 0 | 0.194 | 0.10 | 3.34 | 0 | 0.125 | 0 | 0 | 3.72 |
| 271 | 56.3 | 11.03 | 12.87 | 5.52 | 6.74 | 0.023 | 0 | 0.194 | 0.10 | 3.39 | 0 | 0.127 | 0 | 0 | 3.72 |
| 272 | 56.27 | 11.02 | 12.87 | 5.51 | 6.73 | 0.023 | 0 | 0.194 | 0.10 | 3.43 | 0 | 0.129 | 0 | 0 | 3.71 |
| 273 | 56.24 | 11.01 | 12.86 | 5.51 | 6.73 | 0.023 | 0 | 0.193 | 0.10 | 3.48 | 0 | 0.131 | 0 | 0 | 3.71 |
| 274 | 56.3 | 11.03 | 12.87 | 5.52 | 6.74 | 0.023 | 0 | 0.194 | 0.15 | 3.34 | 0 | 0.125 | 0 | 0 | 3.72 |
| 275 | 56.27 | 11.02 | 12.87 | 5.51 | 6.73 | 0.023 | 0 | 0.194 | 0.19 | 3.34 | 0 | 0.125 | 0 | 0 | 3.72 |
| 276 | 56.79 | 11.12 | 12.99 | 5.56 | 6.8 | 0.024 | 0 | 0.195 | 0.1 | 3.37 | 0 | 0.126 | 0 | 0 | 2.93 |
| 277 | 56.76 | 11.12 | 12.98 | 5.56 | 6.79 | 0.024 | 0 | 0.195 | 0.15 | 3.37 | 0 | 0.126 | 0 | 0 | 2.93 |
| 278 | 56.74 | 11.11 | 12.97 | 5.56 | 6.79 | 0.024 | 0 | 0.195 | 0.2 | 3.37 | 0 | 0.126 | 0 | 0 | 2.93 |
| 279 | 56.8 | 11.12 | 12.99 | 5.57 | 6.76 | 0 | 0 | 0.195 | 0.15 | 3.37 | 0 | 0.126 | 0 | 0 | 2.93 |
| 280 | 56.39 | 11.04 | 12.89 | 5.53 | 6.75 | 0.023 | 0 | 0.194 | 0.19 | 3.15 | 0 | 0.118 | 0 | 0 | 3.72 |
| 281 | 56.33 | 11.03 | 12.88 | 5.52 | 6.74 | 0.023 | 0 | 0.194 | 0.19 | 3.24 | 0 | 0.122 | 0 | 0 | 3.72 |
| 282 | 55.42 | 10.85 | 12.67 | 5.43 | 6.63 | 0.023 | 0 | 0.191 | 0.14 | 3.10 | 0 | 0.116 | 0 | 0 | 5.43 |
| 283 | 55.36 | 10.84 | 12.66 | 5.42 | 6.63 | 0.023 | 0 | 0.19 | 0.14 | 3.19 | 0 | 0.12 | 0 | 0 | 5.43 |
| 284 | 66.86 | 9.57 | 9.38 | 4.82 | 4.97 | 0.02 | 0 | 0.019 | 0.05 | 2.87 | 0.96 | 0.479 | 0 | 0 | 0 |
| 285 | 66.86 | 9.57 | 9.38 | 4.82 | 4.97 | 0.02 | 0 | 0.019 | 0.05 | 2.87 | 0.96 | 0.383 | 0 | 0 | 0 |
| 286 | 66.86 | 9.57 | 9.38 | 4.82 | 4.97 | 0.021 | 0 | 0.019 | 0.05 | 1.91 | 1.91 | 0.479 | 0 | 0 | 0 |
| 287 | 66.86 | 9.57 | 9.38 | 4.82 | 4.97 | 0.021 | 0 | 0.019 | 0.05 | 1.91 | 1.91 | 0.383 | 0 | 0 | 0 |
| 288 | 63.06 | 10.54 | 11.38 | 5.31 | 5.99 | 0.023 | 0 | 0.021 | 0.11 | 1.74 | 1.74 | 0.105 | 0 | 0 | 0 |
| 289 | 54.41 | 10.75 | 12.55 | 5.38 | 6.57 | 0.023 | 0 | 0.189 | 0.09 | 2.83 | 1.42 | 0.142 | 0 | 0 | 5.66 |
| 290 | 63.15 | 10.55 | 11.39 | 5.32 | 6.01 | 0.023 | 0 | 0.021 | 0.05 | 3.48 | 0 | 0 | 0.003 | 0 | 0 |
| 291 | 63.15 | 10.55 | 11.39 | 5.32 | 6.01 | 0.023 | 0 | 0.021 | 0.05 | 3.48 | 0 | 0 | 0.006 | 0 | 0 |
| 292 | 63.14 | 10.55 | 11.39 | 5.32 | 6.01 | 0.023 | 0 | 0.021 | 0.05 | 3.48 | 0 | 0 | 0.013 | 0 | 0 |
| 293 | 63.09 | 10.54 | 11.38 | 5.31 | 6 | 0.023 | 0 | 0.021 | 0.05 | 3.48 | 0 | 0.087 | 0.003 | 0 | 0 |
| 294 | 63.09 | 10.54 | 11.38 | 5.31 | 6 | 0.023 | 0 | 0.021 | 0.05 | 3.48 | 0 | 0.087 | 0.006 | 0 | 0 |
| 295 | 63.09 | 10.54 | 11.38 | 5.31 | 6 | 0.023 | 0 | 0.021 | 0.05 | 3.48 | 0 | 0.088 | 0.013 | 0 | 0 |
| 296 | 63.86 | 10.67 | 10.46 | 5.64 | 5.54 | 0.024 | 0 | 0.021 | 0.05 | 3.63 | 0 | 0.099 | 0.003 | 0 | 0 |
| 297 | 63.86 | 10.67 | 10.46 | 5.64 | 5.54 | 0.024 | 0 | 0.021 | 0.05 | 3.63 | 0 | 0.099 | 0.006 | 0 | 0 |
| 298 | 63.85 | 10.67 | 10.46 | 5.64 | 5.54 | 0.024 | 0 | 0.021 | 0.05 | 3.63 | 0 | 0.099 | 0.013 | 0 | 0 |
| 299 | 63.05 | 10.53 | 11.38 | 5.31 | 6 | 0.023 | 0 | 0.021 | 0.11 | 3.48 | 0 | 0.105 | 0.003 | 0 | 0 |
| 300 | 62.92 | 10.51 | 11.35 | 5.3 | 5.99 | 0.023 | 0 | 0.021 | 0.21 | 3.57 | 0 | 0.105 | 0.003 | 0 | 0 |
| 301 | 63.86 | 10.67 | 10.46 | 5.64 | 5.54 | 0.024 | 0 | 0.021 | 0.05 | 3.63 | 0 | 0.099 | 0.002 | 0 | 0 |
| 302 | 63.86 | 10.67 | 10.46 | 5.64 | 5.54 | 0.024 | 0 | 0.021 | 0.05 | 3.63 | 0 | 0.099 | 0.001 | 0 | 0 |
| 303 | 63.52 | 10.61 | 10.4 | 5.61 | 5.51 | 0.024 | 0 | 0.021 | 0.05 | 4.24 | 0 | 0 | 0.003 | 0 | 0 |
| 304 | 63.43 | 10.6 | 10.38 | 5.6 | 5.51 | 0.024 | 0 | 0.021 | 0.05 | 4.24 | 0 | 0 | 0.003 | 0 | 0 |
| 305 | 63.33 | 10.58 | 10.37 | 5.6 | 5.5 | 0.024 | 0 | 0.021 | 0.05 | 4.23 | 0 | 0 | 0.003 | 0 | 0 |
| 306 | 63.3 | 10.58 | 10.36 | 5.59 | 5.5 | 0.024 | 0 | 0.021 | 0.11 | 4.23 | 0 | 0 | 0.003 | 0 | 0 |
| 307 | 61.56 | 10.28 | 10.08 | 5.44 | 5.35 | 0.023 | 0 | 0.021 | 0.05 | 4.11 | 0 | 0 | 0.003 | 0 | 3.09 |
| 308 | 61.49 | 10.27 | 10.07 | 5.43 | 5.34 | 0.023 | 0 | 0.021 | 0.05 | 4.11 | 0 | 0.113 | 0.003 | 0 | 3.08 |
| 309 | 63.51 | 10.61 | 10.4 | 5.61 | 5.52 | 0.024 | 0 | 0.021 | 0.05 | 3.18 | 1.06 | 0 | 0.003 | 0 | 0 |
| 310 | 61.56 | 10.28 | 10.08 | 5.44 | 5.35 | 0.023 | 0 | 0.021 | 0.05 | 3.09 | 1.03 | 0 | 0.003 | 0 | 3.09 |
| 311 | 61.49 | 10.27 | 10.07 | 5.43 | 5.34 | 0.023 | 0 | 0.02 | 0.05 | 3.08 | 1.03 | 0.113 | 0.003 | 0 | 3.08 |

Referring now to Table 5, the article may have $SiO_2$ from about 60.01 mol % to about 77.94 mol %, $Al_2O_3$ from about 0.3 mol % to about 10.00 mol %, $B_2O_3$ from about 10 mol % to about 20 mol %, $R_2O$ from about 0.66 mol % to about 10 mol %, $WO_3$ from about 1.0 mol % to about 6.6 mol % and $SnO_2$ from about 0.0 mol % to about 0.1 mol %. It will be understood that any of the exemplary compositions of Table 5 may include $Sb_2O_3$ from about 0 mol % to about 0.09 mol %. The compositions of Table 5 are provided in an as-batched state within a crucible.

TABLE 5

| Ex. | SiO2 | Al2O3 | B2O3 | Li2O | Cs2O | SnO2 | WO3 |
|---|---|---|---|---|---|---|---|
| 312 | 77.94 | 0.30 | 20.00 | 0.00 | 0.66 | 0.10 | 1.00 |
| 313 | 72.30 | 3.30 | 20.00 | 0.00 | 3.30 | 0.10 | 1.00 |
| 314 | 65.70 | 6.60 | 20.00 | 0.00 | 6.60 | 0.10 | 1.00 |
| 315 | 64.70 | 6.60 | 20.00 | 0.00 | 6.60 | 0.10 | 2.00 |
| 316 | 63.70 | 6.60 | 20.00 | 0.00 | 6.60 | 0.10 | 3.00 |
| 317 | 65.70 | 5.60 | 20.00 | 0.00 | 7.60 | 0.10 | 1.00 |
| 318 | 65.70 | 4.60 | 20.00 | 0.00 | 8.60 | 0.10 | 1.00 |
| 319 | 63.70 | 4.60 | 20.00 | 0.00 | 8.60 | 0.10 | 3.00 |
| 320 | 64.20 | 8.10 | 20.00 | 0.00 | 6.60 | 0.10 | 1.00 |
| 321 | 62.70 | 9.60 | 20.00 | 0.00 | 6.60 | 0.10 | 1.00 |
| 322 | 62.20 | 8.10 | 20.00 | 0.00 | 6.60 | 0.10 | 3.00 |
| 323 | 60.70 | 9.60 | 20.00 | 0.00 | 6.60 | 0.10 | 3.00 |
| 324 | 60.10 | 6.60 | 20.00 | 0.00 | 6.60 | 0.10 | 6.60 |
| 325 | 66.90 | 9.00 | 20.00 | 3.00 | 0.00 | 0.10 | 1.00 |
| 326 | 67.90 | 10.00 | 10.00 | 8.00 | 0.00 | 0.10 | 4.00 |
| 327 | 65.90 | 10.00 | 10.00 | 10.00 | 0.00 | 0.10 | 4.00 |
| 328 | 65.91 | 9.00 | 20.00 | 3.00 | 0.00 | 0.00 | 2.00 |

Referring now to Table 6, provided are a list of comparative exemplary glass compositions that, when melted using unbound alkali batch materials (e.g., alkali carbonates) instead of bound alkalis (e.g., nepheline), form a liquid alkali tungstate which separates during the melting process.

As explained above, the second, liquid, alkali tungstate phase may solidify as a separate crystal which may opalize substrates manufactured therefrom.

TABLE 6

| Ex. | $SiO_2$ | $Al_2O_3$ | $B_2O_3$ | $Li_2O$ | $Na_2O$ | $K_2O$ | $Cs_2O$ | CaO | $SnO_2$ | $WO_3$ | $P_2O_5$ | Ag |
|---|---|---|---|---|---|---|---|---|---|---|---|---|
| 1 | 77.90 | 0.00 | 18.00 | 0.00 | 0.00 | 0.00 | 1.00 | 0.00 | 0.10 | 3.00 | 0.00 | 0.00 |
| 2 | 76.90 | 0.00 | 18.00 | 0.00 | 0.00 | 0.00 | 2.00 | 0.00 | 0.10 | 3.00 | 0.00 | 0.00 |
| 3 | 75.90 | 0.00 | 18.00 | 0.00 | 0.00 | 0.00 | 3.00 | 0.00 | 0.10 | 3.00 | 0.00 | 0.00 |
| 4 | 74.90 | 2.00 | 17.00 | 0.00 | 0.00 | 0.00 | 3.00 | 0.00 | 0.10 | 3.00 | 0.00 | 0.00 |
| 5 | 74.38 | 0.00 | 18.85 | 0.00 | 0.00 | 0.00 | 1.67 | 0.00 | 0.10 | 5.00 | 0.00 | 0.00 |
| 6 | 77.90 | 0.00 | 18.00 | 0.50 | 0.00 | 0.00 | 0.50 | 0.00 | 0.10 | 3.00 | 0.00 | 0.00 |
| 7 | 63.70 | 4.60 | 20.00 | 0.00 | 0.00 | 0.00 | 8.60 | 0.00 | 0.10 | 3.00 | 0.00 | 0.00 |
| 8 | 63.90 | 3.00 | 20.00 | 0.00 | 0.00 | 0.00 | 9.00 | 0.00 | 0.10 | 4.00 | 0.00 | 0.00 |
| 9 | 68.73 | 9.80 | 8.18 | 0.00 | 8.99 | 2.21 | 0.00 | 0.01 | 0.10 | 1.96 | 0.00 | 0.00 |
| 10 | 67.41 | 9.61 | 8.03 | 0.00 | 8.82 | 2.16 | 0.00 | 0.01 | 0.10 | 3.85 | 0.00 | 0.00 |
| 11 | 66.14 | 9.43 | 7.88 | 0.00 | 8.65 | 2.12 | 0.00 | 0.01 | 0.09 | 5.66 | 0.00 | 0.00 |
| 12 | 67.41 | 9.61 | 8.99 | 0.00 | 8.34 | 1.68 | 0.00 | 0.01 | 0.10 | 3.85 | 0.00 | 0.00 |
| 13 | 64.49 | 12.12 | 6.83 | 4.91 | 6.43 | 1.25 | 0.00 | 0.01 | 0.10 | 3.85 | 0.00 | 0.00 |
| 14 | 65.45 | 9.61 | 9.42 | 6.51 | 5.01 | 0.03 | 0.00 | 0.08 | 0.05 | 3.84 | 0.00 | 0.00 |
| 15 | 64.01 | 10.57 | 9.42 | 6.98 | 5.01 | 0.03 | 0.00 | 0.08 | 0.05 | 3.84 | 0.00 | 0.00 |
| 16 | 63.53 | 10.57 | 9.42 | 7.46 | 5.02 | 0.03 | 0.00 | 0.08 | 0.05 | 3.84 | 0.00 | 0.00 |
| 17 | 69.13 | 7.69 | 9.42 | 4.63 | 4.98 | 0.02 | 0.00 | 0.00 | 0.05 | 3.85 | 0.24 | 0.00 |
| 18 | 67.86 | 7.77 | 9.51 | 4.67 | 5.03 | 0.02 | 0.00 | 0.00 | 0.05 | 3.88 | 1.21 | 0.00 |
| 19 | 57.48 | 9.60 | 10.37 | 4.84 | 5.46 | 0.02 | 0.00 | 1.39 | 0.10 | 3.35 | 0.00 | 0.10 |
| 20 | 57.34 | 9.73 | 10.51 | 5.83 | 5.54 | 0.02 | 0.00 | 0.02 | 0.10 | 3.40 | 0.00 | 0.10 |
| 21 | 56.41 | 9.73 | 10.51 | 6.75 | 5.55 | 0.03 | 0.00 | 0.02 | 0.10 | 3.40 | 0.00 | 0.10 |
| 22 | 55.62 | 9.42 | 10.18 | 4.75 | 5.80 | 0.16 | 0.00 | 0.03 | 0.09 | 3.29 | 0.00 | 0.10 |
| 23 | 55.04 | 9.42 | 10.18 | 4.75 | 6.25 | 0.30 | 0.00 | 0.03 | 0.09 | 3.29 | 0.00 | 0.10 |

An Exemplary Application

In terms of context, cadmium and selenium-containing glasses ("CdSe glasses") may be characterized by their toxicity, as they possess appreciable quantities of cadmium and selenium. Some efforts have been made to develop non-toxic or less toxic substitutes for CdSe glasses. For example, some conventional alternatives include Cd-free glass compositions. Yet these compositions still contain selenium and other costly dopants, such as indium and gallium. Further, conventional Cd-free, selenium-containing glasses have been characterized with inferior cut-off wavelengths relative to CdSe glasses and/or viewing angle dependency. Accordingly, Applicants believe there is a need for cadmium and selenium-free materials with comparable or improved optical properties relative to conventional CdSe glasses. Preferably, these materials possess a tunable bandgap and a sharp cut-off as a non-toxic alternative to CdSe glasses. In view of the intended applications of these materials, there is also a need for non-toxic CdSe glass alternatives characterized by low coefficients of thermal expansion (CTE), durability, thermal stress resistance and/or relatively simple and low cost manufacturing and processing requirements.

According to some aspects of the present disclosure, a glass-ceramic is provided that includes an alumino-boro-silicate glass; $WO_3$ from about 0.7 to about 15 mol %; at least one alkali metal oxide from about 0.2 to about 15 mol %; and at least one alkaline earth metal oxide from about 0.1 to about 5 mol %.

According to some aspects of the present disclosure, a glass-ceramic is provided that includes an alumino-boro-silicate glass; $WO_3$ from about 0.7 to about 15 mol %; at least one alkali metal oxide from about 0.2 to about 15 mol %; and at least one alkaline earth metal oxide from about 0.1 to about 5 mol %. Further, the glass-ceramic comprises an optical transmittance of at least 90% from 700 nm to 3000 nm and a sharp cutoff wavelength from about 320 nm to about 525 nm.

According to further aspects of the present disclosure, a glass-ceramic is provided that includes an alumino-boro-silicate glass; $WO_3$ from about 0.7 to about 15 mol %; at least one alkali metal oxide from about 0.2 to about 15 mol %; and at least one alkaline earth metal oxide from about 0.1 to about 5 mol %. Further, the glass-ceramic comprises at least one of an alkaline earth, alkali and mixed alkaline earth-alkali tungstate crystalline phase, the crystalline phase in stoichiometric or non-stoichiometric form.

In some implementations of the foregoing aspects of a glass-ceramic, the alumino-boro-silicate glass includes $SiO_2$ from about 55 to about 80 mol %, $Al_2O_3$ from about 2 to about 20 mol %, and $B_2O_3$ from about 5 to about 40 mol % $SiO_2$ from 68 to 72 mol %, $Al_2O_3$ from 8 to 12 mol % and $B_2O_3$ from 5 to 20 mol %. Further, the at least one alkaline earth metal oxide can include MgO from 0.1 to 5 mol %. The at least one alkali metal oxide can include $Na_2O$ from 5 to 15 mol %. In addition, a difference in the amount of the at least one alkali metal oxide and the $Al_2O_3$ in the alumino-boro-silicate glass can range from −6 mol % to +2 mol %.

In additional implementations of the foregoing aspects of a glass-ceramic, the glass-ceramic can be substantially cadmium free and substantially selenium free. Further, the glass-ceramic can further include at least one dopant selected from the group consisting of F, P, S, Ti, V, Cr, Mn, Fe, Ni, Cu, Zn, Ga, Zr, Nb, Mo, Ag, Sb, Te and Bi. In a further implementation of the foregoing aspects of a glass-ceramic, the glass-ceramic can further include $MoO_3$ from 0% to about 50% of the $WO_3$ present in the glass-ceramic.

According to an additional aspect of the present disclosure, an article is provided that includes a substrate comprising a primary surface and a glass-ceramic composition comprising: an alumino-boro-silicate glass; $WO_3$ from about 0.7 to about 15 mol %; at least one alkali metal oxide from about 0.2 to about 15 mol %; and at least one alkaline earth metal oxide from about 0.1 to about 5 mol %. Further, in some implementations of this aspect, the substrate further comprises a compressive stress region, the compressive stress region extends from the primary surface to a first selected depth in the substrate and is derived from an ion-exchange process. Also, in some embodiments of this aspect, the substrate can comprise an optical transmittance of at least 90% from 700 nm to 3000 nm and a sharp cutoff wavelength from about 320 nm to about 525 nm.

According to a further aspect of the present disclosure, a method of making a glass-ceramic is provided that includes: mixing a batch comprising an alumino-boro-silicate glass, $WO_3$ from about 0.7 to about 15 mol %, at least one alkali metal oxide from about 0.2 to about 15 mol %, and at least one alkaline earth metal oxide from about 0.1 to about 5 mol %; melting the batch between about 1500° C. and about 1700° C. to form a melt; annealing the melt between about 500° C. and about 600° C. to define an annealed melt; and heat treating the annealed melt between about 500° C. and about 1000° C. from about 5 minutes to about 48 hours to form the glass-ceramic.

In some implementations of the foregoing method of making a glass-ceramic, the heat treating comprises heat treating the annealed melt between about 600° C. and about 800° C. from about 5 minutes to about 24 hours to form the glass-ceramic. Further, the heat treating can comprise heat treating the annealed melt between about 650° C. and about 725° C. from about 45 minutes to about 3 hours to form the glass-ceramic. In some embodiments of the method, the glass-ceramic can comprise an optical transmittance of at least 90% from 700 nm to 3000 nm and a sharp cutoff wavelength from about 320 nm to about 525 nm.

As detailed in this disclosure, cadmium and selenium-free glass-ceramic materials are provided with comparable or improved optical properties relative to conventional CdSe glasses. In embodiments, these materials possess a tunable bandgap and a sharp cut-off as a non-toxic alternative to CdSe glasses. Embodiments of these materials can also be characterized by low coefficients of thermal expansion (CTE), durability, thermal stress resistance and/or relatively simple and low cost manufacturing and processing requirements.

More generally, the glass-ceramic materials, and the articles containing them, disclosed herein comprise a balance of an alumino-boro-silicate glass, a tungsten oxide, at least one alkali metal oxide and at least one alkaline earth metal oxide. These glass-ceramic materials can be characterized by an optical transmittance of at least 90% from 700 nm to 3000 nm and a sharp cutoff wavelength from about 320 nm to about 525 nm. Further, these materials can include at least one alkaline earth tungstate crystalline phase, as developed, for example, by particular heat treatment conditions after formation of the glass-ceramic. In addition, embodiments of these glass-ceramic materials are characterized by cutoffs that are tunable by selection of particular heat treatment conditions. As such, these glass-ceramic materials offer a non-toxic, cadmium and selenium-free glass-ceramic as an alternative to conventional CdSe glasses.

Various embodiments of the glass-ceramic materials of the disclosure can be employed in the form of substrates, elements, covers and other elements in any of the following applications: security and surveillance filters configured to suppress visible light for infrared illumination; airport runway lamps; laser eye protection lenses; light barriers for motion control in electrical machines; barcode readers; atomic force microscopes; nanoindenters; laser interferometer metrology solutions; laser-based dynamic calibration systems; lithography solutions for integrated circuit fabrication; photonic bit error ratio test solutions; photonic digital communication analyzers; photonic jitter generation and analysis systems; optical modulation analyzers; optical power meters; optical attenuators; optical sources; lightwave component analyzers; gas chromatographs; spectrometers; fluorescence microscopes; traffic monitoring cameras; environmental waste, water and exhaust gas monitoring equipment; spectral filters for photographic cameras; radiation thermometers; imaging luminance colorimeters; industrial image processing; controlled wavelength light sources used for counterfeit detection; scanners for digitizing color images; astronomy filters; Humphrey field analyzers in medical diagnostic equipment; and optical filters for ultrashort pulsed lasers. Embodiments of these glass-ceramic materials are also suitable for use in various artistic endeavors and applications that make use of colored glass, glass-ceramics and ceramics, such as glassblowers, flameworkers, stained glass artists, etc.

The glass-ceramic materials, and the articles containing them, offer various advantages over conventional glass, glass-ceramic and ceramic materials in the same field, including over CdSe glasses. As noted earlier, the glass-ceramic materials of the disclosure are cadmium and selenium-free, while offering sharp, visible extinctions that are analogous to orange-colored, conventional CdSe filter glasses. The glass-ceramic materials of the disclosure also offer visible extinctions that are sharper in comparison to semiconductor-doped glasses, a conventional alternative to a CdSe glass. Further, the glass-ceramic materials of the disclosure are formulated with lower cost materials in comparison to conventional alternatives to CdSe glass that employ indium, gallium and/or other high-cost metals and constituents. Another advantage of these glass-ceramic materials is that they can be characterized by a cutoff wavelength that is tunable through selection of heat treatment temperature and time conditions. A further advantage of these glass-ceramics is that they are transparent in the near-infrared ("NIR") spectrum and do not exhibit a decrease in transmittance at wavelengths of 900 to 1100 nm, in contrast to CdSe glasses. In addition, these glass-ceramic materials can be produced with conventional melt quench processes, unlike other conventional CdSe glass alternatives, such as indium and gallium-containing semiconductor-doped glasses that require additional semiconductor synthesis and milling steps.

Referring now to FIG. 1, an article 100 is depicted that includes a substrate 10 comprising a glass-ceramic composition according to the disclosure. These articles can be employed in any of the applications outlined earlier (e.g., optical filters, airport runway lamps, barcode readers, etc.). Accordingly, the substrate 10, in some embodiments, can be characterized by an optical transmittance of at least 90% from 700 nm to 3000 nm and a sharp cutoff wavelength from about 320 nm to about 525 nm. The substrate 10 comprises a pair of opposing primary surfaces 12, 14. In some embodiments of the article 100, the substrate 10 comprises a compressive stress region 50. As shown in FIG. 1, the compressive stress region 50 of the article 110 is exemplary, and extends from the primary surface 12 to a first selected depth 52 in the substrate. Some embodiments of the article 100 (not shown) include an additional, comparable compressive stress region 50 that extends from the primary surface 14 to a second selected depth (not shown). Further, some embodiments of the article 100 (not shown) include multiple compressive stress regions 50 extending from the primary surfaces 12, 14 of the substrate 10. Still further, some embodiments of the article 100 (not shown) include multiple compressive stress regions 50 that extend from respective primary surfaces 12, 14 and compressive stress regions that also extend from the short edges of the substrate 10 (i.e., the edges that are normal to the primary surfaces 12, 14). As understood by those with ordinary skill in the field of the disclosure, various combinations of compressive stress region(s) 50 can be incorporated within the article 100, depending on processing conditions employed to generate these compressive stress region(s) 50 (e.g., complete immersion of the substrate 10 in a molten salt ion-exchange bath, partial immersion of the substrate 10 in a molten salt ion-exchange bath, full immersion of the substrate 10, with certain edges and/or surfaces masked, etc.).

As used herein, a "selected depth," (e.g., selected depth 52) "depth of compression" and "DOC" are used interchangeably to define the depth at which the stress in a substrate 10, as described herein, changes from compressive to tensile. DOC may be measured by a surface stress meter, such as an FSM-6000, or a scattered light polariscope (SCALP) depending on the ion exchange treatment. Where the stress in a substrate 10 having a glass or a glass-ceramic composition is generated by exchanging potassium ions into the glass substrate, a surface stress meter is used to measure DOC. Where the stress is generated by exchanging sodium ions into the glass article, SCALP is used to measure DOC. Where the stress in the substrate 10 having a glass or glass-ceramic composition is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass substrates is measured by a surface stress meter. As also used herein, the "maximum compressive stress" is defined as the maximum compressive stress within the compressive stress region 50 in the substrate 10. In some embodiments, the maximum compressive stress is obtained at or in close proximity to the one or more primary surfaces 12, 14 defining the compressive stress region 50. In other embodiments, the maximum compressive stress is obtained between the one or more primary surfaces 12, 14 and the selected depth 52 of the compressive stress region 50.

Referring again to FIG. 1, the substrate 10 of the article 100 can be characterized by a glass-ceramic composition. In embodiments, the glass-ceramic composition of the substrate 10 is given by: $WO_3$ from 0.7 to 15 mol %, at least one alkali metal oxide from 0.2 to 15 mol %, at least one alkaline earth metal oxide from 0.1 to 5 mol % and a balance of a silicate-containing glass. These silicate-containing glasses include alumino-boro-silicate glass, boro-silicate glass, alumino-silicate glass, soda-lime glass, and chemically-strengthened versions of these silicate-containing glasses.

Further, in embodiments of the article 100 depicted in FIG. 1, the substrate 10 may have a selected length and width, or diameter, to define its surface area. The substrate 10 may have at least one edge between the primary surfaces 12, 14 of the substrate 10 defined by its length and width, or diameter. The substrate 10 may also have a selected thickness. In some embodiments, the substrate has a thickness of from about 0.2 mm to about 1.5 mm, from about 0.2 mm to about 1.3 mm, and from about 0.2 mm to about 1.0 mm. In other embodiments, the substrate has a thickness of from about 0.1 mm to about 1.5 mm, from about 0.1 mm to about 1.3 mm, or from about 0.1 mm to about 1.0 mm.

In some embodiments of the article 100, as depicted in exemplary form in FIG. 1, the substrate 10 is selected from a chemically strengthened alumino-boro-silicate glass. For example, the substrate 10 can be selected from chemically strengthened alumino-boro-silicate glass having a compressive stress region 50 extending to a first selected depth 52 of greater than 10 μm, with a maximum compressive stress of greater than 150 MPa. In further embodiments, the substrate 10 is selected from a chemically strengthened alumino-boro-silicate glass having a compressive stress region 50 extending to a first selected depth 52 of greater than 25 μm, with a maximum compressive stress of greater than 400 MPa. The substrate 10 of the article 100 may also include one or more compressive stress regions 50 that extend from one or more of the primary surfaces 12, 14 to a selected depth 52 (or depths) having a maximum compressive stress of greater than about 150 MPa, greater than 200 MPa, greater than 250 MPa, greater than 300 MPa, greater than 350 MPa, greater than 400 MPa, greater than 450 MPa, greater than 500 MPa, greater than 550 MPa, greater than 600 MPa, greater than 650 MPa, greater than 700 MPa, greater than 750 MPa, greater than 800 MPa, greater than 850 MPa, greater than 900 MPa, greater than 950 MPa, greater than 1000 MPa, and all maximum compressive stress levels between these values. In some embodiments, the maximum compressive stress is 2000 MPa or lower. In addition, the depth of compression (DOC) or first selected depth 52 can be set at 10 μm or greater, 15 μm or greater, 20 μm or greater, 25 μm or greater, 30 μm or greater, 35 μm or greater, and to even higher depths, depending on the thickness of the substrate 10 and the processing conditions associated with generating the compressive stress region 50. In some embodiments, the DOC is less than or equal to 0.3 times the thickness (t) of the substrate 10, for example 0.3 t, 0.28 t, 0.26 t, 0.25 t, 0.24 t, 0.23 t, 0.22 t, 0.21 t, 0.20 t, 0.19 t, 0.18 t, 0.15 t, or 0.1 t.

As outlined earlier, the glass-ceramic materials of the disclosure, including the substrate 10 employed in the article 100 (see FIG. 1), are characterized by the following glass-ceramic composition: $WO_3$ from 0.7 to 15 mol %, at least one alkali metal oxide from 0.2 to 15 mol %, at least one alkaline earth metal oxide from 0.1 to 5 mol % and a balance of a silicate-containing glass, e.g., an alumino-boro-silicate glass. In embodiments, the glass-ceramic material can be characterized by an optical transmittance of at least 90% from 700 nm to 3000 nm and a sharp cutoff wavelength from about 320 nm to about 525 nm. In some implementations, the glass-ceramic material can be further characterized by the presence of at least one alkaline earth tungstate crystalline phase and/or at least one alkali metal tungstate crystalline phase. For example, the alkaline earth tungstate crystalline phase can be given by $M_xWO_3$, where M is at least one of Be, Mg, Ca, Sr, Ba, and Ra, and where 0<x<1. In an embodiment of the glass-ceramics of the disclosure, the at least one alkaline earth tungstate crystalline phase is one or both of a $MgWO_4$ crystalline phase (see, e.g., FIG. 5 and its corresponding description) and a $MgW_2O_7$ crystalline phase (see, e.g., FIGS. 6A-6C, 7A & 7B and their corresponding description). As another example, the alkali tungstate crystalline phase can be given by $M_xWO_3$, where M is at least one of Li, Na, K, Cs, Rb, and where 0<x<1. As a further example, the tungstate crystalline phase can be given by $M_xWO_3$, where M is a combination of an alkaline earth from the group consisting of Be, Mg, Ca, Sr, Ba, and Ra and an alkali metal from the group consisting of Li, Na, K, Cs, Rb, and where 0<x<1.

In embodiments, the glass-ceramics of the disclosure are optically transparent in the visible region of the spectrum (i.e., from about 400 nm to about 700 nm). As used herein, the term "optically transparent" refers to a transmittance of greater than about 1% over a 1 mm path length (e.g., in units of %/mm) over at least one 50 nm-wide wavelength band of light in a range from about 400 nm to about 700 nm. In some embodiments, the glass-ceramic has a transmittance of at least greater than about 5%/mm, greater than about 10%/ mm, greater than about 15%/mm, greater than about 20%/mm, greater than about 25%/mm, greater than about 30%/mm, greater than about 40%/mm, greater than about 50%/mm, greater than about 60%/mm, greater than about 70%/mm, and greater than all lower limits between these values, all over at least one 50 nm-wide wavelength band of light in the visible region of the spectrum.

Embodiments of the glass-ceramics of the disclosure absorb light in the ultraviolet ("UV") region (i.e., wavelengths of less than about 370 nm) and/or in the near infrared ("NIR") region (i.e., wavelengths from about 700 nm to about 1700 nm) of the spectrum without the use of additional coatings or films. In some implementations, the glass-ceramic is characterized by a transmittance of less than 10%/mm, less than 9%/mm, less than 8%/mm, less than 7%/mm, less than 6%/mm, less than 5%/mm, less than 4%/mm, less than 3%/mm, less than 2%/mm, and even less than 1%/mm, for light in at least one 50 nm-wide wavelength band of light in the UV region of the spectrum. In some embodiments, the glass-ceramic absorbs or has an absorption of at least 90%/mm, at least 91%/mm, at least 92%/mm, at least 93%/mm, at least 94%/mm, at least 95%/mm, at least 96%/mm, at least 97%/mm, at least 98%/mm, or even at least 99%/mm for light in at least one 50 nm-wide wavelength band of light in the UV region of the spectrum. In other implementations, the glass-ceramic is characterized by a transmittance of less than 10%/mm, less than 9%/mm, less than 8%/mm, less than 7%/mm, less than 6%/mm, less than 5%/mm, less than 4%/mm, less than 3%/mm, less than 2%/mm, and even less than 1%/mm, for light in at least one 50 nm-wide wavelength band of light in the NIR region of the spectrum. In other embodiments, the glass-ceramic absorbs or has an absorption of at least 90%/mm, at least 91%/mm, at least 92%/mm, at least 93%/mm, at least 94%/mm, at least 95%/mm, at least 96%/mm, at least 97%/mm, at least 98%/mm, or even at least 99%/mm for light in at least one 50 nm-wide wavelength band of light in the NIR region of the spectrum.

Embodiments of the glass-ceramic materials of the disclosure comprise an alumino-boro-silicate glass (e.g., as containing $SiO_2$, $Al_2O_3$ and $B_2O_3$), $WO_3$, at least one alkali metal oxide, and at least one alkaline earth metal oxide. In some embodiments, the alumino-boro-silicate glass includes from about 55 mol % to about 80 mol % $SiO_2$, from about 60 mol % to about 74 mol % $SiO_2$, or from about 64 mol % to about 70 mol % $SiO_2$. Further, the alumino-boro-silicate glass of the glass-ceramic can include from about 2 mol % to about 40 mol % $B_2O_3$, from about 5 mol % to about 16 mol % $B_2O_3$, or from about 6 mol % to about 12 mol % $B_2O_3$. In addition, the alumino-boro-silicate glass of the glass-ceramic can include from about 0.5 mol % to about 16 mol % $Al_2O_3$, from about 2 mol % to about 20 mol % $Al_2O_3$, or from about 6 mol % to about 14 mol % $Al_2O_3$.

The glass-ceramic materials of the disclosure include from about 0.7 mol % to about 15 mol % $WO_3$. In some embodiments, the glass-ceramic materials include from about 1 mol % to about 6 mol % $WO_3$, or from about 1.5 mol % to about 5 mol % $WO_3$. In some implementations, the glass-ceramic can further comprise $MoO_3$ from about 0% to about 50% of the $WO_3$ present in the composition (i.e., $MoO_3$ from about 0% to 5 mol %). In some embodiments, the glass-ceramic further comprises $MoO_3$ from about 0 mol % to about 3 mol %, or from about 0 mol % to about 2 mol %.

The glass-ceramic materials of the disclosure include at least one alkali metal oxide. In embodiments, the glass-ceramic materials include at least one alkali metal oxide from about 0.2 mol % to about 15 mol %. The at least one alkali metal oxide can be selected from the group including $Li_2O$, $Na_2O$, $K_2O$, $Rb_2O$ and $Cs_2O$. In some implementations, a difference in the amount of the at least one alkali metal oxide and the $Al_2O_3$ in the alumino-boro-silicate glass ranges from −6 mol % to +2 mol %.

The glass-ceramic materials of the disclosure also include at least one alkaline earth metal oxide. In embodiments, the glass-ceramic includes at least one alkaline earth metal oxide from about 0.1 mol % to about 5 mol %. The at least one alkaline earth metal oxide can be selected from the group including MgO, SrO and BaO. In additional embodiments, the glass-ceramic materials of the disclosure include $SnO_2$ from about 0 mol % to about 0.5 mol %, from about 0 mol % to about 0.25 mol %, or from about 0 mol % to about 0.15 mol %.

The glass-ceramic materials of the disclosure, according to preferred implementations, are substantially cadmium and substantially selenium free. In embodiments, the glass-ceramic can further comprise at least one dopant selected from the group consisting of F, P, S, Ti, V, Cr, Mn, Fe, Ni, Cu, Zn, Ga, Zr, Nb, Mo, Ag, Sb, Te and Bi. In some embodiments, the at least one dopant is present in the glass-ceramic from about 0 mol % to about 0.5 mol % as the oxide.

Non-limiting compositions of glass-ceramics according to the principles of the disclosure are listed below in Table 1A (reported in weight percent) and 1B (reported in mol %).

TABLE 1A

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| $SiO_2$ | 55.5625 | 56.3882 | 55.0188 | 54.7179 | 55.8834 | 55.2258 | 55.741 | 55.444 |
| $Al_2O_3$ | 13.5958 | 13.7978 | 13.4627 | 13.3891 | 13.5764 | 13.6115 | 12.787 | 14.0755 |
| $B_2O_3$ | 9.0977 | 9.2329 | 9.0086 | 8.9594 | 9.0847 | 9.1082 | 9.1269 | 9.0783 |
| $Li_2O$ | 0 | 0 | 0 | 0 | 0 | 0 | 0 | 0 |
| $Na_2O$ | 6.8808 | 5.645 | 6.8134 | 6.7762 | 6.871 | 6.8887 | 7.4195 | 6.5578 |
| $K_2O$ | 1.7586 | 0.0003 | 1.7414 | 1.7318 | 1.7561 | 1.7606 | 1.7642 | 1.7548 |
| $Cs_2O$ | 0 | 0 | 0 | 0 | 0 | 0 | 0 | 0 |
| $SnO_2$ | 0.2009 | 0.2039 | 0.199 | 0.1979 | 0.2006 | 0.2012 | 0.2016 | 0.2005 |
| $WO_3$ | 12.3662 | 12.55 | 12.2452 | 12.1782 | 12.3486 | 12.3805 | 12.4059 | 12.3398 |
| $MoO_3$ | 0 | 0 | 0 | 0 | 0 | 0 | 0 | 0 |
| MgO | 0.5375 | 2.182 | 0.0166 | 0.0161 | 0.2684 | 0.8072 | 0.5392 | 0.5364 |
| SrO | 1.3682 | 0 | 0.0109 | 0 | 0 | 0 | 0 | 0 |
| BaO | 0.0111 | 0 | 2.0136 | 0 | 0 | 0 | 0 | 0 |

|  | Ex. 9 | Ex. 10 | Ex. 11 | Ex. 12 | Ex. 13 | Ex. 14 | Ex. 15 |
|---|---|---|---|---|---|---|---|
| $SiO_2$ | 53.5576 | 58.3067 | 43.5656 | 52.5575 | 55.8432 | 56.2216 | 56.8964 |
| $Al_2O_3$ | 13.1052 | 14.2672 | 10.6602 | 13.0869 | 13.6644 | 13.757 | 13.9222 |

TABLE 1A-continued

| | | | | | | | |
|---|---|---|---|---|---|---|---|
| $B_2O_3$ | 8.7694 | 9.547 | 7.1333 | 9.8295 | 9.1436 | 9.2056 | 9.3161 |
| $Li_2O$ | 0 | 4.0761 | 0 | 0 | 0 | 0 | 0 |
| $Na_2O$ | 0.1232 | 0.0508 | 0.2213 | 0.123 | 6.5014 | 6.9624 | 7.046 |
| $K_2O$ | 11.8054 | 0.0003 | 0.0068 | 11.7889 | 1.1362 | 1.7794 | 1.8008 |
| $Cs_2O$ | 0 | 0 | 28.1377 | 0 | 0 | 0 | 0 |
| $SnO_2$ | 0.1937 | 0.2109 | 0.1575 | 0.1934 | 0.2019 | 0.2033 | 0.2058 |
| $WO_3$ | 11.92 | 12.977 | 9.6961 | 11.9034 | 12.4287 | 9.3847 | 6.3315 |
| $MoO_3$ | 0 | 0 | 0 | 0 | 0 | 1.9421 | 3.9308 |
| MgO | 0.5181 | 0.5641 | 0.4215 | 0.5174 | 1.0805 | 0.5439 | 0.5504 |
| SrO | 0 | 0 | 0 | 0 | 0 | 0 | 0 |
| BaO | 0 | 0 | 0 | 0 | 0 | 0 | 0 |

TABLE 1B

| | Ex. 1 | Ex. 2 | Ex. 3 | Ex. 4 | Ex. 5 | Ex. 6 | Ex. 7 | Ex. 8 |
|---|---|---|---|---|---|---|---|---|
| $SiO_2$ | 66.0670 | 66.6962 | 66.6781 | 67.3275 | 67.1805 | 66.2187 | 66.7009 | 66.6988 |
| $Al_2O_3$ | 9.5259 | 9.6166 | 9.6140 | 9.7077 | 9.6171 | 9.6171 | 9.0162 | 9.9776 |
| $B_2O_3$ | 9.3356 | 9.4245 | 9.4219 | 9.5137 | 9.4249 | 9.4249 | 9.4251 | 9.4249 |
| $Li_2O$ | 0 | 0 | 0 | 0 | 0 | 0 | 0 | 0 |
| $Na_2O$ | 7.9310 | 6.4724 | 8.0043 | 8.0823 | 8.0069 | 8.0069 | 8.6063 | 7.6473 |
| $K_2O$ | 1.3337 | 0.0002 | 1.3460 | 1.3591 | 1.3464 | 1.3464 | 1.3464 | 1.3464 |
| $Cs_2O$ | 0 | 0 | 0 | 0 | 0 | 0 | 0 | 0 |
| $SnO_2$ | 0.0952 | 0.0961 | 0.0961 | 0.0971 | 0.0961 | 0.0962 | 0.0962 | 0.0962 |
| $WO_3$ | 3.8105 | 3.8468 | 3.8457 | 3.8832 | 3.8470 | 3.8470 | 3.8470 | 3.8469 |
| $MoO_3$ | 0 | 0 | 0 | 0 | 0 | 0 | 0 | 0 |
| MgO | 0.9527 | 3.8472 | 0.0300 | 0.0295 | 0.4810 | 1.4428 | 0.9618 | 0.9619 |
| SrO | 0.9433 | 0 | 0.0077 | 0 | 0 | 0 | 0 | 0 |
| BaO | 0.0052 | 0 | 0.9562 | 0 | 0 | 0 | 0 | 0 |

| | Ex. 9 | Ex. 10 | Ex. 11 | Ex. 12 | Ex. 13 | Ex. 14 | Ex. 15 |
|---|---|---|---|---|---|---|---|
| $SiO_2$ | 66.5848 | 66.6470 | 66.5891 | 65.4328 | 66.6986 | 66.6997 | 66.6997 |
| $Al_2O_3$ | 9.6006 | 9.6095 | 9.6012 | 9.6006 | 9.6169 | 9.6171 | 9.6172 |
| $B_2O_3$ | 9.4087 | 9.4175 | 9.4093 | 10.5609 | 9.4248 | 9.4250 | 9.4250 |
| $Li_2O$ | 0 | 9.3682 | 0 | 0 | 0 | 0 | 0 |
| $Na_2O$ | 0.1485 | 0.0563 | 0.3279 | 0.1484 | 7.5273 | 8.0069 | 8.0070 |
| $K_2O$ | 9.3608 | 0.0002 | 0.0066 | 9.3608 | 0.8655 | 1.3464 | 1.3464 |
| $Cs_2O$ | 0 | 0 | 9.1690 | 0 | 0 | 0 | 0 |
| $SnO_2$ | 0.0960 | 0.0961 | 0.0960 | 0.0960 | 0.0961 | 0.0961 | 0.0962 |
| $WO_3$ | 3.8404 | 3.8440 | 3.8406 | 3.8404 | 3.8469 | 2.8852 | 1.9235 |
| $MoO_3$ | 0 | 0 | 0 | 0 | 0 | 0.9617 | 1.9233 |
| MgO | 0.9602 | 0.9612 | 0.9604 | 0.9602 | 1.9238 | 0.9619 | 0.9618 |
| SrO | 0 | 0 | 0 | 0 | 0 | 0 | 0 |
| BaO | 0 | 0 | 0 | 0 | 0 | 0 | 0 |

According to embodiments, the glass-ceramic materials of the disclosure can be made by employing a melt quench process. Appropriate ratios of the constituents may be mixed and blended by turbulent mixing and/or ball milling. Batch materials can include but are not limited to one or more of sand, spodumene, petalite, nepheline syenite, alumina, borax, boric acid, alkali and alkaline earth carbonates and nitrates, tungsten oxide and ammonium tungstate. The batched material is then melted at temperatures ranging from about 1500° C. to about 1700° C. for a predetermined time. In some implementations, the predetermined time ranges from about 6 to about 12 hours, after which time the resulting melt can be cast or formed and then annealed, as understood by those with skill in the field of the disclosure. In some embodiments, the melt can be annealed between about 500° C. and about 600° C. to define an annealed melt.

At this stage of the method, the annealed melt is heat treated between about 500° C. to about 1000° C. from about 5 minutes to about 48 hours to form the glass-ceramic. In embodiments, the heat treating step is conducted at or slightly above the annealing point of the glass-ceramic, and below its softening point, to develop one or more crystalline tungstate phases.

In some embodiments, the annealed melt is heat treated between about 600° C. and about 800° C. from about 5 minutes to about 24 hours to form the glass-ceramic. According to some embodiments, the annealed melt is heat treated between about 650° C. and about 725° C. from about 45 minutes to about 3 hours to form the glass-ceramic. In another implementation, the annealed melt is heat treated according to a temperature and time to obtain particular optical properties, e.g., an optical transmittance of at least 90% from 700 nm to 3000 nm and a sharp cutoff wavelength from about 320 nm to about 525 nm. Further, as is outlined below in the examples, additional heat treatment temperatures and times can be employed to obtain glass-ceramic materials Examples for Exemplary Application The following examples represent certain non-limiting examples of the glass-ceramic materials and articles of the disclosure, including the methods of making them.

Figure 2A:
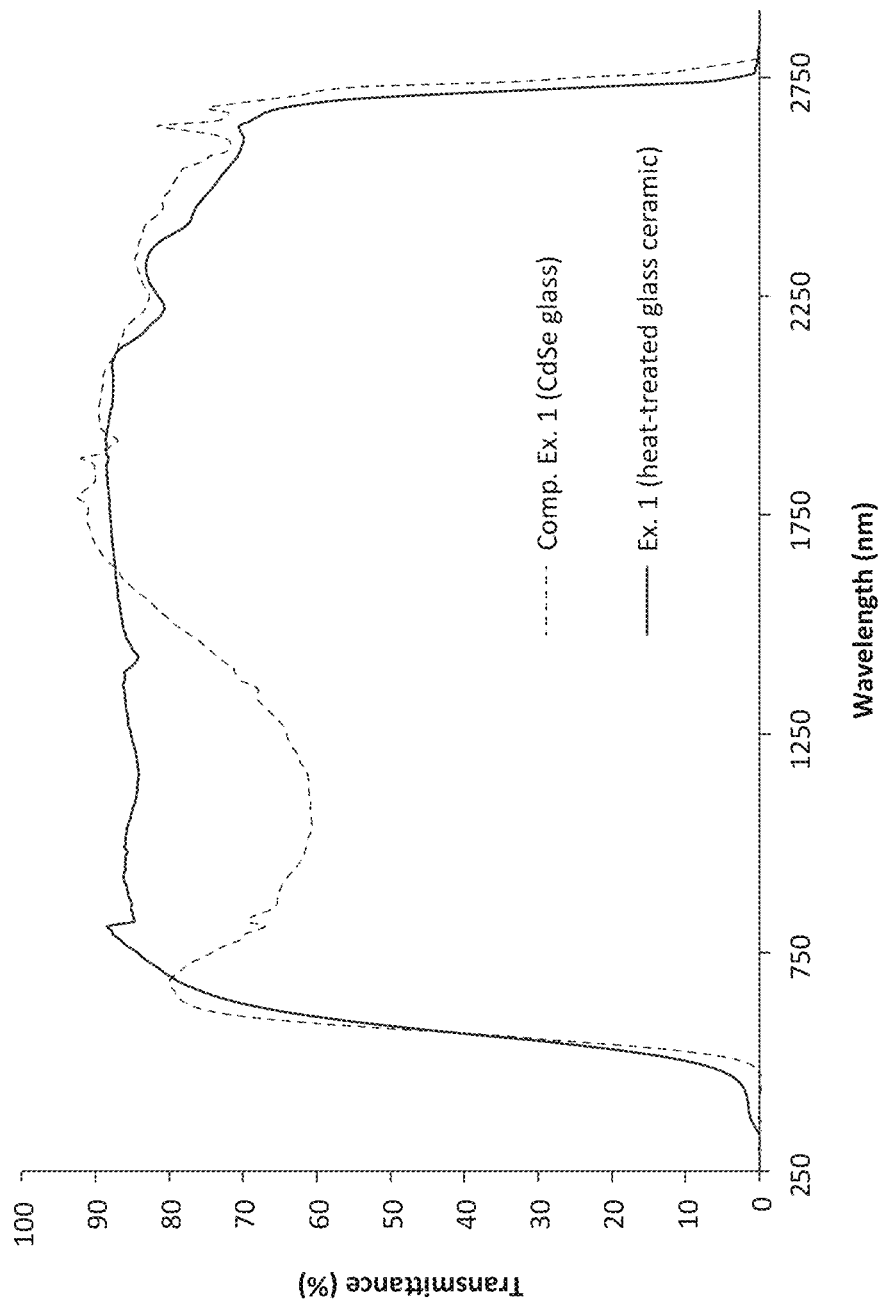
FIG. 2A is a plot of transmittance vs. wavelength of a comparative CdSe glass and a heat-treated glass-ceramic, according to at least one example of the disclosure.
Figure 2B:
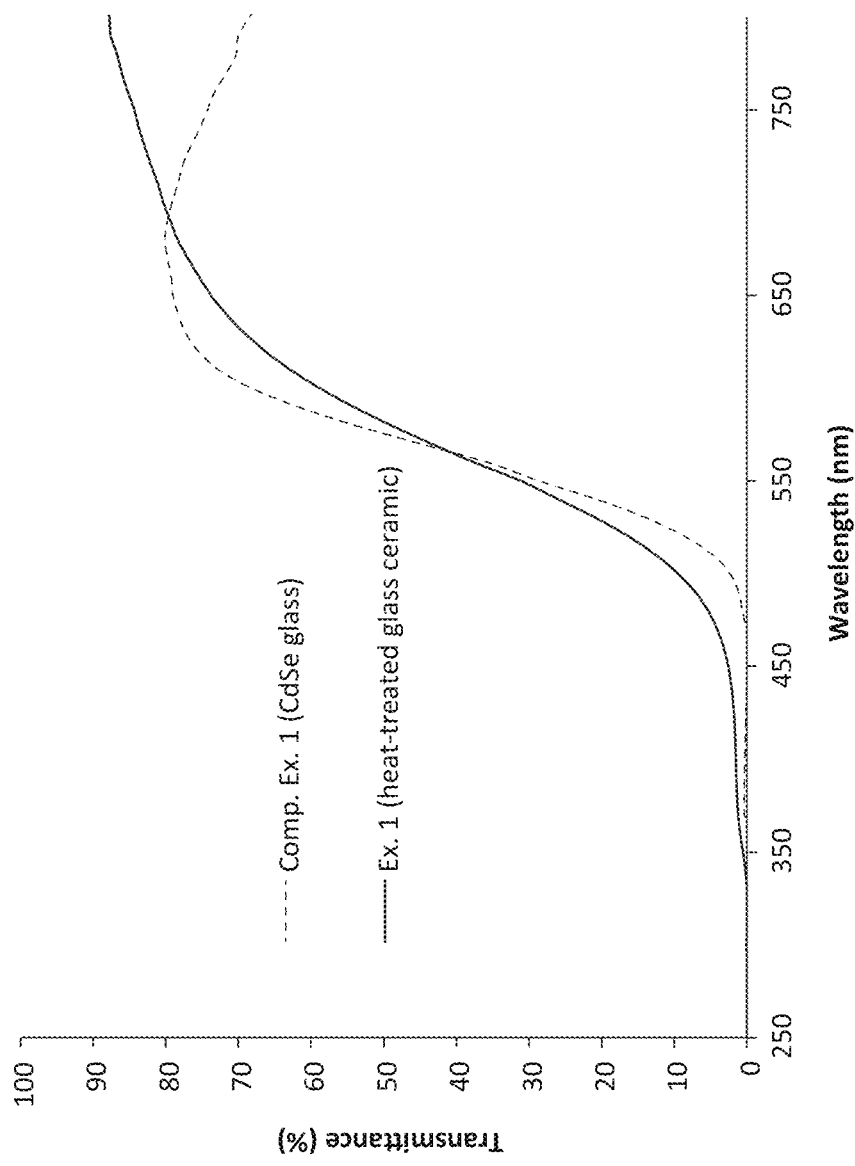
FIG. 2B is the plot in FIG. 2A, as rescaled to show the cutoff wavelength of the comparative CdSe glass and heat-treated glass-ceramic samples.

Referring now to FIGS. 2A and 2B, a plot of transmittance vs. wavelength of a comparative CdSe glass ("Comp. Ex. 1") and a heat-treated glass-ceramic ("Ex. 1") is provided.

Note that FIG. 2B is the plot in FIG. 2A, as rescaled to show the cutoff wavelength of the comparative CdSe glass and heat-treated glass-ceramic samples. In this example, the comparative CdSe glass, Comp. Ex. 1, has a conventional CdSe glass composition according to the following: 40-60% $SiO_2$, 5-20% $B_2O_3$, 0-8% $P_2O_5$, 1.5-6% $Al_2O_3$, 4-8% $Na_2O$, 6-14% $K_2O$, 4-12% ZnO, 0-6% BaO, 0.2-2.0 CdO, 0.2-1% S, and 0-1% Se; and the heat-treated glass-ceramic has the same composition as indicated in Tables 1A and 1B for the Ex. 1 sample. Further, the glass-ceramic depicted in FIGS. 2A and 2B was prepared according to a method of making glass-ceramic materials, as noted earlier in the disclosure, including a heat treating step that comprised heating the annealed melt for about 1 hour at 700° C. In addition, both samples depicted in FIGS. 2A and 2B have a normalized path length of 4 mm. As is evident from these figures, the glass-ceramic sample (Ex. 1), heat treated at 700° C. for 1 hour, exhibits a sharp cutoff at about the same wavelength range and sharpness as the CdSe glass sample (Comp. Ex. 1).

Figure 3A:
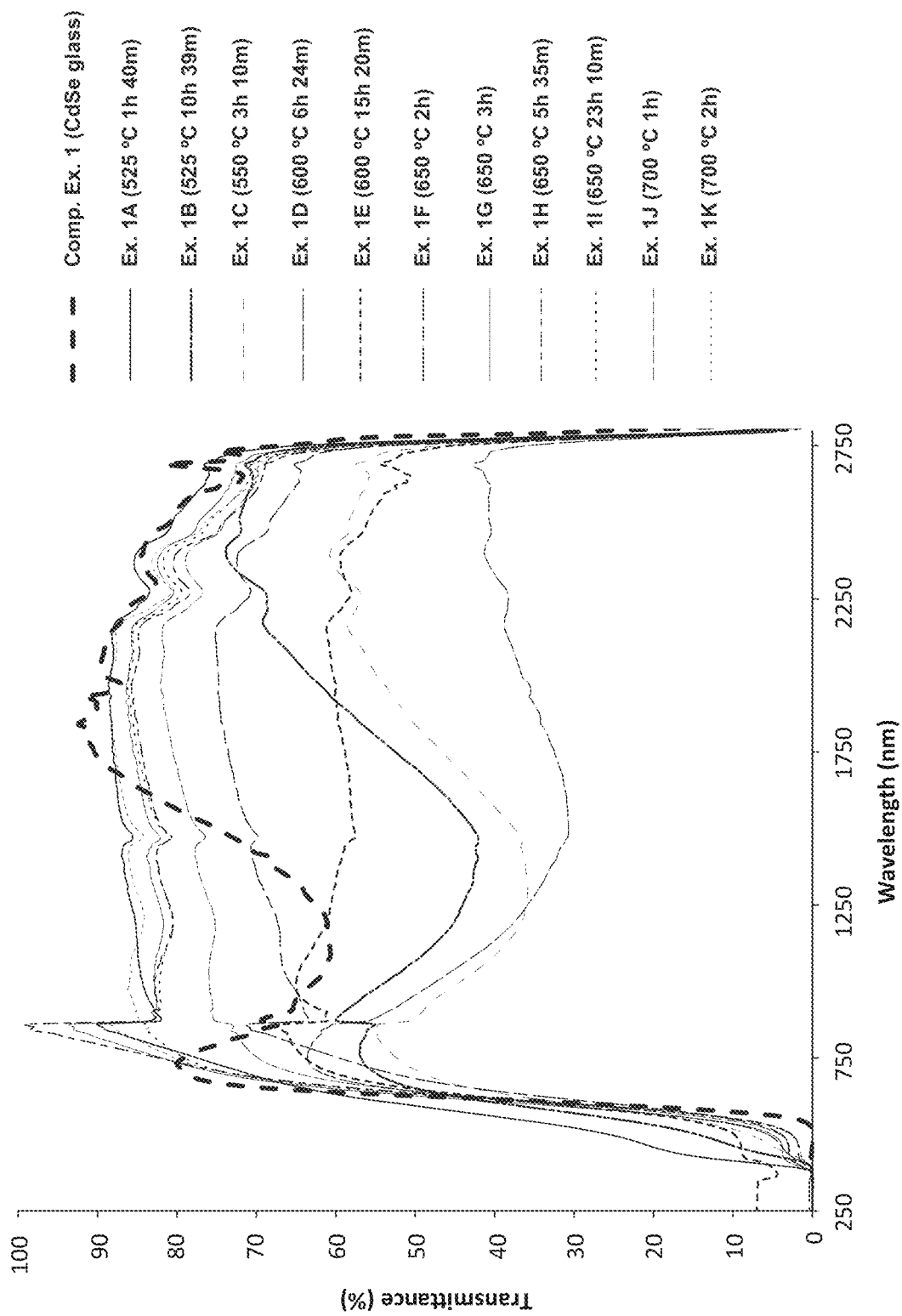
FIG. 3A is a plot of transmittance vs. wavelength of a comparative CdSe glass and glass-ceramic samples heat treated from 525° C. to 700° C. according to various conditions, according to examples of the disclosure.
Figure 3B:
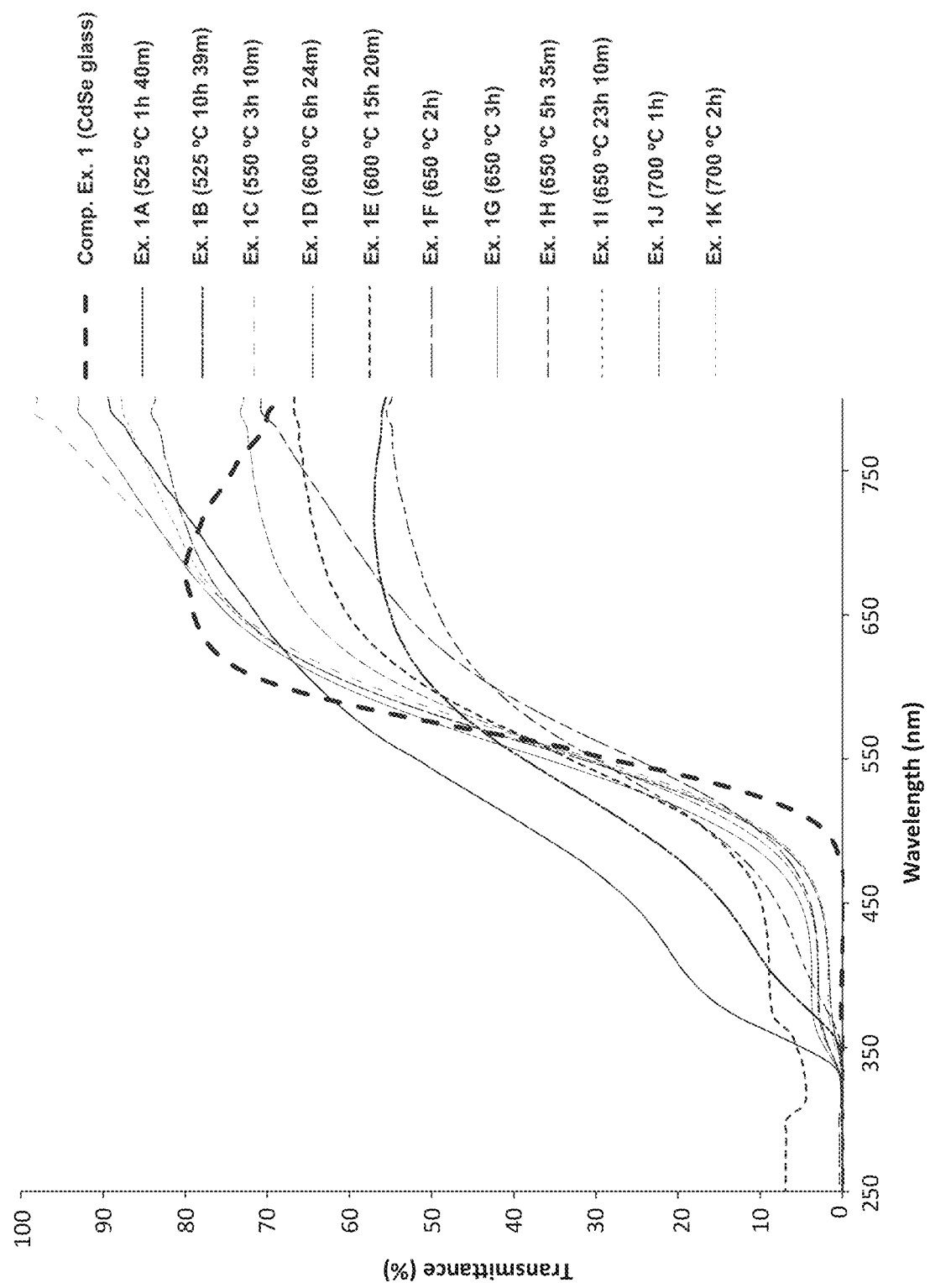
FIG. 3B is the plot in FIG. 3A, as rescaled to show the cutoff wavelength of the comparative CdSe glass and the glass-ceramic samples heat treated according to various conditions.

Referring now to FIGS. 3A and 3B, a plot of transmittance vs. wavelength of a comparative CdSe glass ("Comp. Ex. 1") and a heat-treated glass-ceramic ("Exs. 1A-1K") is provided. Note that FIG. 3B is the plot in FIG. 3A, as rescaled to show the cutoff wavelength of the comparative CdSe glass and the heat-treated glass-ceramic samples. In this example, the comparative CdSe glass, Comp. Ex. 1, has a conventional CdSe glass composition according to the following: 40-60% $SiO_2$, 5-20% $B_2O_3$, 0-8% $P_2O_5$, 1.5-6% $Al_2O_3$, 4-8% $Na_2O$, 6-14% $K_2O$, 4-12% ZnO, 0-6% BaO, 0.2-2.0 CdO, 0.2-1% S, and 0-1% Se; and the heat-treated glass-ceramic samples each have the same composition as indicated in Tables 1A and 1B for the Ex. 1 sample. Further, the glass-ceramics depicted in FIGS. 3A and 3B were each prepared according to a method of making glass-ceramic materials, as noted earlier in the disclosure, including the following heat treatment steps after annealing: 525° C. for 1 hour and 40 minutes (Ex. 1A); 525° C. for 10 hours and 39 minutes (Ex. 1B); 550° C. for 3 hours and 10 minutes (Ex. 1C); 600° C. for 6 hours and 24 minutes (Ex. 1D); 600° C. for 15 hours and 20 minutes (Ex. 1E); 650° C. for 2 hours (Ex. 1F); 650° C. for 3 hours (Ex. 1G); 650° C. for 5 hours and 35 minutes (Ex. 1H); 650° C. for 23 hours and 10 minutes (Ex. 1I); 700° C. for 1 hour (Ex. 1J); and 700° C. for 2 hours (Ex. 1K). In addition, all of the samples depicted in FIGS. 3A and 3B have a normalized path length of 4 mm. As is evident from these figures, all of the glass-ceramic samples (Exs. 1A-1K), heat treated according to various conditions, exhibit a sharp cutoff at about the same wavelength range and sharpness as the CdSe glass (Comp. Ex. 1). Further, it is evident from these figures that various heat treatment temperature and time conditions can be employed to vary and tune the cutoff wavelength and its sharpness within the range of about 320 nm to about 525 nm.

Figure 4A:
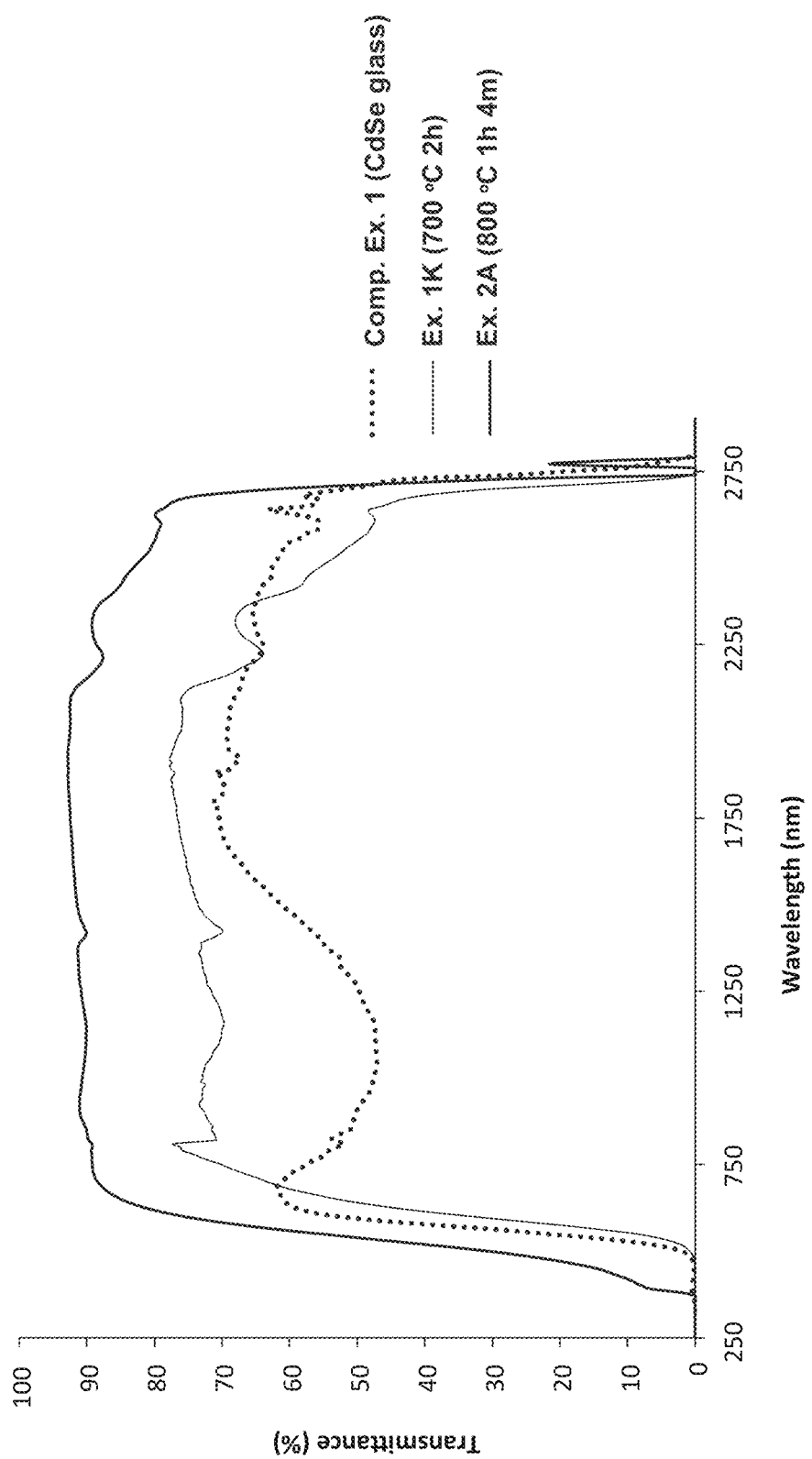
FIG. 4A is a plot of transmittance vs. wavelength of a comparative CdSe glass and glass-ceramic samples heat treated at 700° C. and 800° C. according to various conditions, according to examples of the disclosure.
Figure 4B:
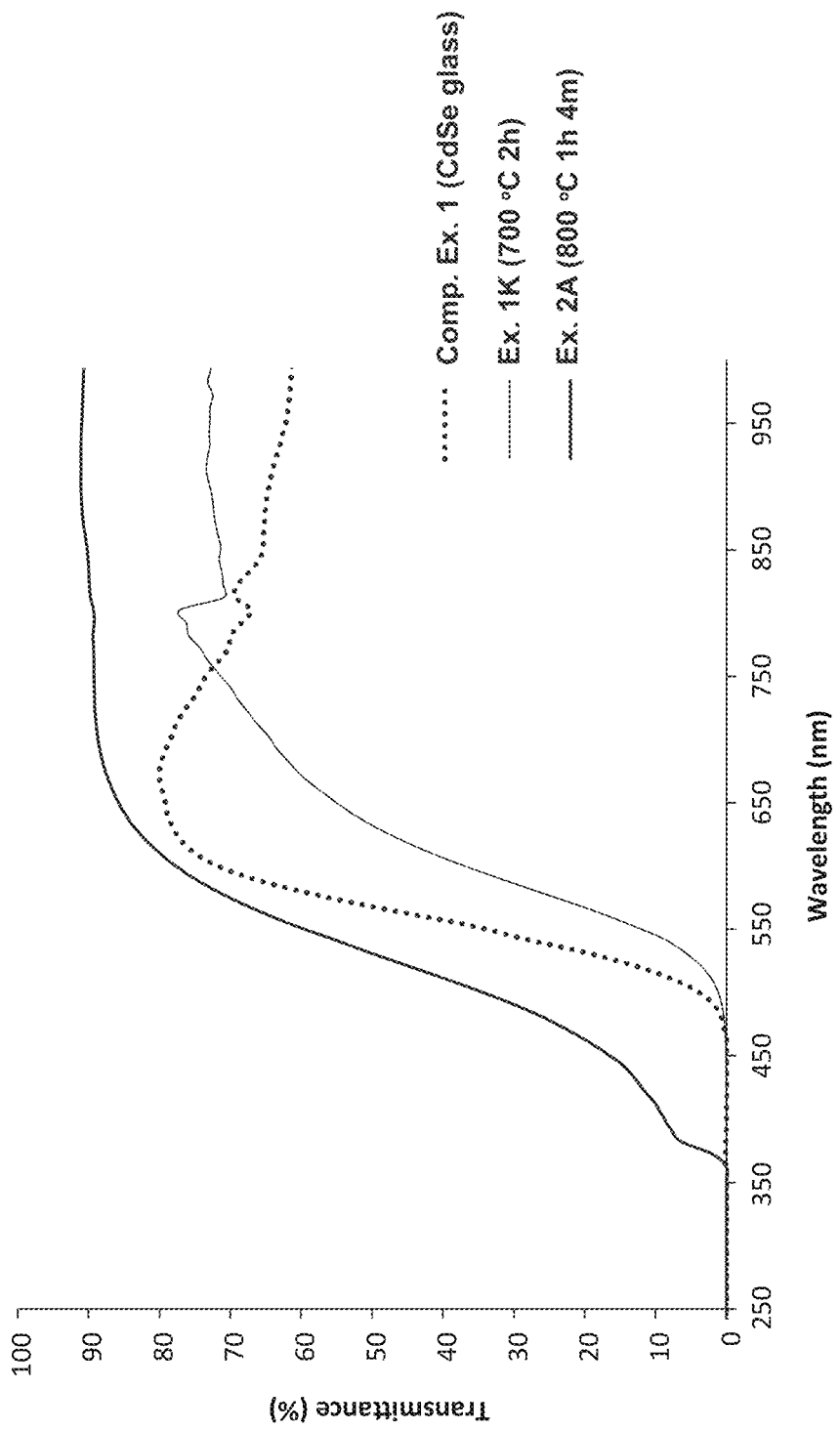
FIG. 4B is the plot in FIG. 4A, as rescaled to show the cutoff wavelength of the comparative CdSe glass and the glass-ceramic samples heat treated according to various conditions.

According to another example, a comparative CdSe glass and glass-ceramic samples heat treated at 700° C. and 800° C. according to various conditions were prepared and evaluated for their optical properties. FIG. 4A is a plot of transmittance vs. wavelength of the comparative CdSe glass ("Comp. Ex. 1") and the glass-ceramic samples heat treated at 700° C. and 800° C. according to various conditions (Exs. 1K and 2A). Note that FIG. 4B is the plot in FIG. 4A, as rescaled to show the cutoff wavelength of the comparative CdSe glass and the glass-ceramic samples heat treated according to various conditions. In this example, the comparative CdSe glass, Comp. Ex. 1, has a conventional CdSe glass composition according to the following: 40-60% $SiO_2$, 5-20% $B_2O_3$, 0-8% $P_2O_5$, 1.5-6% $Al_2O_3$, 4-8% $Na_2O$, 6-14% $K_2O$, 4-12% ZnO, 0-6% BaO, 0.2-2.0 CdO, 0.2-1% S, and 0-1% Se; the heat-treated glass-ceramic sample, Ex. 1K, has the same composition as indicated in Tables 1A and 1B for the Ex. 1 sample; and the heat-treated glass-ceramic sample, Ex. 2A, has the same composition as indicated in Tables 1A and 1B for the Ex. 2 sample. Further, the glass-ceramics depicted in FIGS. 4A and 4B were each prepared according to a method of making glass-ceramic materials, as noted earlier in the disclosure, including the following heat treatment steps after annealing: 700° C. for 2 hours (Ex. 1K); and 800° C. for 1 hour and 4 minutes (Ex. 2A). In addition, all of the samples depicted in FIGS. 4A and 4B have a normalized path length of 4 mm. As is evident from these figures, all of the glass-ceramic samples (Ex. 1K and 2A), heat treated according to various conditions, exhibit a sharp cutoff at about the same wavelength range and sharpness as the CdSe glass (Comp. Ex. 1). Further, it is evident from these figures and the respective compositions of these glass-ceramics (see Tables 1A and 1B) that these magnesium tungsten glass-ceramic compositions, with particular heat treatment conditions, can be employed to vary and tune the cutoff wavelength and its sharpness within the range of about 320 nm to about 525 nm. It is also apparent that the higher magnesium content in the Ex. 2A glass-ceramic (~3.84 mol %) compared to that of the Ex. 1K glass-ceramic (~0.95 mol %) may contribute to its lower cutoff wavelength and perhaps, its higher transmittance in the NIR range. Accordingly, and without being bound by theory, varying magnesium content in these glass-ceramic compositions, along with varying heat treatment conditions, can have the effect of changing the spectra and cutoff wavelength of the glass-ceramic.

Figure 4C:
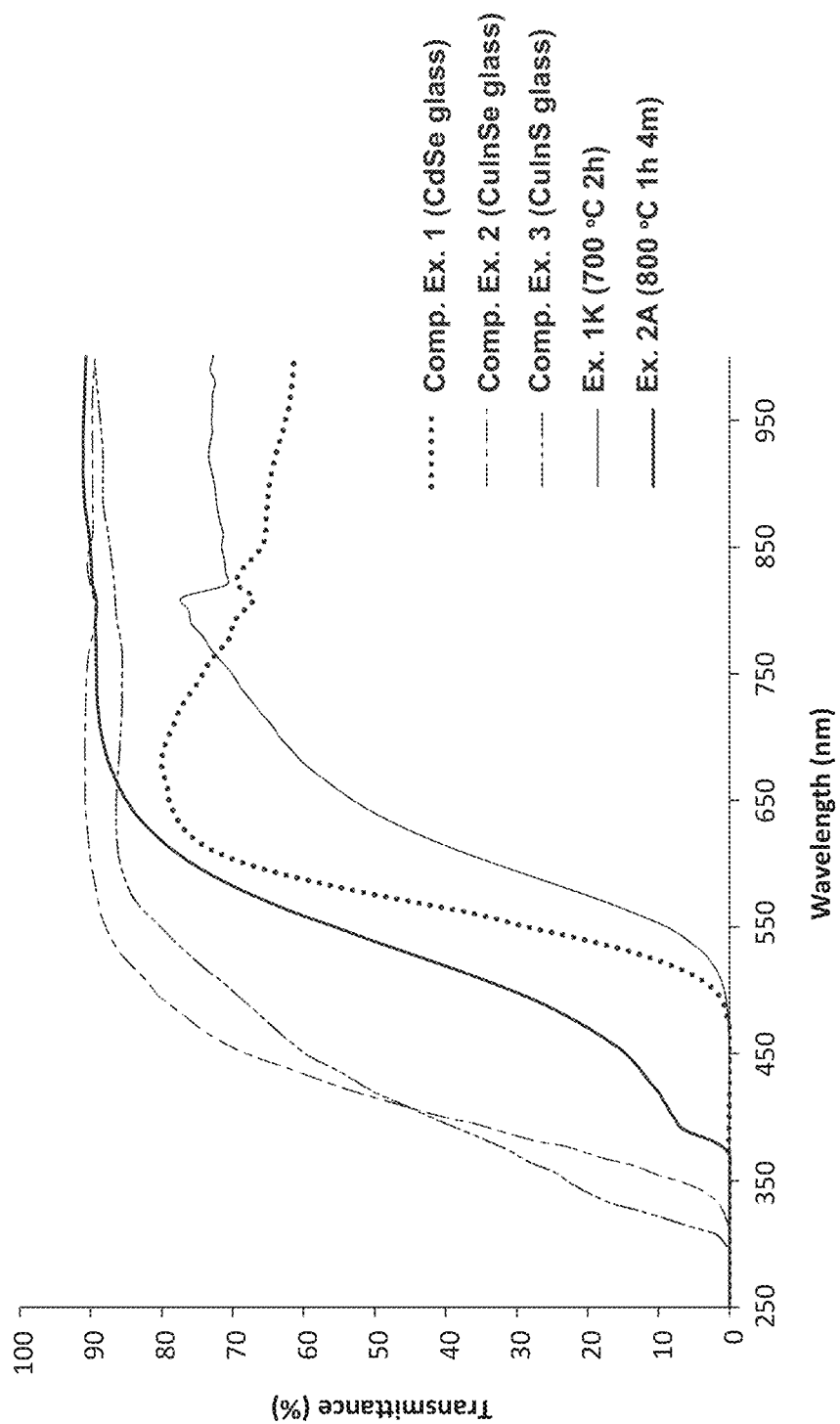
FIG. 4C is the plot in FIG. 4A, along with the transmittance vs. wavelength for comparative CuInSe and CuInS glass samples, as scaled to show the cutoff wavelength of the comparative CdSe glass, the glass-ceramic samples heat treated according to various conditions and the CuInSe and CuInS samples.

Referring now to FIG. 4C, the plot in FIG. 4A is provided again, along with the transmittance vs. wavelength for comparative CuInSe and CuInS glass samples ("Comp. Ex. 2" and "Comp. Ex. 3," respectively). The Comp. Ex. 2 and Comp. Ex. 3 spectral plots were obtained from "Exemption Renewal Request 13(b)," Spectaris e.V., submitted to the Oko-Institut e.V. on Mar. 26, 2015. Further, FIG. 4C is scaled to show the cutoff wavelength of the comparative CdSe glass, Comp. Ex. 1, the glass-ceramic samples heat treated according to various conditions (Ex. 1K and Ex. 2A) and the comparative CuInSe and CuInS samples (Comp. Ex. 2 and Comp. Ex. 3). From FIG. 4C, it is evident that the glass-ceramic materials, Ex. 1K and Ex. 2A, according to the disclosure, outperform the comparative CuInSe and CuInS glasses in terms of approximating the cutoff wavelength of the comparative CdSe glass. That is, these glass-ceramics have optical properties that better approximate those of the CdSe glass relative to other semiconductor-doped glass alternatives, CuInSe and CuInS.

Figure 5:
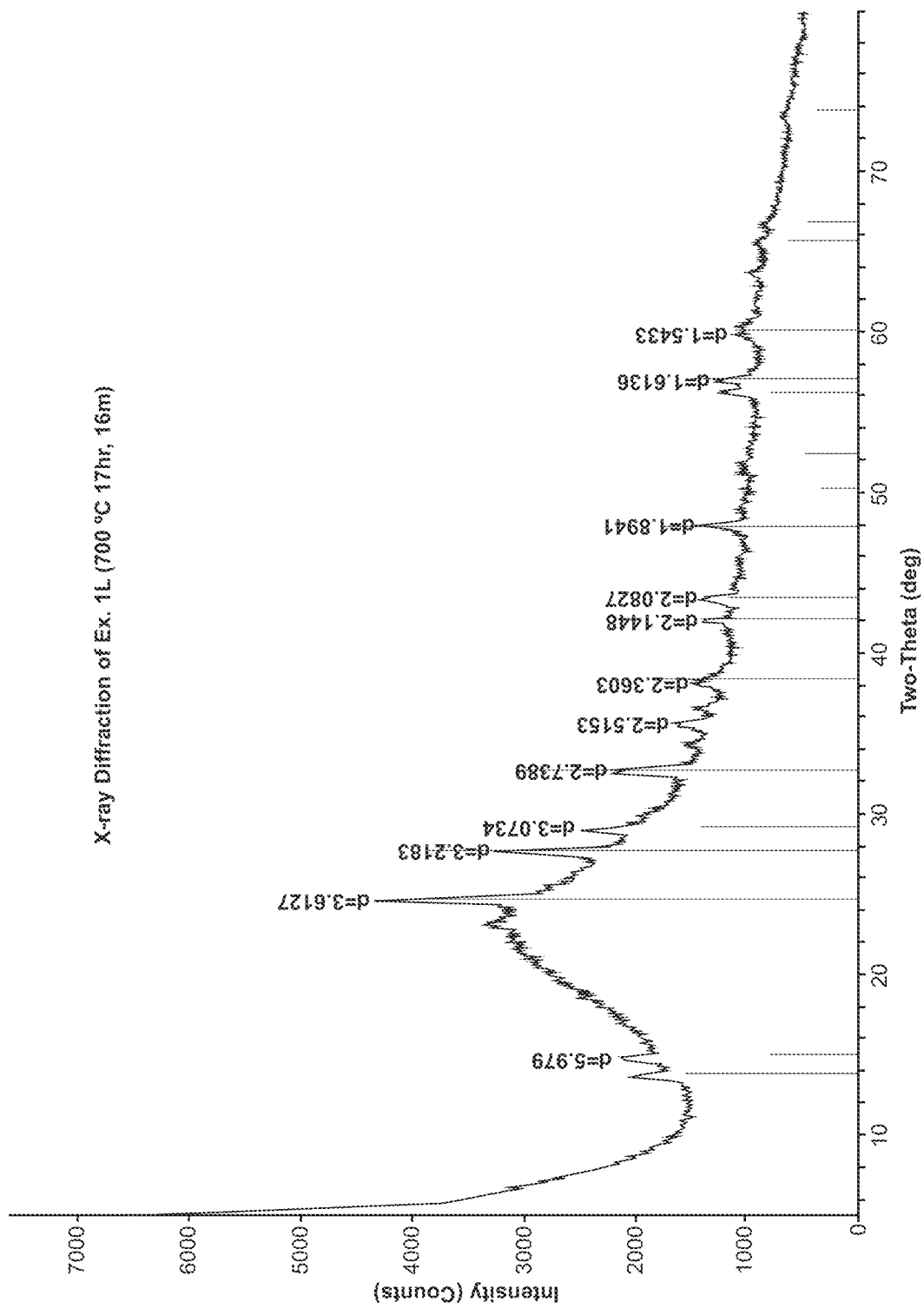
FIG. 5 is an x-ray diffraction ("XRD") plot of a heat-treated glass-ceramic, according to at least one example of the disclosure.

Referring now to FIG. 5, an x-ray diffraction ("XRD") plot of a heat-treated glass-ceramic, Ex. 1L (see Tables 1A and 1B), is provided according to at least one example of the disclosure. This sample was heat-treated at 700° C. for 17 hours and 16 minutes. As appears to be evident from the peaks at the listed d spacings (e.g., d=3.6127, d=3.2193, etc.), the Ex. 1L glass ceramic can comprise a crystalline $MgWO_4$ tungsten oxide phase. Without being bound by theory, the XRD plot in FIG. 5 may also suggest that the glass-ceramic comprises a non-stoichiometric $MgWO_4$ phase or a mixed alkali-$MgWO_4$ phase that can be described as an $M_xWO_4$ crystal, where M=Mg or M=Mg and one or more of the group of alkali metals consisting of Li, Na, K, Rb and Cd, and $0<x<1$.

Figure 6A:
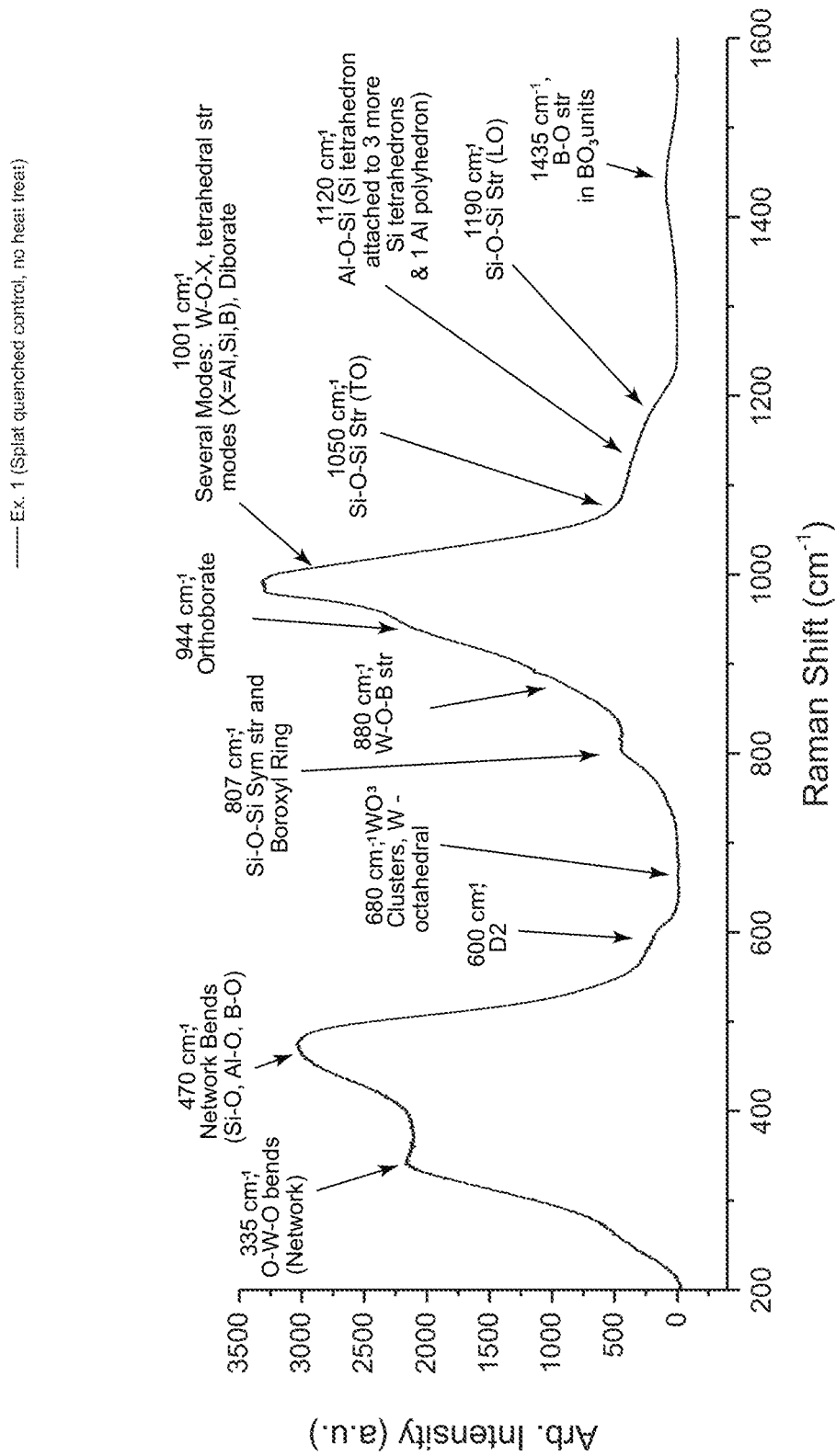
FIGS. 6A-6C are respective Raman spectroscopy plots of splat-quenched glass-ceramic samples and glass-ceramic samples heat treated at 650° C. and 700° C. according to various conditions, according to examples of the disclosure.
Figure 6B:
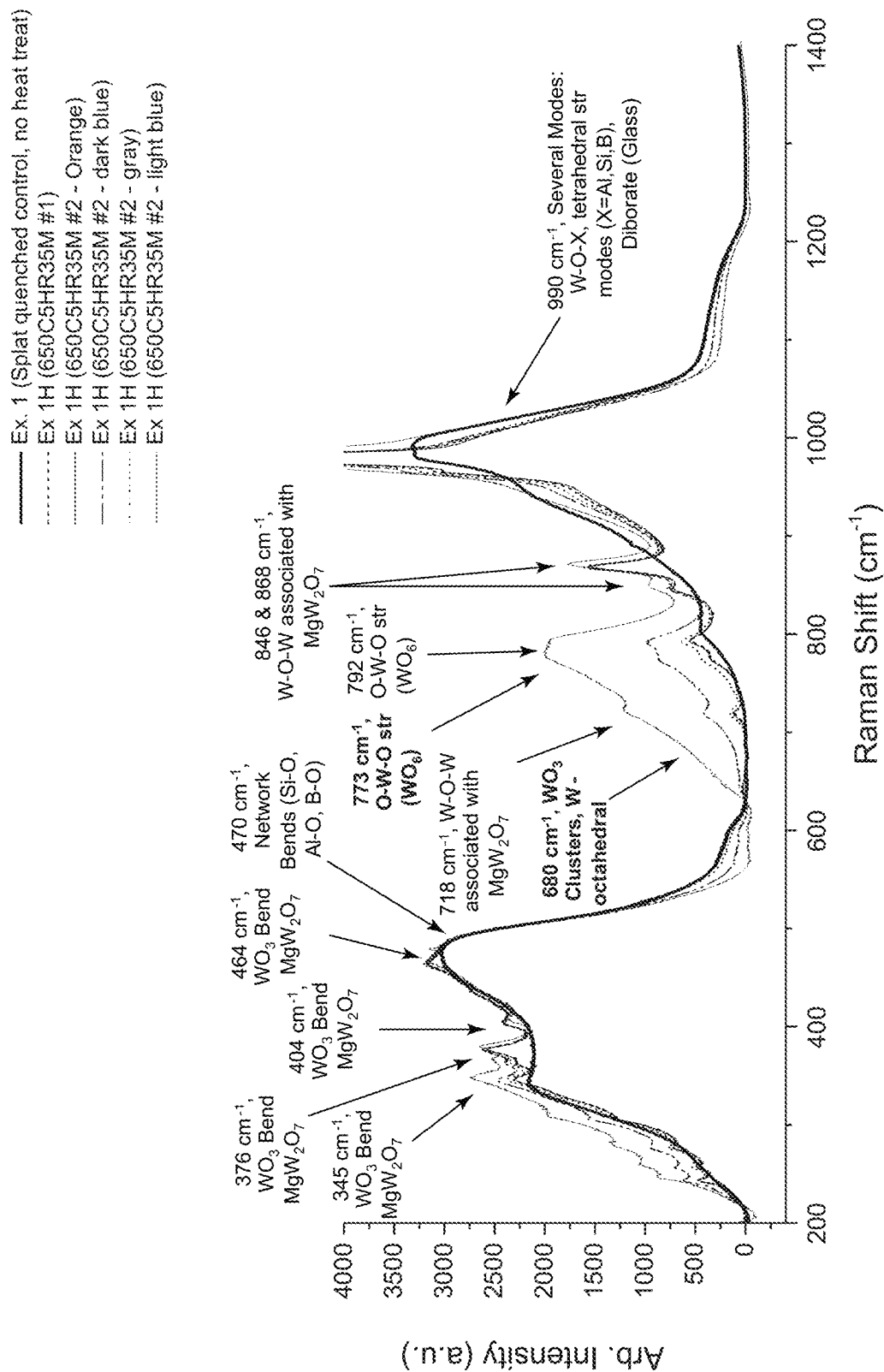
Figure 6C:
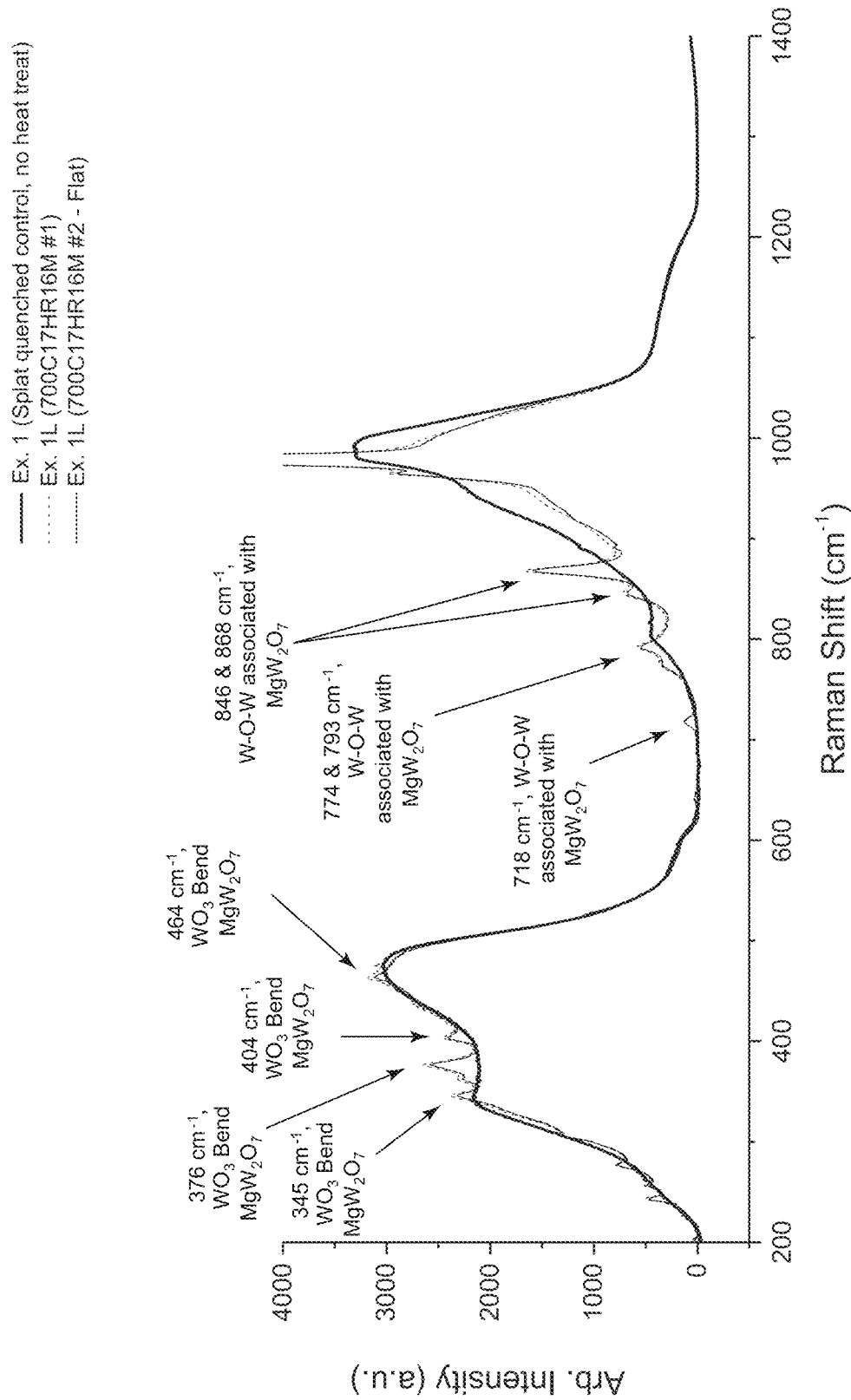

Referring now to FIGS. 6A-6C, Raman spectroscopy plots are provided of splat-quenched glass-ceramic samples (i.e., FIG. 6A, Ex. 1, no heat treatment after annealing) and glass-ceramic samples heat treated at 650° C. for 5 hours and 35 minutes and 700° C. for 17 hours and 16 minutes (Ex. 1H and Ex. 1L as shown in FIGS. 6B and 6C, respectively), according to examples of the disclosure. As in the previous example, all of the glass-ceramic materials subjected to the Raman spectroscopy testing possessed a glass-ceramic composition according to Ex. 1 in Tables 1A and 1B. The particular number designations associated with the data series in FIGS. 6B & 6C (e.g., "#1", "#2-Orange", "#2-gray", etc.) correspond to particular evaluation locations on the samples (including the color of the sample at those locations) subjected to the Raman spectroscopy testing. FIG. 6A demonstrates that the splat-quenched sample with no further heat treatment (Ex. 1) exhibits various increased intensity levels indicative of non-crystalline phases (e.g., network bends Si—O, Al—O and B—O at 470 cm$^{-1}$). In contrast, FIGS. 6B and 6C demonstrate that the heat-treated samples (Exs. 1H and 1L) have substantially higher intensity levels at the same Raman shift positions associated with lower intensity levels observed in the splat-quenched sample (Ex. 1), positions which are indicative of the presence of crystalline phases (e.g., W—O—W associated with $MgW_2O_7$ at 846 & 868 cm$^{-1}$). As such, it appears to be evident that the heat treatment conditions result in the development of a crystalline tungsten oxide phase, e.g., $MgW_2O_7$, as evidenced by the presence of signal peaks at Raman shift positions including but not limited to 345, 376, 404, 464, 718, 846 and 868 cm$^{-1}$. FIGS. 6B and 6C also suggest that the heat treatment conditions result in the development of a crystalline tungsten suboxide phase (i.e., a non-stoichiometric phases) in combination with or instead of crystalline tungsten oxide phases (i.e., the $M_xWO_4$ crystalline phases outlined earlier).

Figure 7A:
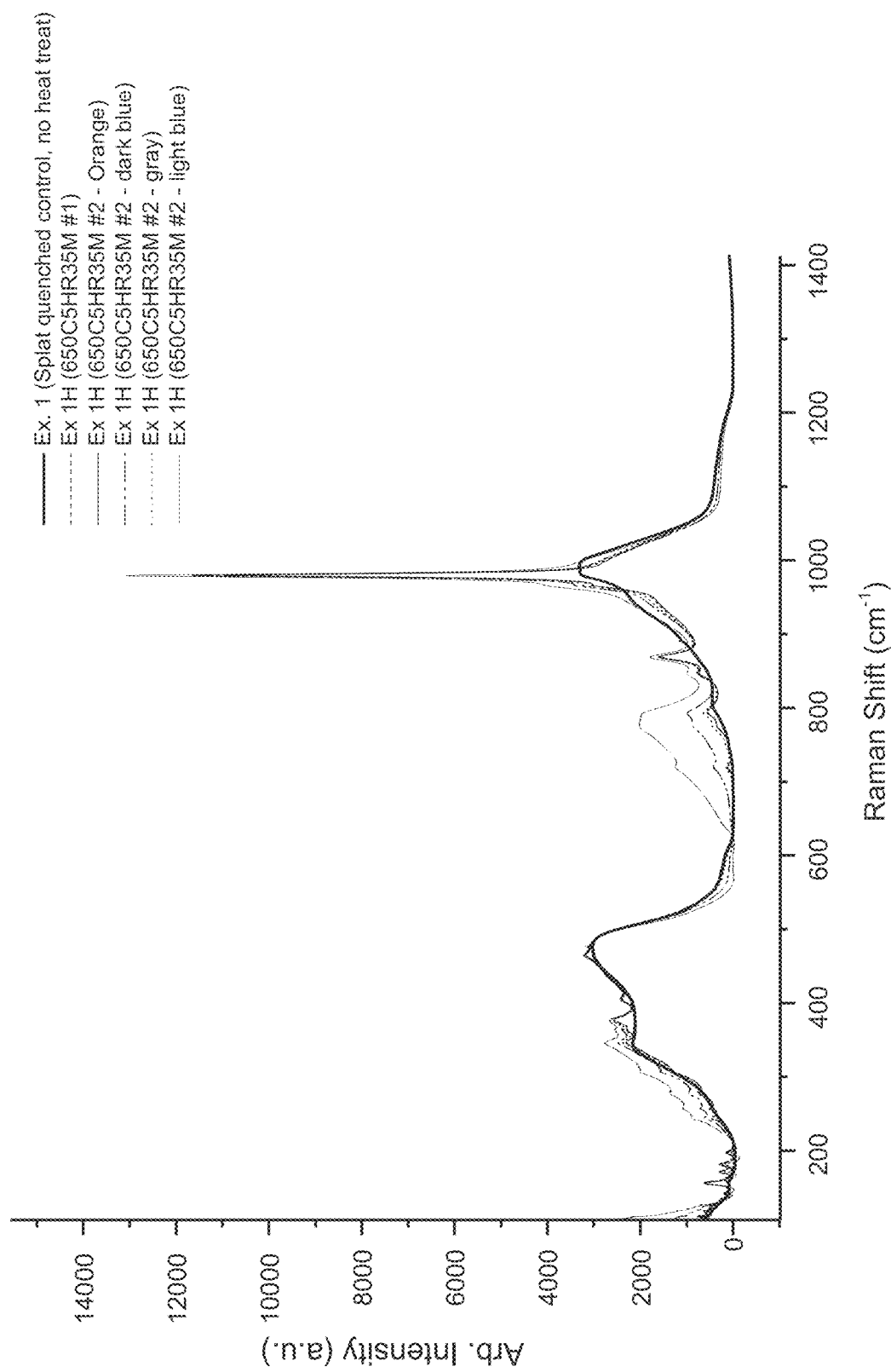
FIGS. 7A & 7B are Raman spectroscopy plots of glass-ceramic samples heat treated at 650° C. and 700° C. according to various conditions and as splat-quenched, according to examples of the disclosure.
Figure 7B:
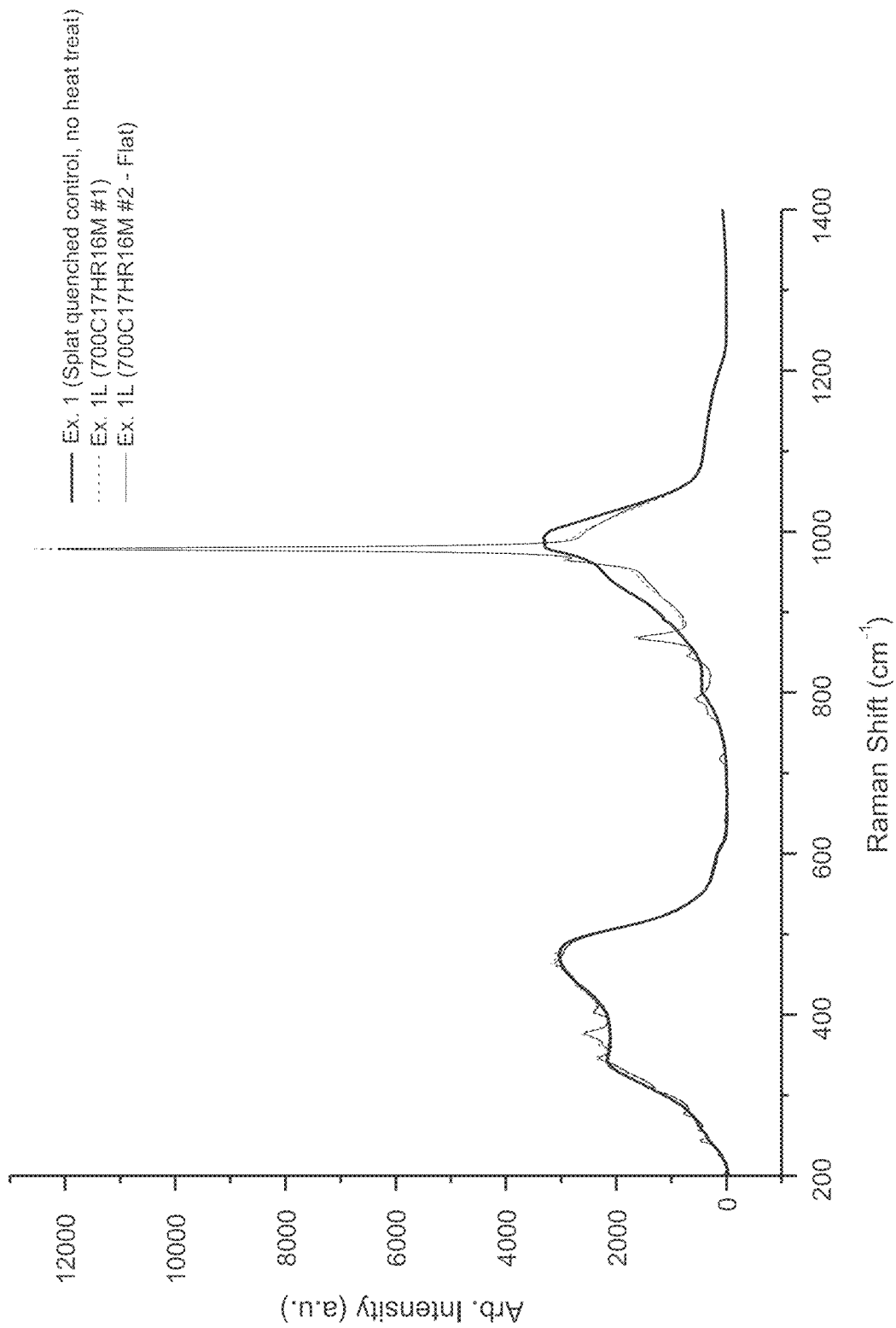

Referring now to FIGS. 7A and 7B, Raman spectroscopy plots are provided of glass-ceramic samples heat treated at 650° C. for 5 hours and 35 minutes and 700° C. for 17 hours and 16 minutes (Ex. 1H and Ex. 1L, respectively) and as splat-quenched (i.e., Ex. 1, no heat treatment after annealing), according to examples of the disclosure. As in the previous example, all of the glass-ceramic materials subjected to the Raman spectroscopy testing possessed a glass-ceramic composition according to Ex. 1 in Tables 1A and 1B. The particular number designations associated with the data series in these figures (e.g., "#1", "#2-Orange," etc.) correspond to particular evaluation locations on the samples (including the color of the sample at those locations) subjected to the Raman spectroscopy testing. Foremost, FIGS. 7A and 7B demonstrate that the splat-quenched sample (Ex. 1) has substantially lower intensity levels at the same Raman shift positions associated with high intensity levels observed for the samples subjected to the specified heat treatment conditions (Exs. 1H and 1L). As such, it is evident that the heat treatment conditions can result in the development of a crystalline tungsten oxide phase (e.g., $MgW_2O_7$ as shown in both FIGS. 7A and 7B) and/or a crystalline tungsten suboxide phase (i.e., a non-stoichiometric phase).

Figure 8:
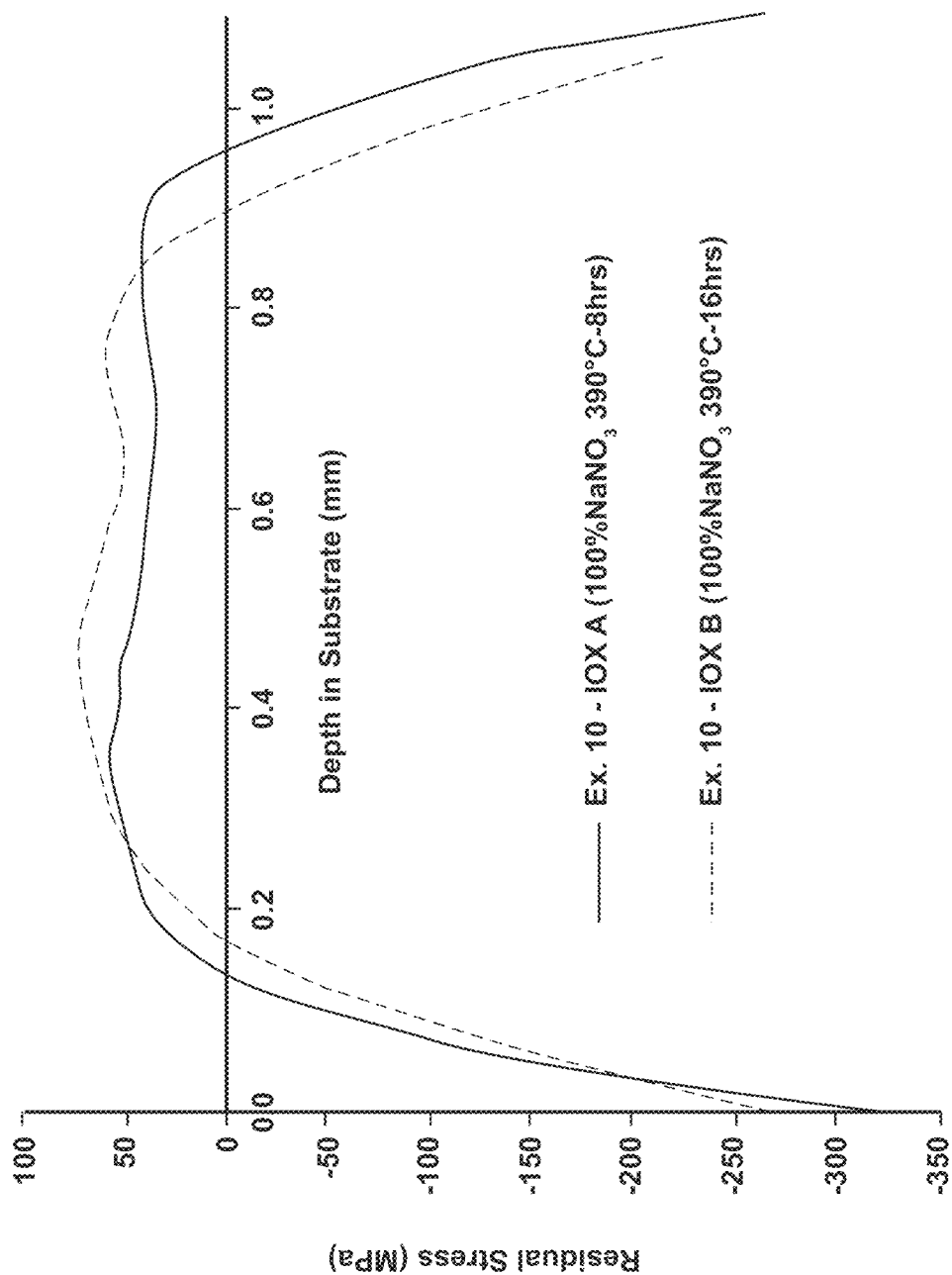
FIG. 8 is a plot of residual stress vs. substrate depth of two glass-ceramic samples with compressive stress regions derived from two respective ion-exchange process conditions, according to examples of the disclosure.
Figure 9:
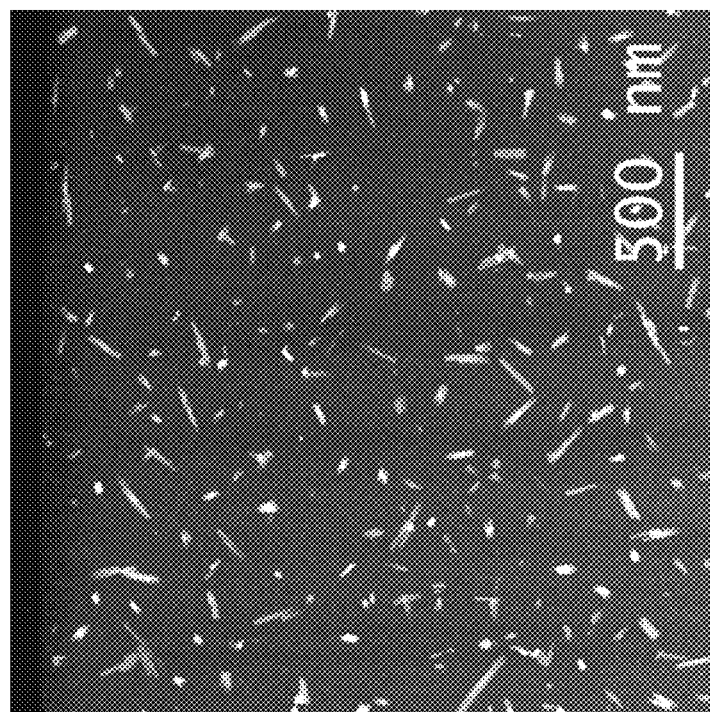
FIG. 9 is a scanning electron microscope (SEM) micrograph of a glass-ceramic according to an exemplary embodiment.

Referring now to FIG. 8, a plot is provided of residual stress (MPa) vs. substrate depth (mm) for two glass-ceramic samples with compressive stress regions derived from two respective ion-exchange process conditions (Ex. 10-IOXA and Ex. 10-IOXB). In FIG. 8, the y-axis is the residual stress in the substrate, with positive values referring to tensile residual stresses and negative values referring to compressive residual stresses. Also in FIG. 8, the x-axis is the depth in each of the substrates, with values at 0 mm and 1.1 mm denoting the primary surfaces of the substrate (e.g., primary surfaces 12 and 14 of substrate 10, as shown in FIG. 1). Each of the glass-ceramic samples in this example, Ex. 10-IOXA and Ex. 10-IOXB, has the same composition as indicated in Tables 1A and 1B for the Ex. 10 sample. Further, each of the samples was melted and cast onto a steel table to form an optical patty, consistent with the methods outlined earlier in the disclosure. Each sample was then annealed at 570° C. for one hour and then cooled at a furnace rate to ambient temperature. Samples having dimensions of 25 mm×25 mm×~1.1 mm were then ground and polished to form an annealed optical patty. Finally, the Ex. 10-IOXA sample was immersed in a 100% $NaNO_3$ molten salt bath at 390° C. for eight (8) hours to form its compressive stress region. Similarly, the Ex. 10-IOXB was immersed in a 100% $NaNO_3$ molten salt bath at 390° C. for sixteen (16) hours to form its compressive stress region. Note that the actual thickness of the Ex. 10-IOXA and 10-IOXB samples was measured at 1.10 mm and 1.06 mm, respectively.

As is evident from FIG. 8, longer ion exchange durations tend to increase the DOC, the stored strain energy and the magnitude of the peak tension (i.e., the maximum tensile stress in the central tension region) of the glass-ceramic, while decreasing its maximum compressive stress. In particular, the glass-ceramic sample with the shorter ion exchange duration, Ex. 10-IOXA, exhibits a compressive stress region with a depth of compression (DOC) of 136.7 µm, a maximum compressive stress of about −320 MPa, a central tension (CT) region given by a peak tension of 57 MPa, and a stored strain energy of 16.6 J/m$^2$. In contrast, the glass-ceramic sample with the longer ion exchange duration, Ex. 10-IOXB, exhibits a DOC of 168.0 µm, a maximum compressive stress of about −270 MPa, a CT region given by a peak tension of 72 MPa, and a stored strain energy of 25 J/m$^2$. Hence, the longer ion exchange duration of the Ex. 10-IOXB sample resulted in a larger DOC, a lower maximum compressive stress, a CT region given by a larger peak tension and a larger stored strain energy as compared to the Ex. 10-IOXA having the shorter ion exchange process duration.

While it is evident the foregoing glass-ceramic samples depicted in FIG. 8 exhibited compressive stress regions developed from an immersion in a molten salt bath of 100% $NaNO_3$, other approaches are also contemplated within the disclosure. For example, the glass-ceramic can also be ion-exchanged in a bath of molten $KNO_3$, a mixture of $NaNO_3$ and $KNO_3$, or sequentially ion-exchanged first in a $NaNO_3$ bath and secondly in $KNO_3$ to increase the compressive stress level on, and in proximity to, the surface(s) of the substrate. Accordingly, sulfates, chlorides, and other salts of ion-exchanging metal ions (e.g., $Na^+$, $K^+$, etc.) can also be employed in these bath(s). Further, the ion-exchanging temperatures can vary from about 350° C. to 550° C., while preferably ranging from 370° C. to about 450° C. to prevent salt decomposition and stress relaxation.

Referring generally to FIGS. 9 to 11B, distinct size regimes of crystals were discovered in the tungsten bronze and polychromatic tungsten bronze glass-ceramics described above. Crystal size was dependent on base glass composition, but could also be tuned slightly by heat-treatment time and temperature. Additionally, crystallization rate increased significantly with small additions of calcium oxide (CaO), which is believed to interact with the tungsten oxide to form nanocrystals of scheelite, or non-stoichiometric scheelite-like structures that could serve as nucleation sites.

Referring now to FIG. 9, relatively large crystals were found in highly peraluminous tungsten bronze melts (e.g., $M_xWO_3$ glass-ceramic) described above and shown in FIG. 9. These crystals were needle-like in shape, 100-250 nm in length and 5-30 nm in width. In the as-quenched state, after rapidly quenched between two iron plates (i.e., splat quenched), these glass-ceramic materials were x-ray amorphous and scanning electron microscope (SEM) analysis revealed no precipitates (crystals, crystallites) present. After heat treatment of the quenched glass at 700° C. for 30 minutes or more and cooling at 10° C. per minute to room temperature, tungsten bronze precipitates formed along with alumina-rich needles. Precipitates concentration increased with increasing heat-treatment time and temperature, such as after heat treatment at 700° C. for 1 hour and 40 minutes and cooled at 10° C./minute to room temperature. The x-ray energy-dispersive x-ray spectroscopy (EDS) maps of the crystallites formed after heat treatment show that they are comprised of tungsten, oxygen, and potassium.

Figure 10B:
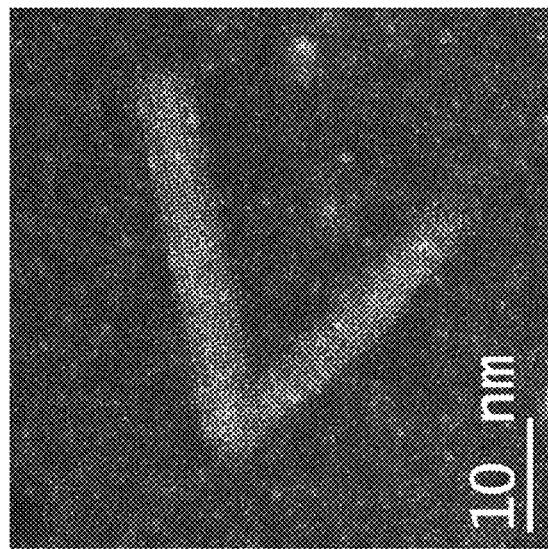
FIGS. 10A and 10B are SEM and transmission electron microscope (TEM) micrographs, respectively, of a glass-ceramic according to another exemplary embodiment.
Figure 10A:
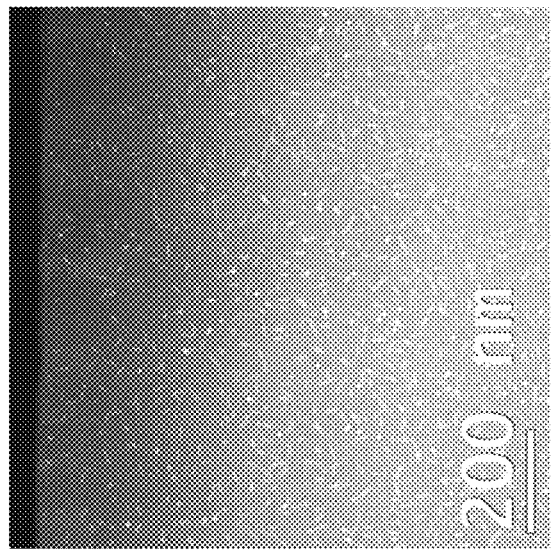

Referring to FIGS. 10A and 10B, for at least some peralkaline tungsten bronze melts ($R_2O$—$AL_2O_3$>0) crystallite size was smaller than those in peraluminous melts (FIG. 9), and there was no formation of alumina-rich needles. Like the peraluminous melts, this peralkaline material was x-ray amorphous when quenched between two iron plates (i.e., splat quenched). Micrographs show that there are no crystallites present in the material prior to heat treatment. After heat treatment of splat quenched at 550° C. for times between 15 and 30 hours, followed by cooling to 475° C. at 1° C./minute, and then cooling to room temperature at furnace rate, TEM analysis revealed formation of high aspect ratio needle-like tungsten bronze crystallites, as shown in FIGS. 10A to 10B. Most resultant needles were between 2 and 7 nm in diameter and between 10 and 30 nm in length. X-ray EDS of heat-treated splat-quenched samples revealed that the crystallites contained tungsten.

Figure 11B:
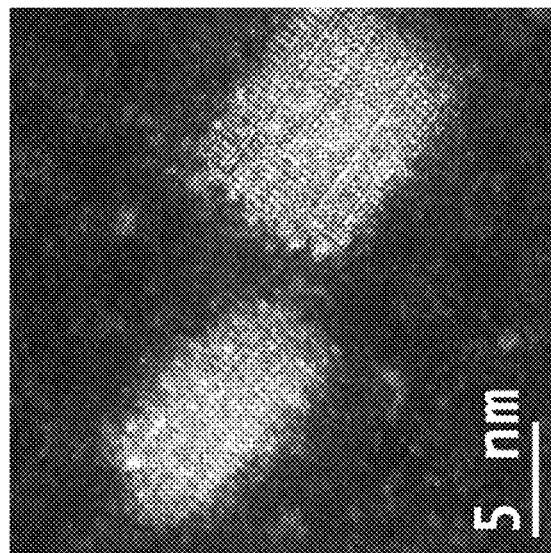
FIGS. 11A and 11B are SEM and TEM micrographs, respectively, of a glass-ceramic according to yet another exemplary embodiment.
Figure 11A:
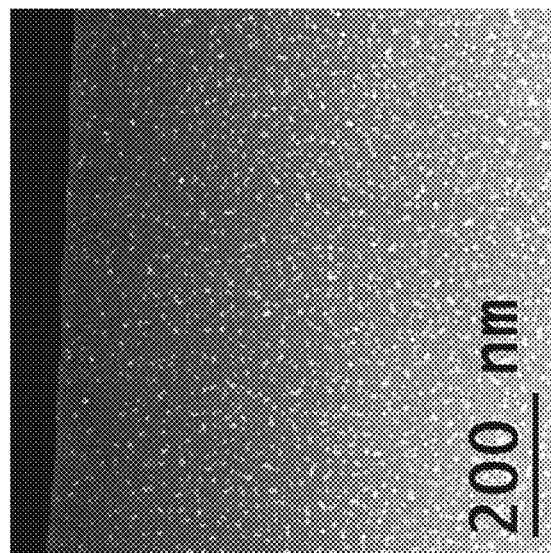
Figures 12A, 12B:
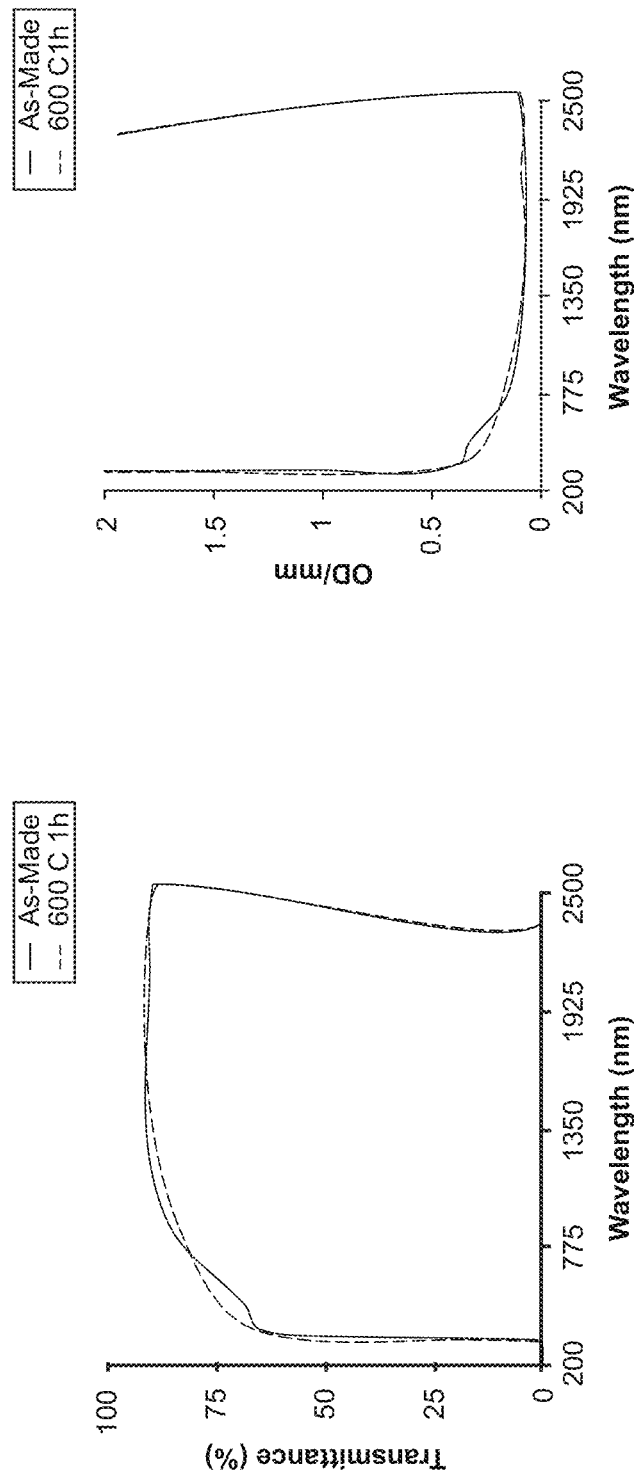
FIGS. 12A and 12B are transmittance spectra and absorbance spectra in OD/mm collected of 0.5 mm polished flats of composition 889FLZ in the as-made un-annealed state and heat treated condition (600° C. 1 h).
Figures 13A, 13B:
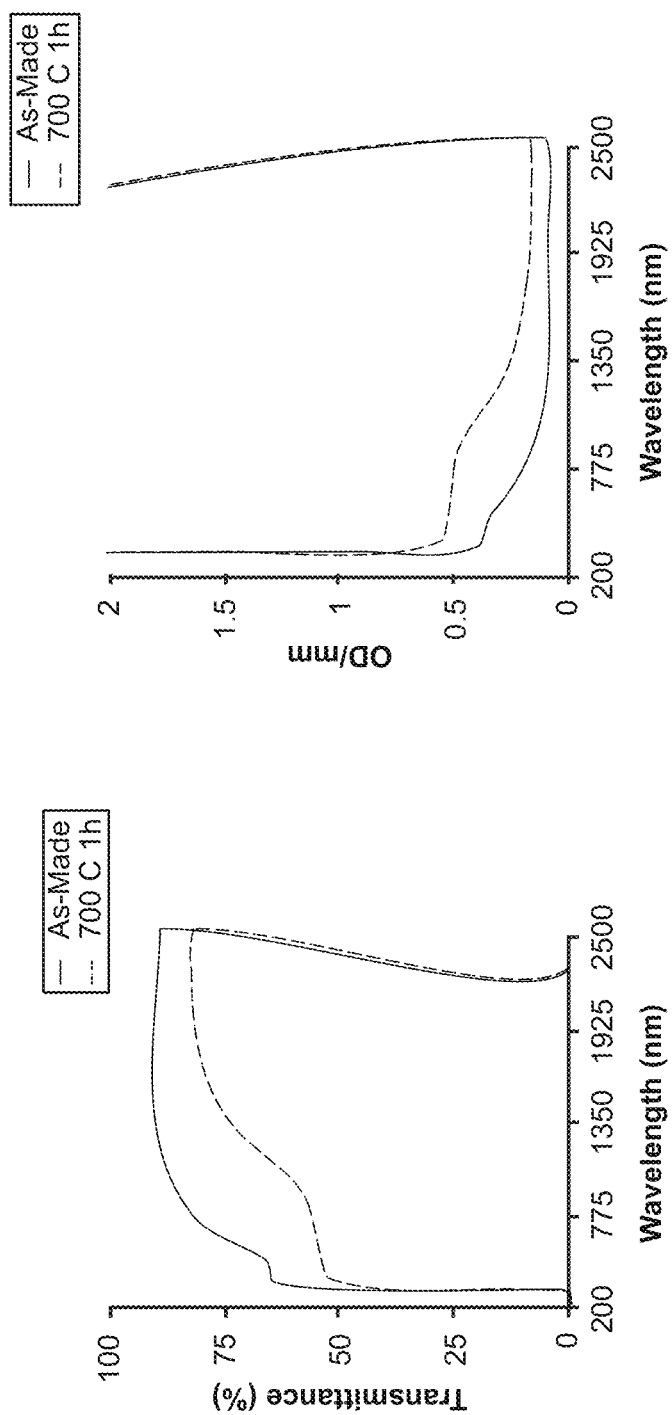
FIGS. 13A and 13B are transmittance spectra and absorbance spectra in OD/mm collected of 0.5 mm polished flats of composition 889FMB in the as-made un-annealed state and heat treated condition (700° C. 1 h).
Figures 14A, 14B:
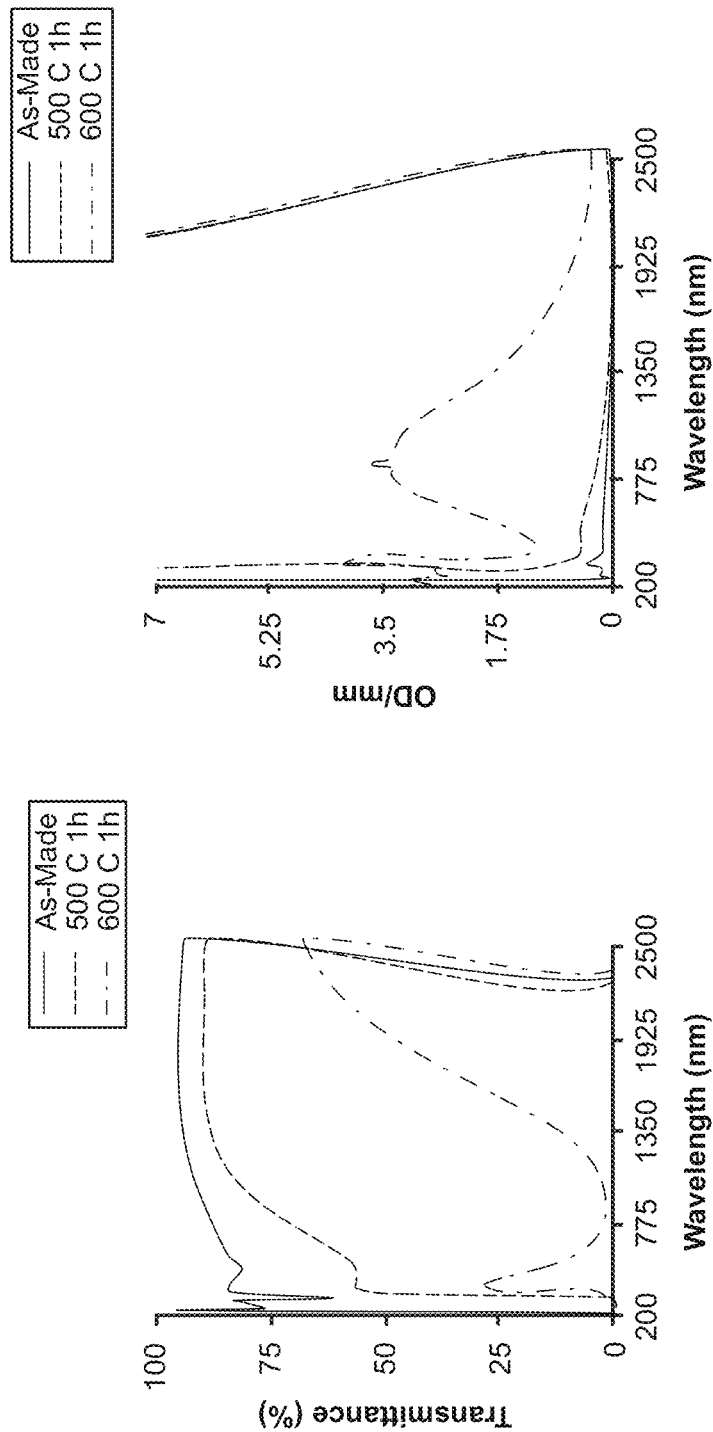
FIGS. 14A and 14B are transmittance spectra and absorbance spectra in OD/mm collected of 0.5 mm polished flats of composition 889FMC in the as-made un-annealed state and heat treated condition (500° C. 1 h and 600° C. 1 h).
Figures 15A, 15B:
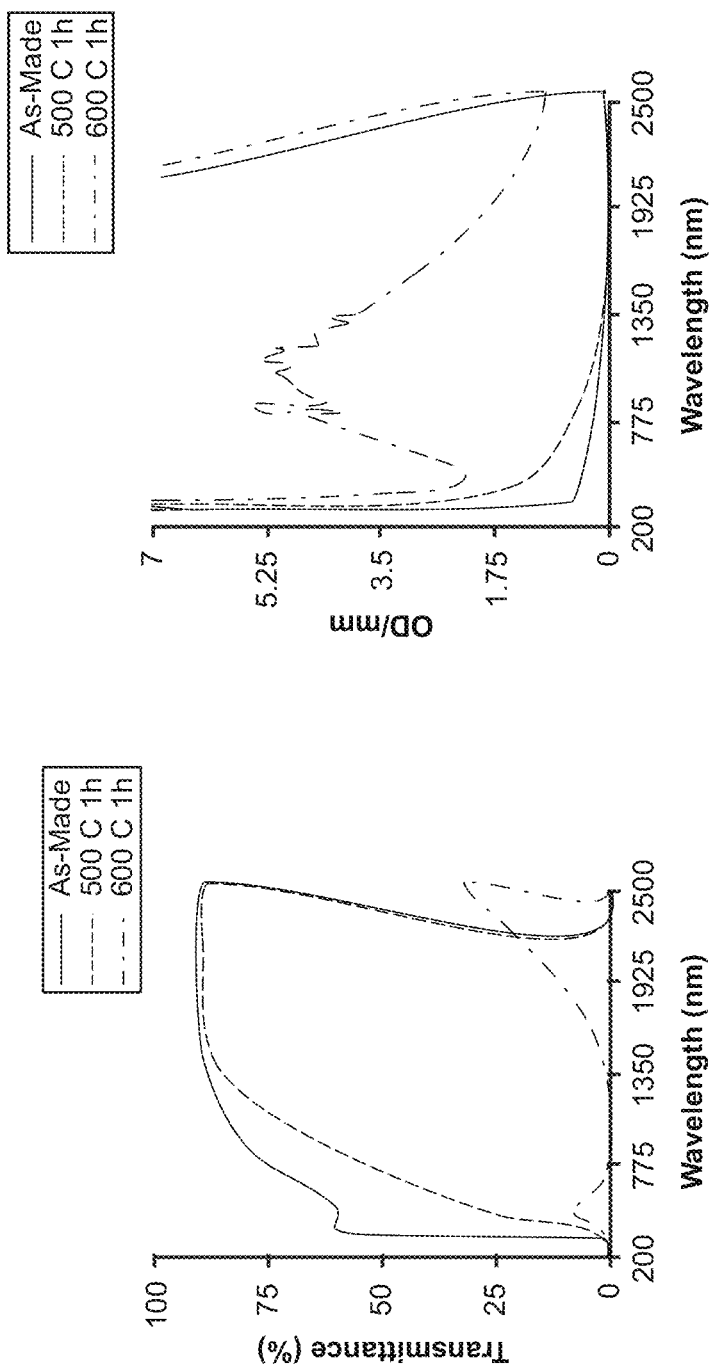
FIGS. 15A and 15B are transmittance spectra and absorbance spectra in OD/mm collected of 0.5 mm polished flats of composition 889FMD in the as-made un-annealed state and heat treated condition (500° C. 1 h and 600° C. 1 h).
Figure 16B:
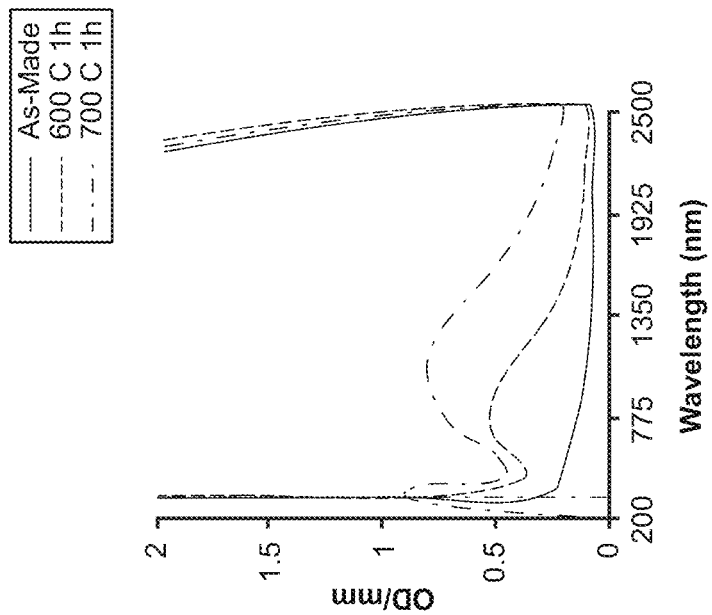
FIGS. 16A and 16B are transmittance spectra and absorbance spectra in OD/mm collected of 0.5 mm polished flats of composition 889FME in the as-made un-annealed state and heat treated condition (600° C. 1 h and 700° C. 1 h).
Figure 16A:
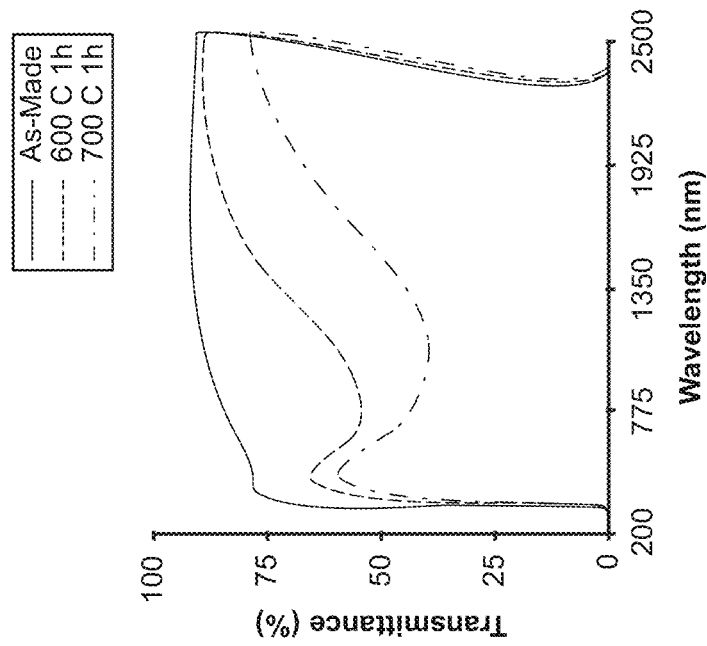
Figure 17B:
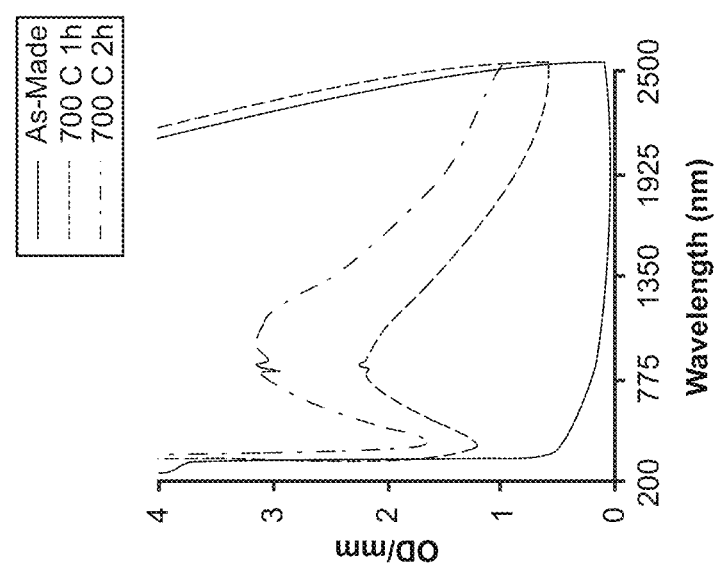
FIGS. 17A and 17B are transmittance spectra and absorbance spectra in OD/mm collected of 0.5 mm polished flats of composition 889FMG in the as-made un-annealed state and heat treated condition (700° C. 1 h and 700° C. 2 h).
Figure 17A:
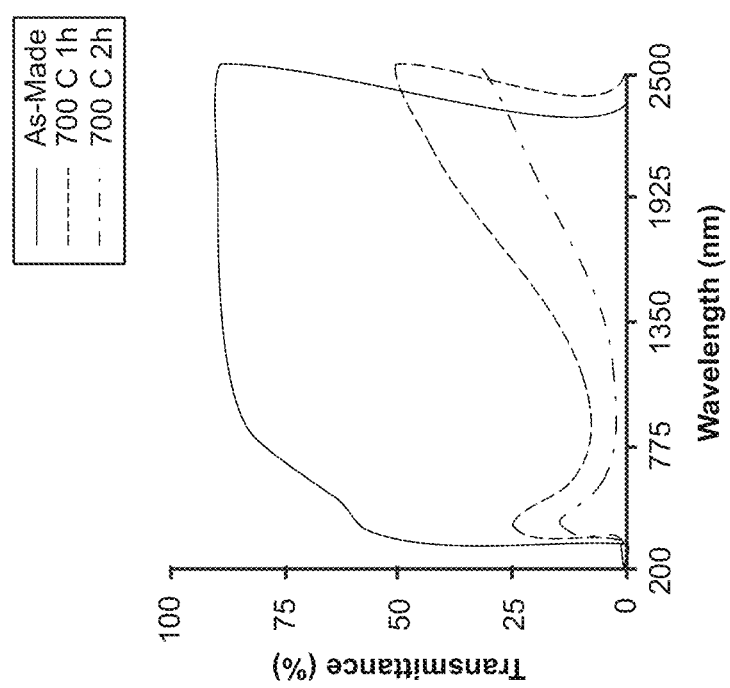
Figure 18A:
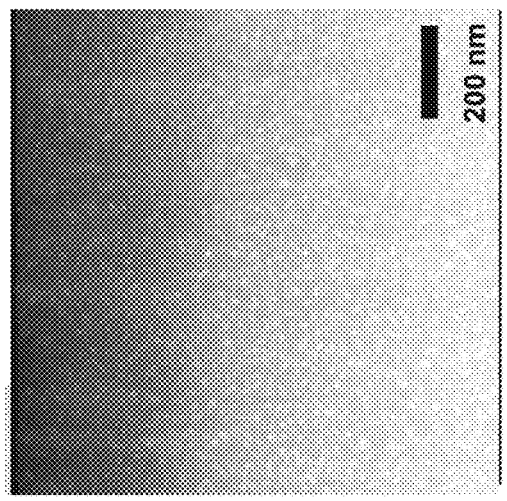
FIGS. 18A-18D are TEM micrographs at four different magnifications of titanium-containing crystals within a heat treated sample of composition 889FMC that was heat treated at 700° C. for one hour.
Figure 18B:
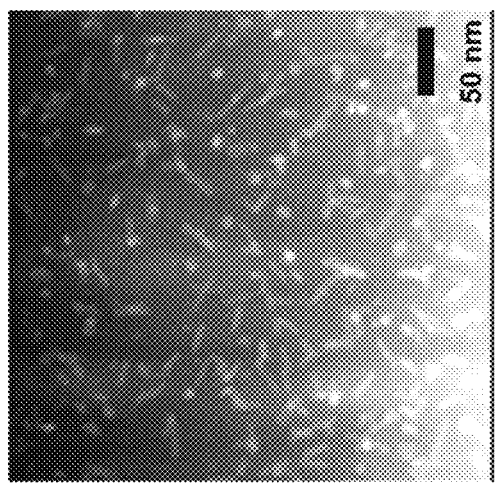
Figure 18C:
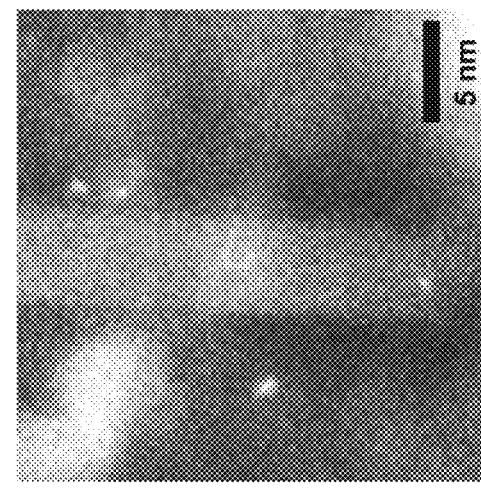
Figure 18D:
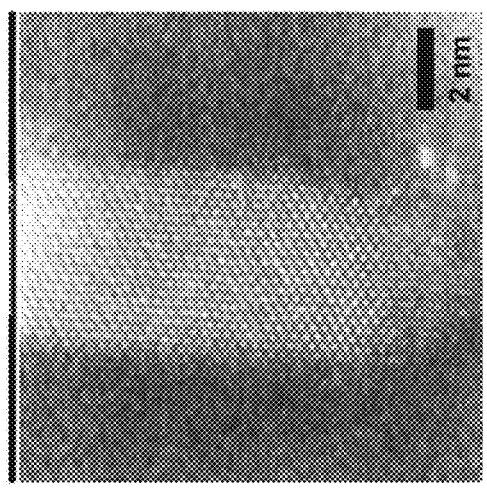

Referring to FIGS. 11A and 11B silver tungsten bronze glass-ceramics included crystallites that were generally rod-like in shape with aspect ratios between 2 and 4, mostly about 2-20 nm in length, mostly about 2-10 nm in diameter, and were about 11 to 14.8 volume percent of the material glass-ceramics. The sample shown in FIGS. 11A and 11B was heat treated at 550° C. for 4 hours, cooled to 475° C. at 1° C./minute, and then to room temperature to furnace rate. The cane was then placed in a gradient furnace for five minutes such that one end of the cane remained at room temperature and the other end of the cane was at 650 C. The region between each end was exposed to an approximately uniform gradient in temperature between 25° and 650° C. In the region where temperatures were above approximately 575° C., color started to shift from blue, to a green, to a yellow, to an orange, and finally a red. All colors were highly transparent.

As disclosed above, glass-ceramic, according to some exemplary embodiments, has transmittance of about 5%/mm or greater over at least one 50 nm-wide wavelength band of light in a range from about 400 nm to about 700 nm. However, in other embodiments, glass-ceramics have lower transmittance, such as those that are opaque. According to at least some such embodiments, these glass-ceramics are unique in that they strongly absorb but do not scatter light and have very low haze. According to various such embodiments, the glass-ceramics have optical density per millimeter (OD/mm) of at least 0.07 for at least some (e.g., most, >90%) of light with 200-400 nm wavelength, at most 25 OD/mm of the same wavelengths, and/or haze of less than 10%, where optical density is calculated from measurement of optical absorbance, which is made with a spectrophotometer, and haze is measured by haze meter wide angle scattering test. According to various such embodiments, the glass-ceramics have optical density per millimeter (OD/mm) of at least 0.022 for at least some (e.g., most, >90%) of light with 400-750 nm wavelength, at most 10 OD/mm of the same wavelengths, and/or haze of less than 10%. According to various such embodiments, the glass-ceramics have optical density per millimeter (OD/mm) of at least 0.04 for at least some (e.g., most, >90%) of light with 750-2000 nm wavelength, at most 15 OD/mm of the same wavelengths, and/or haze of less than 10%

Titanium Comprising Examples

Referring now to Tables 8A and 8B, provided are a list of exemplary glass ceramic compositions for articles including titanium.

TABLE 8A

| Oxide (mol %) | 889FLY | 889FLZ | 889FMA | 889FMB | 889FMC | 889FMD | 889FME | 889FMF | 889FMG |
|---|---|---|---|---|---|---|---|---|---|
| $SiO_2$ | 57.86 | 60.88 | 63.89 | 70.92 | 67.93 | 64.92 | 63.92 | 62.21 | 65.79 |
| $Al_2O_3$ | 12.05 | 9.03 | 9.03 | 9.03 | 9.03 | 9.03 | 12.04 | 13.4 | 13.78 |
| $B_2O_3$ | 20.08 | 20.07 | 20.07 | 10.04 | 10.03 | 10.03 | 7.02 | 4.92 | 4.91 |
| $Li_2O$ | 6.02 | 6.02 | 3.01 | 6.02 | 6.02 | 6.02 | 6.02 | 0 | 7.75 |
| $Na_2O$ | 0 | 0 | 0 | 0 | 3 | 6 | 7 | 13.19 | 1.94 |
| $K_2O$ | 0 | 0 | 0 | 0 | 0 | 0 | 0 | 0 | 0.03 |
| MgO | 0 | 0 | 0 | 0 | 0 | 0 | 0 | 2.29 | 0 |
| CaO | 0 | 0 | 0 | 0 | 0 | 0 | 0 | 0.13 | 0.01 |
| $SnO_2$ | 0.05 | 0.05 | 0.05 | 0.05 | 0.05 | 0.05 | 0.05 | 0.08 | 0.05 |
| ZnS | 1.68 | 1.68 | 1.68 | 1.68 | 1.68 | 1.68 | 1.68 | 1.61 | 1.64 |
| $P_2O_5$ | 0 | 0 | 0 | 0 | 0 | 0 | 0 | 0 | 1.9 |
| $Fe_2O_3$ | 0.01 | 0.01 | 0.01 | 0.01 | 0.01 | 0.01 | 0.01 | 0.01 | 0 |
| Cl | 0 | 0 | 0 | 0 | 0 | 0 | 0 | 0 | 0 |
| $TiO_2$ | 2.26 | 2.26 | 2.26 | 2.26 | 2.26 | 2.26 | 2.26 | 2.17 | 2.21 |
| $As_2O_3$ | 0 | 0 | 0 | 0 | 0 | 0 | 0 | 0 | 0 |
| $V_2O_5$ | 0 | 0 | 0 | 0 | 0 | 0 | 0 | 0 | 0 |
| Total | 100 | 100 | 100 | 100 | 100 | 100 | 100 | 100 | 100 |
| $R_2O$ – $AL_2O_3$ | -6.02 | -3.01 | -6.02 | -3.01 | -0.01 | 2.99 | 0.98 | -0.21 | -4.06 |

TABLE 8B

| Oxide (mol %) | 889FRY | 889FRZ | 889FSA | 889FSB | 889FSC | 889FSD | 889FSE |
|---|---|---|---|---|---|---|---|
| SiO$_2$ | 63.02 | 63.26 | 63.46 | 63.71 | 62.93 | 62.94 | 62.90 |
| Al$_2$O$_3$ | 3.21 | 3.23 | 3.24 | 3.25 | 3.21 | 3.21 | 3.21 |
| B$_2$O$_3$ | 19.33 | 19.40 | 19.46 | 19.54 | 19.29 | 19.28 | 19.29 |
| Li$_2$O | 7.42 | 7.45 | 7.47 | 7.50 | 7.41 | 7.40 | 7.40 |
| Na$_2$O | 1.85 | 1.86 | 1.87 | 1.87 | 1.85 | 1.85 | 1.85 |
| K$_2$O | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 |
| CaO | 0.01 | 0.01 | 0.01 | 0.01 | 0.01 | 0.01 | 0.01 |
| SnO$_2$ | 0.05 | 0.05 | 0.05 | 0.05 | 0.05 | 0.05 | 0.05 |
| ZnS | 1.18 | 0.79 | 1.18 | 0.79 | 1.57 | 1.56 | 1.57 |
| P$_2$O$_5$ | 1.82 | 1.83 | 1.83 | 1.84 | 1.82 | 1.82 | 1.82 |
| Fe$_2$O$_3$ | 0.00 | 0.00 | 0.00 | 0.00 | 0.00 | 0.00 | 0.00 |
| Cl | 0.00 | 0.00 | 0.00 | 0.00 | 0.00 | 0.00 | 0.00 |
| TiO$_2$ | 2.11 | 2.12 | 1.42 | 1.43 | 1.88 | 1.88 | 1.88 |
| As$_2$O$_3$ | 0.00 | 0.00 | 0.00 | 0.00 | 0.00 | 0.00 | 0.00 |
| V$_2$O$_5$ | 0.00 | 0.00 | 0.00 | 0.00 | 0.00 | 0.00 | 0.03 |
| Total | 100.00 | 100.00 | 100.00 | 100.00 | 100.00 | 100.00 | 100.00 |
| R$_2$O − AL$_2$O$_3$ | 6.06 | 6.08 | 6.10 | 6.13 | 6.05 | 6.05 | 6.05 |

Referring now to Table 8C and FIGS. 12A-17B, provided is optical data for a sampling of compositions from Tables 8A and 8B.

TABLE 8C

| Glass Code | Heat Treat | Average UV Transmittance (%) (200-400 nm) | Average VIS Transmittance (%) (400-750 nm) | Average NIR Transmittance (%) (750-1500 nm) |
|---|---|---|---|---|
| 889FLZ | As-made | 22.7 | 73.8 | 88.6 |
| 889FLZ | 600° C.-1 hour | 23.7 | 76.2 | 87 |
| 889FMB | As-made | 22.8 | 71.2 | 87.3 |
| 889FMB | 700° C.-1 hour | 17 | 54.9 | 66.3 |
| 889FMC | As-made | 19.3 | 61.2 | 83.2 |
| 889FMC | 500° C.-1 hour | 66.7 | 84 | 91.8 |
| 889FMC | 600° C.-1 hour | 7.3 | 11.3 | 6.7 |
| 889FMD | As-made | 20.8 | 64.2 | 83.9 |
| 889FMD | 500° C.-1 hour | 2.1 | 33 | 73.5 |
| 889FMD | 600° C.-1 hour | 0.4 | 4.1 | 0.8 |
| 889FME | As-made | 26.1 | 80.5 | 88.9 |
| 889FME | 600° C.-1 hour | 14 | 59.9 | 64 |
| 889FME | 700° C.-1 hour | 12.2 | 53.1 | 42.7 |
| 889FMG | As-made | 20 | 67.5 | 85.9 |
| 889FMG | 700° C.-1 hour | 6.7 | 15.4 | 12 |
| 889FMG | 700° C.-2 hours | 2.2 | 7.7 | 4 |

The various compositions of Table 8C and FIGS. 12A-17B were prepared by weighing the batch constituents, mixing the batch constituents by shaker-mixer or ball mill and melting for 4-32 hours at temperatures between 1300°-1650° C. in fused silica crucibles. Glasses were cast onto a metal table to produce a 0.5 mm thick patty of glass. Some melts were cast onto a steel table and then rolled into sheet using a steel roller. To develop and control optical transmission and absorbance, the samples were heat treated for times ranging from 5-500 minutes at temperatures ranging from 425-850° C. in ambient air electric ovens. The sample patties were then polished to a thickness of 0.5 mm and tested.

As evident from the data of Table 8C and FIGS. 12A-17B, the as-made state of the titanium containing glass are highly transparent in the NIR regime, and largely transparent at visible wavelengths. Upon thermal treatment at temperatures ranging from about 500° C. to about 700° C., the crystalline phase (i.e., titanium suboxides) is precipitated and the optical transmittance of these samples decreases and some become strongly absorbing in the NIR.

Powder X-ray diffraction was performed on each of the compositions of Table 8C and indicated that all compositions were X-ray amorphous in the as-made and un-annealed state. Heat treated samples showed evidence of some titania-bearing crystalline phases including Anatase (889FLY) and Rutile (889FMC and 889FMD). The samples exhibited low haze (i.e., about 10% or less, or about <5% or less, or about 1% or less, or about 0.1% or less). Without being bound by theory, the low haze that these compositions exhibited in the as-made and post-heat treated state is due to the fact that the crystallites are quite small (i.e., about 100 nm or less) and in low abundance (i.e., due to the fact that TiO$_2$ was introduced at only about 2 mol %). Accordingly, it is believed that the species forming in these materials are below the detection limits (in size and abundance) for conventional powder XRD. This hypothesis was confirmed by TEM microscopy.

Referring now to FIGS. 18A-D, provided are TEM micrographs at four different magnifications of titania-containing crystals within a sample of glass code composition 889FMC that was heat treated at 700° C. for one hour. These crystals are rod-like in appearance and have an average width of about 5 nm and an average length of about 25 nm.

Figure 19B:
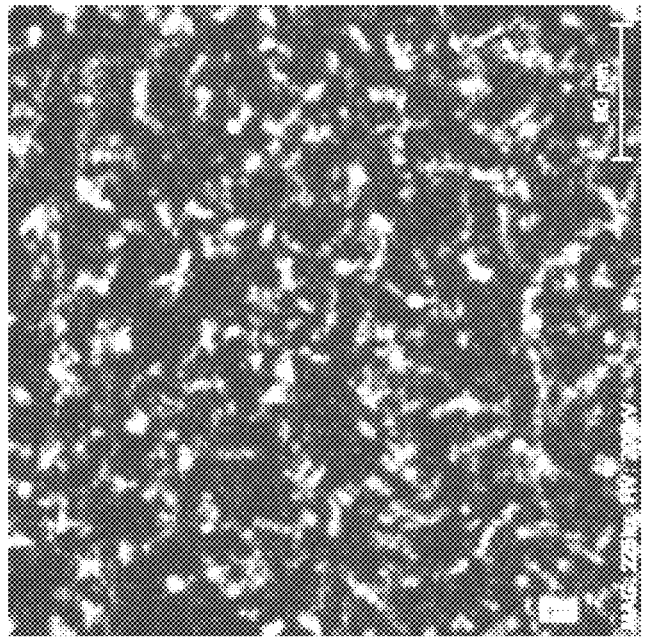
FIG. 19B is an electron dispersive spectroscopy (EDS) elemental map of titanium of the TEM micrograph of FIG. 19A.
Figure 19A:
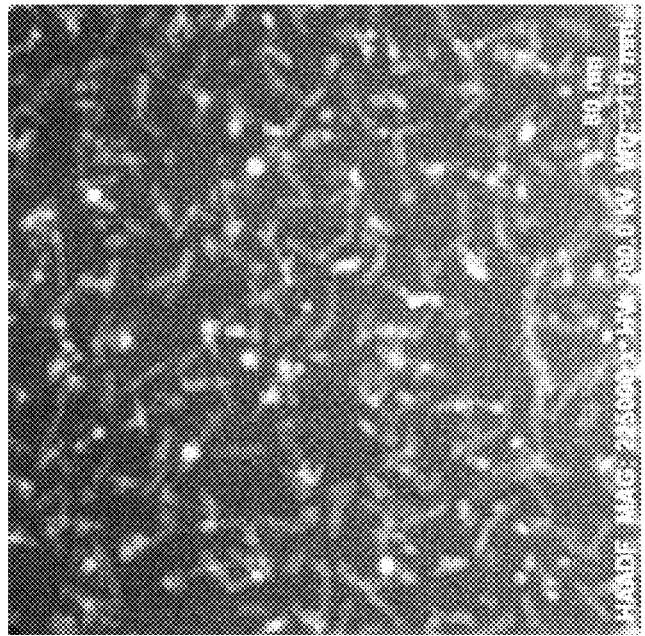
FIG. 19A is a TEM micrograph of titanium-containing crystals within a heat treated sample of composition 889FMC that was heat treated at 700° C. for one hour.

Referring now FIGS. 19A and 19B, provided is a TEM micrograph (FIG. 19A) and corresponding EDS elemental map (FIG. 19B) of a heat treated sample of glass code composition 889FMC. As can be seen from FIG. 19A, the sample includes a plurality of crystallites. The EDS map was set to detect titanium. As can be seen, the results of the EDS mapping of titanium closely track with the crystallites indicating that the crystallites are rich in titanium. In this map, the light or 'white' regions indicate the presence of Ti.

Referring now to Table 9A, provided is an exemplary glass composition which is free of titanium.

TABLE 9A

| Oxides (mol %) | 196 KGA |
|---|---|
| SiO$_2$ | 66.5646 |
| Al$_2$O$_3$ | 9.5109 |
| B$_2$O$_3$ | 9.3209 |
| Li$_2$O | 3.8038 |
| Na$_2$O | 4.3623 |
| K$_2$O | 1.5693 |
| MgO | 0.0148 |
| SnO$_2$ | 0.0951 |

TABLE 9A-continued

| Oxides (mol %) | 196 KGA |
|---|---|
| $WO_3$ | 3.8045 |
| $MoO_3$ | 0.9511 |
| $Fe_2O_3$ | 0.0027 |
| Total | 100.0000 |

Table 9B provides solar performance metrics for a variety of glasses. In Table 9B, composition 196KGA is incorporated as a clad layer of a double fusion laminate (i.e., total clad glass-ceramic thickness=0.2 mm), where the core composition of the laminate was chemically strengthened Gorilla® glass from Corning Incorporated®. Composition 196KGA was 1 mm thick and thermally treated at 550° C. for 30 minutes and allowed to cool at 1° C. per minute to 475° C. The 889FMD sample was 5 mm thick and was thermally processed at 600° C. for 1 hour. The 889FMG sample was 0.5 mm thick and was thermally processed at 700° C. for 2 hours. The VG10 samples refer a glass sold under the trade name SGG VENUS (VG 10) by Saint-Gobain® and differ from one another in thickness.

TABLE 9B

| Solar Performance Metric | 196KGA (0.2 mm) | 889FMD (0.5 mm) | 889FMG (0.5 mm) | VG10 (3.85 mm) | VG10 (2.1 mm) | VG10 (0.7 mm) |
|---|---|---|---|---|---|---|
| T_L (A/2°) | 2.6% | 4.7% | 6.8% | 10.6% | 28.1% | 61.7% |
| T_L (ISO 9050) | 3.2% | 5.3% | 7.5% | 10.7% | 28.3% | 61.9% |
| T_TS (ISO 13837A) | 28.0% | 28.9% | 31.4% | 32.8% | 44.0% | 68.1% |
| T_DS (ISO 13837A) | 2.0% | 3.3% | 6.7% | 8.8% | 24.4% | 58.2% |
| R_DS (ISO 13837A) | 4.0% | 4.0% | 4.0% | 4.3% | 4.6% | 5.9% |
| T_E (ISO 9050) | 2.1% | 3.3% | 6.8% | 8.7% | 24.4% | 58.1% |
| T_UV (ISO 9050) | 0.0% | 0.3% | 3.0% | 1.1% | 6.7% | 35.9% |
| T_UV (ISO 13837A) | 0.2% | 1.0% | 6.1% | 3.0% | 11.8% | 42.8% |
| T_IR (VW TL 957) | 1.4% | 2.6% | 5.9% | 7.0% | 21.0% | 55.3% |

In Table 9B, T_L is the total visible light transmittance (which is the weighted-average transmission of light through a glazing at a wavelength range of 380 nm to 780 nm and is tested in accordance with ISO 9050 Section 3.3). T_TS is the total transmitted solar (also referred to as Solar Factor ("SF") or Total Solar Heat Transmission ("TSHT"), which is the sum of the T_DS (total direct solar) plus the fraction of solar energy that is absorbed by the glazing and then re-radiated into a vehicle interior as measured by ISO 13837-2008 Annex B & ISO 9050-2003 section 3.5). In this instance, the T_TS is calculated for a parked car condition with wind speed of 4 m/s (14 km/hr) % with T_TS being equal to (% T_DS)+0.276*(% solar absorption). T_DS is the total direct solar transmittance (also referred to as "Solar Transmission" ("Ts") or "Energy Transmission", which is the weighted-average transmission of light through a glazing at a wavelength range of 300 nm to 2500 nm as measured by ISO 13837 section 6.3.2)). R_DS is the reflected solar component (i.e., with nominally 4% Fresnel reflection). T_E is the solar direct transmittance. T_UV is the UV transmittance as measured under ISO 9050 and ISO 13837 A. T_IR is the infrared transmittance as measured under Volkswagen standard TL957.

As self-evident from the data of Table 9B, glass code 196KGA has the best optical performance and is able to produce the lowest UV, VIS, and NIR transmittance at very short path lengths (0.2 mm). The titanium containing compositions 889FMD and 889FMG at 0.5 mm thickness produce superior optical performance to the VG10 glass at path lengths at or below 3.85 mm. In other words, the titanium containing compositions 889FMD and 889FMG had superior performance to the VG10 glass despite having shorter path lengths.

Further referring to at least some glass-ceramics disclosed or contemplated herein, the glass-ceramics include an amorphous phase and crystalline phase, where the crystalline phase comprises (e.g., includes, is, mostly is) a bronze-structure as disclosed herein, such as a precipitates of formula $M_xTiO_2$, $M_xWO_3$, etc., as disclosed herein. A volume fraction of the crystalline phase may range from about 0.001% to about 20%, or from about 1% to about 20%, or from about 5% to about 20%, or from about 10% to about 20%, or from about 10% to about 30%, or from about 0.001% to about 50%. In other embodiments, a volume fraction of the crystalline phase may range from about 0.001% to about 20%, or from about 0.001% to about 15%, or from about 0.001% to about 10% or from about 0.001% to about 5%, or from about 0.001% to about 1%. In other contemplated embodiments, the volume fraction of crystalline phase in the glass-ceramic may be more than 50%.

Further referring to at least some glass-ceramics disclosed or contemplated herein, the glass-ceramics include an amorphous phase and crystalline phase, where the crystalline phase comprises (e.g., includes, is, mostly is) a bronze-structure as disclosed herein, such as a precipitates of formula $M_xTiO_2$, $M_xWO_3$, etc., as disclosed herein, where M represents dopant cations as disclosed herein, and the precipitates (e.g., crystals) are suboxides, where 0<x<1, such as where 0<x<1, such as where 0<x<0.9, such as where 0<x<0.75, such as where 0<x<0.5, such as where 0<x<0.2, and/or where 0.01<x<1, such as where 0.01<x<1, such as where 0.1<x<1, such as where 0.2<x<1, such as where 0.5<x<1, and/or where 0.001<x<0.999, such as where 0.01<x<0.99, such as where 0.1<x<0.9, such as where 0.2<x<0.9 or where 0.1<x<0.8.

The construction and arrangements of the methods and products, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive technology.

What is claimed is:

1. A glass-ceramic article, comprising:
a bulk comprising an amorphous phase and a crystalline phase, wherein the crystalline phase comprises a plurality of precipitates homogenously distributed within the amorphous phase, wherein the precipitates comprise a bronze-structure; and
a bleached region having a localized composition that differs from the bulk due to dissolution of the precipitates.

2. The glass-ceramic article of claim 1, wherein color of the bleached region differs from that of the bulk.

3. The glass-ceramic article of claim 2, wherein the bulk is opaque in the visible spectrum 400-700 nm, and the bleached region is optically transparent and has a water white or faint yellow tint.

4. The glass-ceramic article of claim 1, wherein the bronze structure comprises a ternary metal oxide of formula $M'_xM''_yO_z$, wherein $M''$ is a transition metal, y and z are such that $M''_yO_z$ is a highest binary oxide of the transition metal, $M'$ is a dopant cation, and $0 < x < 1$;
wherein the transition metal is selected from the group consisting of W, Mo, V, and Ti;
wherein the dopant cation is one or more selected from the group consisting of H, Li, Na, K, Rb, Cs, Ca, Sr, Ba, Zn, Ag, Au, Cu, Sn, Cd, In, Tl, Pb, Bi, Th, La, Pr, Nd, Sm, Eu, Gd, Dy, Ho, Er, Tm, Yb, Lu, U, V, Cr, Mn, Fe, Ni, Pd, Se, Ta, and Ce.

5. The glass-ceramic article of claim 4, wherein the precipitates are a volume fraction in the glass-ceramic of at least 5%.

6. The glass-ceramic article of claim 5, wherein the precipitates are a volume fraction in the glass-ceramic of no more than 20%.

7. The glass-ceramic article of claim 4, wherein at least some of the precipitates are at least 1 nm long and no more than 300 nm long.

8. The glass-ceramic article of claim 4, wherein the transition metal comprises W for some of the precipitates and Mo others of the precipitates.

9. The glass-ceramic article of claim 4, wherein the dopant cation is selected from the sub-group consisting of Ag, Au, and Cu, wherein at least some of the precipitates with dopant cations of the sub-group have a length of 2 nm to 20 nm and a width from 2 nm to 10 nm.

10. The glass-ceramic article of claim 4, wherein the crystalline and amorphous phases are such that the glass-ceramic exhibits 20% or less haze, where haze is percentage of transmitted light scattered outside an angular cone of ±2.5° over a transmission path of 1 mm of the glass-ceramic.

11. The glass-ceramic article of claim 4, having an optical density per mm of 6.0 or less, as measured with a spectrometer where optical density is $-\log(I/I0)$, where I0 is intensity of light incident on the glass-ceramic and I is intensity of light transmitted through the glass-ceramic, averaged over near-infrared absorbance.

12. The glass-ceramic article of claim 1, wherein the bronze-structure of the precipitates comprises a ternary metal oxide of formula $M'_xM''_yO_z$, where:
(i) $M''$ is a transition metal,
(ii) y and z are such that $M''_yO_z$ a highest binary oxide of $M''$,
(iii) $M'$ is a dopant cation, and
(iv) x is in a range of $0 < x < 1$.

13. The glass-ceramic article of claim 1, wherein the bleached region is part of a pattern of bleached regions in the bulk having localized compositions that differ from that of the bulk due to dissolution of the precipitates, wherein the bleached regions are optically transparent.

14. The article of claim 13, wherein the precipitates have a length of from 1 nm to about 500 nm and rod-like morphology.

15. The article of claim 13, wherein the crystalline phase has a volume fraction of the bulk within a range from 0.001% to 20%.

16. The article of claim 13, wherein the bleached regions are less absorptive in the near infrared than the bulk.

17. The article of claim 13, further comprising compressive stress of greater than 150 MPa and 2000 MPa or lower.

18. The article of claim 13, comprising a composition such that $R_2O$ minus $Al_2O_3$ is within a range from −35 mol % to 7 mol %, where $R_2O$ represents alkali metal oxides.

19. A glass-ceramic article, comprising:
a bulk comprising an amorphous phase and a crystalline phase, wherein the crystalline phase comprises a plurality of precipitates homogenously distributed within the amorphous phase, wherein the precipitates comprise a tungsten-bronze structure; and
a bleached region that differs from the bulk due to absence of the precipitates.

20. A glass-ceramic article, comprising:
a bulk comprising an amorphous phase and a crystalline phase, wherein the crystalline phase comprises a plurality of precipitates, wherein the precipitates comprise a bronze structure; and
a bleached region,
wherein the bulk is opaque in the visible spectrum 400-700 nm, and
wherein the bleached region has transmittance of 5%/mm or greater over at least one 50 nm-wide wavelength band of light in the visible spectrum 400-700 nm.

* * * * *